United States Patent [19]

Hall

[11] Patent Number: 5,003,508

[45] Date of Patent: Mar. 26, 1991

[54] LINEAR NEAREST NEIGHBOR INTERCONNECT BUS SYSTEM

[75] Inventor: William E. Hall, Beaverton, Oreg.

[73] Assignee: Floating point Systems, Inc., Beaverton, Oreg.

[21] Appl. No.: 338,557

[22] Filed: Apr. 7, 1989

Related U.S. Application Data

[63] Continuation of Ser. No. 794,495, Oct. 31, 1985, abandoned.

[51] Int. Cl.⁵ .............................................. G06F 13/40
[52] U.S. Cl. .................................. 364/900; 364/927.92; 364/935.46; 364/935.3; 364/937.01; 364/940.64
[58] Field of Search ... 364/200 MS File, 900 MS File

[56] References Cited

U.S. PATENT DOCUMENTS

| | | | |
|---|---|---|---|
| 4,112,488 | 9/1978 | Smith | 364/200 |
| 4,136,384 | 1/1979 | Okada et al. | 364/200 |
| 4,212,080 | 7/1980 | Milliken | 364/900 |
| 4,354,226 | 10/1982 | Flickinger et al. | 364/200 |
| 4,385,350 | 5/1983 | Hansen et al. | 364/200 |
| 4,388,683 | 6/1983 | Beifuss et al. | 364/200 |
| 4,396,983 | 8/1983 | Segarra et al. | 364/200 |
| 4,434,463 | 2/1984 | Quinquis et al. | 364/200 |
| 4,456,956 | 6/1984 | El-Gohary et al. | 364/200 |
| 4,514,807 | 4/1985 | Nogi | 364/200 |
| 4,523,273 | 6/1985 | Adams et al. | 364/200 |
| 4,682,285 | 7/1987 | Ozil et al. | 364/200 |

Primary Examiner—Thomas M. Heckler
Attorney, Agent, or Firm—Dellett, Smith-Hill and Bedell

[57] ABSTRACT

An apparatus for providing data communication between concurrently operating random access memory and processing devices includes a set of interface nodes interconnected in series by bidirectional buses. Each node includes means for reading data at selected addresses within a random access memory and means for selectively transmitting that data outwardly to either one or both of the nearest neighbor nodes to which it is connected. Each node also includes means for receiving data from any nearest neighbor node to which it is connected, for writing that data into a selected address of random access memory, and for forwarding that data to another nearest neighbor node. Each node attaches a selected distance field to data it transmits to a nearest neighbor node, the distance field indicating the relative address of an intended destination node in terms of the number of nodes between the forwarding node and an intended destination. Each node is further adapted to receive and forward to nearest neighbor nodes messages generated by a processing device connected thereto and for controlling node operation according to said messages. Each node also attached an identification field to data transmitted to a nearest neighbor node indicating whether the data is a message, or a part of a data transfer between memory devices.

13 Claims, 32 Drawing Sheets

| BIT: | 0-1 | 2 - 19 | 20 | 21 |
|---|---|---|---|---|
| FIELD: | tag2 | data | pr2 | dv |

FIG. 14A

| BIT: | 0-1 | 2-5 | 6 - 19 | 20 | 21 |
|---|---|---|---|---|---|
| FIELD: | tag1 | id | data | pr1 | dv |

FIG. 14B

| BIT: | 0-1 | 2-5 | 6-37 | 38 | 39 |
|---|---|---|---|---|---|
| FIELD: | ctag | id | data | pri1 | pr2 |

FIG. 14C

| BIT: | 0-5 | 6-9 | 10-41 | 42 | 43 |
|---|---|---|---|---|---|
| FIELD: | dist | id | data | pr1 | pr2 |

FIG. 14D

| BIT: | 0-1 | 2-11 | 12 | 13 | 14-19 | 20 | 21 |
|---|---|---|---|---|---|---|---|
| FIELD: | tag0 | unused | ind | dir | dist | pr1 | dv |

FIG. 14E

| BIT: | 0-1 | 2-19 | 20 | 21 |
|---|---|---|---|---|
| FIELD: | tag3 | data | pr3 | dv |

FIG. 14F

| BIT: | 0-1 | 2-5 | 6-19 | 20 | 21 |
|---|---|---|---|---|---|
| FIELD: | tag1 | id | data | pr2 | dv |

FIG. 14G

| BIT: | 0-1 | 2-5 | 6-37 | 38 | 39 |
|---|---|---|---|---|---|
| FIELD: | ctag | id | data | pr2 | pr3 |

FIG. 14I

| BIT: | 0-1 | 2-11 | 12 | 13 | 14-19 | 20-29 | 30 | 31 | 32-37 | 38 | 39 |
|---|---|---|---|---|---|---|---|---|---|---|---|
| FIELD: | ctag | unused | ind | dir | dist | unused | ind | dir | dist | pr1 | pr1 |

FIG. 14H

| BIT: | 0-3 | 4-35 |
|---|---|---|
| FIELD: | id | data |

FIG. 14J

LINEAR NEAREST NEIGHBOR INTERCONNECT BUS SYSTEM

This is a continuation of application Ser. No. 794,495 filed Oct. 31, 1985 and now abandoned.

BACKGROUND OF THE INVENTION

The present invention relates in general to parallel processing systems and in particular to a method and apparatusfor providing communication between concurrently operating data processing devices.

The processing time for computer operations can often be improved through the use of parallel processors. For instance when computation involves the manipulation of arrays, a special array processor can be provided for rapidly performing this function while a multipurpose processor is utilized to perform other portions of the computation. The two processors are typically interconnected through a bus system permitting the transfer of data between a memory device associated with the multipurpose processor and a memory device associated with the array processor. In some calculations further improvements in processing speed are possible by permitting more than two processors to operate concurrently on separable portions of the problem. For example, if a computation involves multiplying a three dimensional array by a two dimensional array, a separate array processor can be provided to concurrently perform the multiplication for each dimension of the array, thereby permitting multiplication of the three dimensional array in the time required to multiply only a single dimension.

The improvements in computation speed afforded through the use of parallel processing devices have been limited by the bus systems used to transfer data between processors. In the past, concurrent processors have typically been interconnected by a linear parallel bus wherein memory devices associated with each processor have been connected to separate nodes of the bus. When data from any one processor memory is placed on the bus, the data is transmitted simultaneously to every other node. Every node is assigned a unique address and a sending node suitably adds a node address to the data being sent. Each receiving node then includes means for recognizing its own address and passes the data on to its associated processing device on recognition of that address. The speed of such a linear parallel bus system is limited because only one processor can transmit data on the bus at any given time. This system does allow every processor to receive data on the bus in the instance when the interfacing equipment at each node is capable cf recognizing a universal "broadcast" address, but such a broadcast mode of operation has limited usefulness inasmuch as computations do not always require identical data to be sent to every processor in the system.

Ring buses provide some improvement over parallel buses by allowing more than one processor to transmit data at any one time. In a ring bus system, the bus nodes are arranged in a loop wherein each node is connected to its two nearest neighbors through separate, one-way buses. Data on the ring bus passes from node to node in synchronous fashion according to a system clock signal, with each node passing incoming data either to a processor associated with that node, or on to the next node on the loop. A node can also receive data from its associated processor and transmit it to the nearest neighbor node.

Each node in a ring bus system is assigned a unique address, with the data carried on the bus including the address of the node which is to receive the data. If a given node receives data addressed to another node, it passes the data to the next node on the next system clock cycle, but if a node receives data addressed to that node, the data is transmitted to the associated processor. The node may place new data from its associated processor on the bus by transmitting it to its nearest neighbor. Thus more than one processor may place data on the ring bus at any given time whereby the ring bus generally permits more efficient use of the bus bandwidth than a linear parallel bus system. However, since each node can only receive or pass on data, but not both, only one processor can receive any given data transmission on the bus.

What is needed and would be desirable is a bus system permitting simultaneous data transfer between a plurality of concurrently operating data processing devices, allowing many processors to transmit data simultaneously, while permitting any processor to transmit the same data to any other processor or selected group of processors.

SUMMARY OF THE INVENTION

According to one aspect of the invention, a bus system for providing data communication between a plurality of concurrently operating digital devices, such as microcomputers, array processors, random access memories or the like, includes a set of interface units or "nodes" connected in series by a set of local interface buses, one such node corresponding to each such device. Each node is connected to two nearest neighbor nodes through bidirectional local interface buses, and to its corresponding digital device through an input/output (I/0) bus. Each node is adapted to selectively forward incoming data on the I/0 bus from its corresponding digital device to either or both of its nearest neighbor nodes over two local interface buses. Each node is also adapted to selectively forward incoming data arriving from one nearest neighbor node on either local interface bus to the digital device over the I/0 bus, or to the other nearest neighbor node over a local interface bus. Thus data may be transmitted along the system bus from node to node in either direction with each node selectively forwarding incoming data received to the associated digital device or to the next node, or both. Bidirectionality of the local interface buses permits more efficient use of the bus system than is typically possible in a conventional ring bus because the opportunity for nearest neighbor transactions is increased.

According to another aspect of the invention, the bus system permits sequences of data words to be transferred from one digital device to another simultaneously. Each data word transmission includes a "data" field, containing the data being transferred from one digital device to another at a different location on the system bus, along with an "identification" field indicating the particular sequence with which the data word is associated. This aspect of the invention permits one memory device on the system bus to receive data transfer sequences from a plurality of other devices on the system simultaneously, in interleaved fashion, without requiring the completion of one sequence transmission before the initiation of another.

According to another aspect of the invention, each data word transmitted on the system bus also includes a "distance" field indicating the number of nodes through which the data is to travel in its current direction on the system bus. If the distance field contains a number larger than zero, a node receiving the data word decrements the distance field by one and forwards the data word to the next node. If the distance field contains a zero, the node may transmit the data to its corresponding memory device. The distance field thus comprises a relative node address, rather than an absolute node address, and therefore all nodes on the system bus can be identical since no unique circuits are required in each node to recognize a unique absolute node address.

According to a further aspect of the invention, the bus system is provided with means to read and write access random access memories associated with digital devices connected to the node. Each node stores a set of memory addresses, each stored address representing the last memory address at which a word of a corresponding data sequence was read or written, and each node includes means for checking the identification field of an incoming data word to determine the particular data sequence to which an incoming or outgoing data word belongs. Each node also has means for incrementing the stored address associated with the sequence by a selected amount and means for reading or writing the data at the incremented memory address in the device accessed through the node. This feature permits rapid transfer of long data sequences between the node and the device it services.

According to another aspect of the invention, each node contains a programmable "broadcast" table wherein each possible value in the identification field of an incoming data word having a zero distance field is assigned selected "forwarding" identification and distance fields for selectively replacing the incoming identification and distance fields. By appropriately preprogramming the broadcast tables in each node, a data word transmitted over the system bus by any one device connected thereto may be received by any selected group of other devices on the bus, thereby permitting one processor to write data to a plurality of memory devices on the system bus with only a single data transmission. Use of the broadcast table in conjunction with relative addressing also permits a large number of devices to be interconnected by the system bus, even though the distance field is limited, since broadcast tables at selected nodes can be used to forward data through large numbers of intermediate nodes.

According to another aspect of the invention, the forwarding and addressing tables on any node may be preloaded with data by messages transmitted from any device on the system bus. This aspect of the invention allows any processor connected to a bus node to control the operation of any node on the bus, thereby permitting unintelligent devices, such as bare random access memories, incapable capable of controlling node operations, to be accessed through the bus.

It is accordingly an object of the invention to provide a new and improved bus system for providing high speed direct memory access communication between concurrently operating processors and data storage devices employing a relatively small amount of interconnecting circuitry.

It is another object of the invention to provide such new and improved bus system permitting simultaneous transmission and reception of direct memory data sequences by a plurality of such processors and storage devices.

It is still another object of the invention to provide such a new and improved bus system wherein all devices on the bus are connected to the bus through identically configured interface devices.

It is a further object of the invention to provide such new and improved bus system wherein the number of individually accessible devices on the bus is not limited by absolute addressing constraints.

It is a still further object of the invention to provide such new and improved bus system wherein data forwarding and device access anywhere along the bus may be controlled by any processor connected to the bus.

The subject matter of the present invention is particularly pointed out and distinctly claimed in the concluding portion of this specification. However, both the organization and method of operation of the invention, together with further advantages and objects thereof, may best be understood by reference to the following description taken in connection with accompanying drawings wherein like reference characters refer to like elements.

DESCRIPTION OF THE DRAWINGS

FIGS. 14A–14I depict the bit arrangement of various data words transmitted to and from the interface unit of FIG. 4;

DETAILED DESCRIPTION

Bus System

Figure 1A:
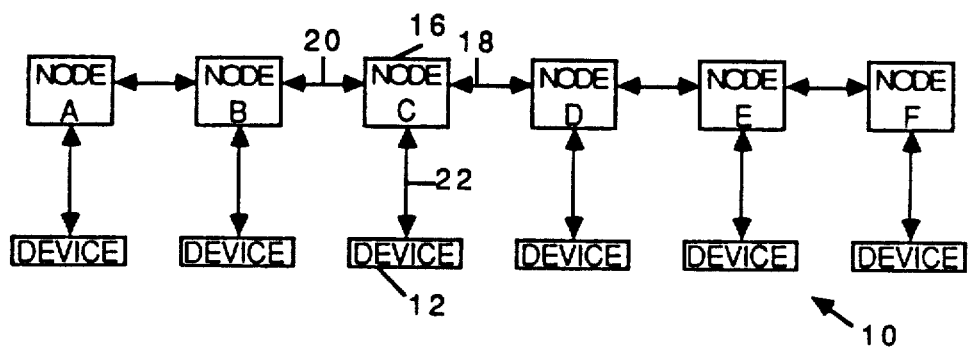
FIG. 1A is a block diagram of a system employing a linear nearest neighbor interconnect bus systems according to the present invention.

Referring to FIG. 1A a parallel processing system, depicted in block diagram form, employs a linear nearest-neighbor interconnect system bus 10 according to the present invention, adapted to provide communication between concurrently operating digital devices 12 such as multipurpose processors, array processors, random access memories, or the like.

The system bus 10 comprises a set of interconnect circuits, "nodes" 16, one such node corresponding to each device 12. In the example of FIG. 1A, the system 10 includes six nodes labeled A through F, although the bus system of the present invention may include other numbers of nodes. The nodes are interconnected in a linear fashion with each node being connected only to its two nearest neighbor nodes through bidirectional right and left local interconnect buses 18 and 20, and to its associated processing device through an input/output (I/0) bus 22. The buses are bidirectional in the sense that data can leave or enter a node on any of the three separate buses and each node 16 is adapted to selectively forward data incoming on any one bus outwardly on either one or both of the other buses.

Figure 1B:
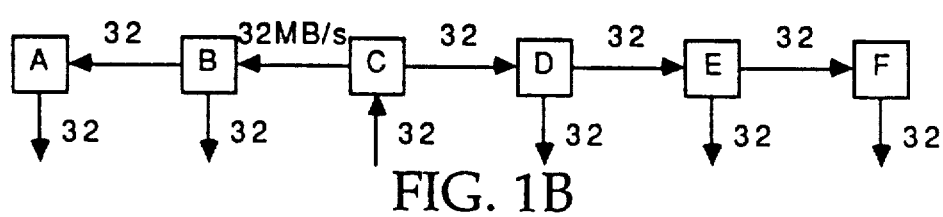
FIGS. 1B–1E are diagrams of the data flow patterns through the system of FIG. 1A during selected data transfer operations.

In the preferred embodiment, data may be transmitted over any bus at the rate of 32 Megabytes per second (Mb/s). FIGS. 1B-1E depict the data flows resulting from various types of data transfers, the arrows representing data flow direction and the numbers next to each arrow indicating the data flow rate in Mb/s. FIG. 1B depicts a "broadcast" data transfer wherein one device 12 on the bus transmits the same data to each of several other devices on the bus. In the example of FIG. 1B, the device at node C simultaneously transmits a data word sequence to every one of the other devices on the system. The data enters node C from the device at the rate of 32 Mb/s and is transmitted outwardly along the local interconnect buses at the same rate. In this example data transfer is highly efficient because all of the local interconnect buses are operating at full capacity.

Figure 1C:
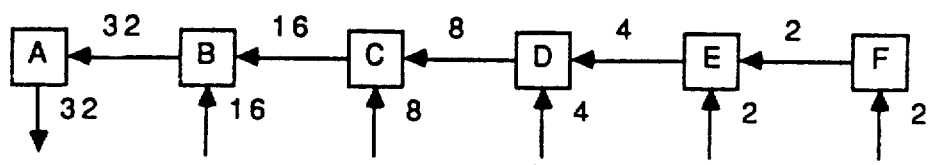

FIG. 1C depicts a "collection" type data transfer where the device at node A is receiving data from devices at every other node. Node A receives data from node B at the rate of 32 Mb/s. Node B must arbitrate competing requirements for transfer to node A of incoming data from the device at node B and from node C. Node B arbitrates the competing requirements by alternately forwarding data from its I/0 bus and right local interconnect bus to the its left local interconnect bus. Thus the node B I/0 and right local interconnect buses both supply data to the left interconnect bus at the rate of 16 Mb/s each. Similarly, node C must service competing data transfer requirements from its I/0 and right local interconnect buses. Since the rate at which its left local interconnect bus can accept data is limited to 16 Mb/s by node B, node C permits alternate forwarding of data from its I/0 and right interconnect buses at the rate of 8 Mb/s each. A similar arbitration processes occurs within nodes D, E and F.

Figure 1D:
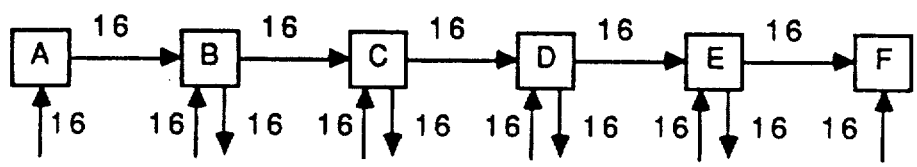

A pipeline transfer is depicted in FIG. 1D wherein data from each device is passed to the right along the bus to the next device. Node B, for example, must service competing data transfer requests over its I/0 bus to its associated device 12 and arbitration circuits in node B resolve the conflict by alternately transmitting data to and receiving data from device 12. Since the maximum data transfer rate over the I/0 bus is 32 Mb/s, data is transmitted from device 12 to node B to over its I/0 bus at the rate of 16 Mb/s and is transmitted from node B to each memory device 12 also at the rate of 16 Mb/s. Since the data transmission rate of the right local interconnect bus is limited to 16 Mb/s by node B, data can enter node A on its I/0 bus and pass to node B only at the rate of 16 Mb/s. A similar restriction on the data flow rate through node F results from the transmission rate restriction on its left local interconnect bus by node E.

Figure 1E:
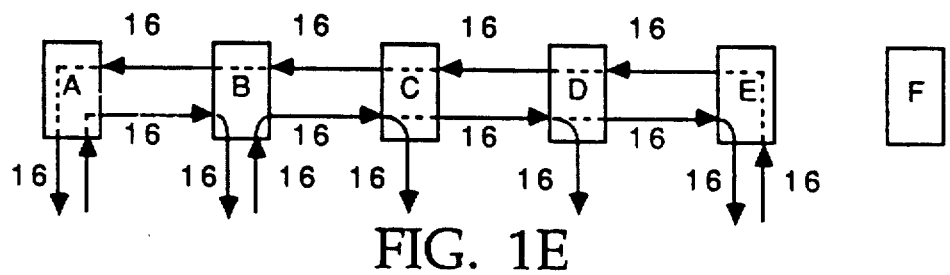

A mixture of different tpes of data transmission is depicted in FIG. 1E. A first data sequence is being transmitted from the device at node E to the device at node A, while a second data sequence is transmitted from the device at node A to the device at node E. The device at node B transmits a third data sequence to the device at node C and also to devices at nodes D and E using a broadcast type transfer. Node E alternately transmits and receives data words of the first and third data sequences from and to its associated device at the rate of 16 Mb/s each. Node B arbitrates incoming and outgoing data transmission requirements by receiving the incoming first sequence at the rate of 16 Mb/s and transmitting the outgoing third data sequence at the same rate.

The data transmission patterns in the examples of FIGS. 1B-E all arise because each node arbitrates competing data transmissions over the three buses by alternately forwarding them. The arbitration circuits of nearest neighbor nodes communicate with one another through interconnecting control wiring to coordinate the transmitting and receiving of data over the common local interconnect buses.

Bus Node

Figure 2:
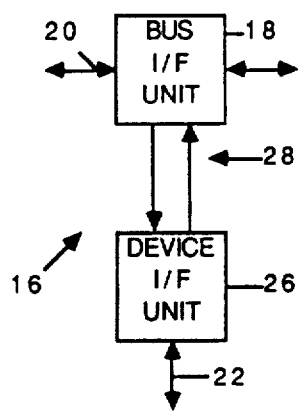
FIG. 2 is a block diagram of one node of the system of FIG. 1A.

Referring to FIG. 2, depicting in block diagram form a single node 16 of the system bus 10 of FIG. 1A, such node 16 comprises a bus interface (I/F) unit 24 and a device interface unit 26. The right and left local interconnect buses terminate on the bus I/F unit 24 while the I/0 bus 22 is applied to the device interface unit 26. The device interface unit may be mounted in close proximity to the memory device accessed by the I/0 bus 22 while the I/F unit 24 may be remotely located. An intermediate bus 28 is adapted to provide a communication path between the separated units.

Bus Interface Unit

Figure 3:
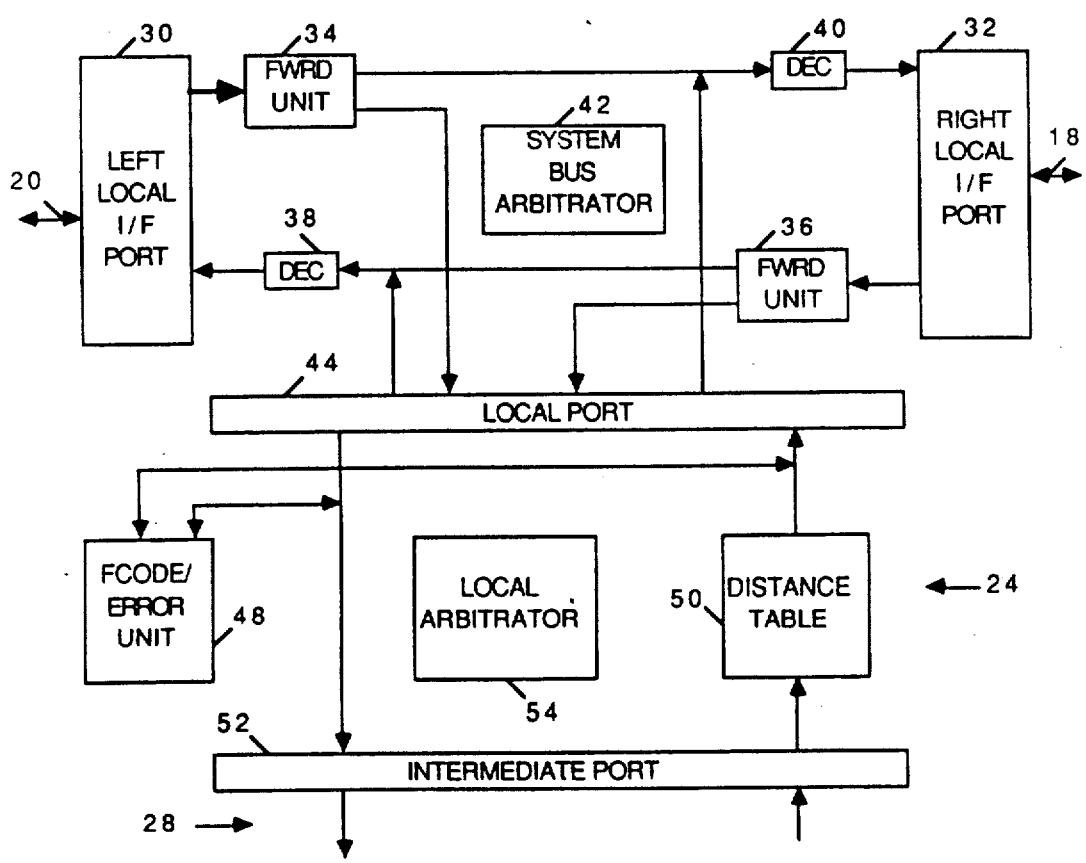
FIG. 3 is a block diagram of the bus interface unit of FIG. 2.

Referring to FIG. 3, the bus interface unit 24 of FIG. 2, depicted in block diagram form, includes left and right local interface bus ports 30 and 32, left and right forwarding units 34 and 36, left and right decrementing units 38 and 40, a system bus arbitrator 42, and a local port 44. Incoming data on left local interconnect bus 20 is routed through the left port 30 to forwarding unit 34. The data may be selectively forwarded by the forwarding unit 34 to the local port 44, to the right port 32 (through decrementing unit 40), or to both ports 32 and 44. Similarly, incoming data on right local interconnect bus 18 is routed through the right port 32 to forwarding unit 36 and then selectively forwarded to the local port 44, to the left port 30 (through decrementing unit 38) or to both ports 30 and 44. Incoming data from local port 44 may be selectively routed to either one or both of the left and right ports through decrementing units 38 and 36 respectively. System bus arbitrator 42 provides signal flow control for data passing between the right, left and local ports.

The bus interface unit 24 of FIG. 3 also includes an Fcode/error unit 48, a distance table 50, an intermediate bus port 52 and a local arbitrator 54. Intermediate port 52 provides buffering and assembly for incoming and outgoing data on the intermediate bus 28. Data entering local port 44 from the left or right ports 30 or 32 may be forwarded either to the intermediate bus 28 through intermediate port 52 or to Fcode/error unit 48. Incoming data on the intermediate bus 28 may be sent to the left or right ports through the local port 44, through distance table 50, may be sent to the Fcode/error unit 48, or may be sent back to the intermediate port through the Fcode/error unit 48. Finally data originating in the Fcode/error unit 48 may be routed to either the left or right ports through local port 44 or to the intermediate bus through port 52. Arbitration unit 54 provides signal flow control for signals passing between the local port 44, the Fcode/error unit 48, and the intermediate port 52.

Three types of data transfers over bus system 10 are possible: direct memory access (DMA) transfers, an Fcode transfer, or a message transfer. In a DMA transfer, data is read out of a random access memory of one device 12 connected to the system bus, transmitted over the system bus, and then written into the memory of another device on the bus. In a typical Fcode type data transfer, a processing device having access to the bus at one node seeking to read or modify the contents of selected register or RAM location within a selected node sends an Fcode transfer through the bus to the selected node. The receiving node then writes data carried in the Fcode message into the selected register or RAM storage location or reads the contents of the register or table storage location and transmits the data back to the processor or some other designated location. In a typical message type transfer, data is passed over the system bus directly from one processor or node to another and is not read from or written to a memory device associated with the processor as in a DMA type data transfer.

In the preferred embodiment of the present invention, the local interconnect buses 18 and 20 each carry 44 bit data words arranged in four fields; a six-bit distance field, a four-bit identification field, a 32-bit data field and a two-bit parity field. One bit of the parity field indicates the parity of the distance and identification fields in combination, while the other bit of the parity field indicates the parity of the data field. The four-bit identification field indicates the type of data transfer. A 0000 identification field indicates a message transfer while a 1111 (hexadecimal F) indicates an Fcode transfer. Any other code in the identification field (i.e. 00011110) indicates that the data transfer is one of fourteen separately identifiable DMA transfers. The six-bit distance field indicates the relative location of the node to receive the data in terms of the number of nodes in the direction of data transmission from the node currently receiving the data. The format of the 32-bit data field varies depending on the type of data transfer and is explained in detail hereinbelow.

Referring again to FIG. 3, after a data word arrives at the bus interface unit 24, for instance over the left local interconnect bus 20, it is stored in the left port 30. The incoming data word is then transmitted to forwarding unit 34. Forwarding unit 34 further transmits the incoming data word to an input of local port 44 and checks the distance field to see if it is 000000. If not, the forwarding unit also passes the data to decrementing unit 40 which decrements the distance field by one and passes the data on to an input at right port 32. The right port 32 then forwards the data to the next node over left local interconnect bus 18.

If the distance field of data received by forwarding unit 34 is 000000, then forwarding unit 34 applies the identification field of the incoming data word to an internal, programmable "broadcast" table containing two bits associated with each incoming identification field indicating whether the data is intended for the local port 44 or the right port 32 or both. If the data is intended to be passed on to the right port 32, the broadcast table replaces the incoming 000000 distance field and the incoming identification field with stored forwarding distance and identification fields and the forwarding unit 34 transmits the incoming data field, along with the new forwarding distance and identification fields to the right port 32 by way of decrementing unit 40. The decrementing unit also decrements the forwarding distance field by one. The right port 32 stores the data word and later transmits it to the next node over the right local I/F bus 18. If the incoming data is intended for receipt by the local node, or by the device serviced thereby, the incoming data word applied to the local port 44 is stored in the local port and subsequently passed either to the intermediate bus port 52 or to the Fcode/error unit 48 according to its intended destination. Data entering the node from the right local interconnect bus 18 is handled in a similar fashion, being transmitted to the local port 44 or the left port 30 through forwarding unit 36 which is similar to forwarding unit 34.

The use of the distance fields and the broadcast tables is discussed with reference to FIGS. 1A and 1B. For example, to perform a broadcast type DMA transfer, as illustrated in FIG. 1B, a broadcast table in for instance node D is preprogrammed by Fcode messages by any processor on the bus to indicate that a DMA type data transfer identified by a particular identification field and a 000000 distance field arriving at the right port is to be forwarded to the left port and also to the local port. The broadcast table in node D is also preprogrammed by Fcode messages to replace the 000000 incoming distance field with a 000001 forwarding distance field. The distance field of each of the broadcasted DMA data words originating in node C is initially set to 000001 and then decremented to 000000 by the right and left decrementing units of node C prior to being sent over the right and left local interface buses to nodes B and D.

After the data arrives at node D, the right forwarding unit of the node determines from the incoming identification field and 000000 distance field and from the preprogrammed instructions in the broadcast table therein that the data is to be forwarded to the next node E and is also to be sent to the local port. It also determines from the preprogrammed instructions in the broadcast table that it should change the distance field to 000001. The data then passes through the right decrementing unit, where the distance field is changed back to 000000 before being sent to node E.

The broadcast tables of one or more nodes can be skipped by setting the distance fields to a number larger than 000001. By selectively preprogramming the broadcast tables in a bus, data can be transmitted on the bus from one node for receipt by any selected subset of other nodes on the bus. Although it may seem time-consuming to preprogram a large number of broadcast tables prior to transferring a data word from one memory device to another through the bus, in many applications DMA sequences of several hundred or thousand data words are transferred, and it is necessary to preprogram the broadcast tables only once before the first word is transferred. The time required to set up the broadcast tables for a particular DMA transfer is therefore only a small portion of the total time required for a DMA transfer. Use of the broadcast tables also enables the system bus to include a larger number of nodes than would otherwise be permitted by the size of the distance field since forwarding nodes may be placed at selected locations along the bus, with the broadcast tables therein being programmed to forward data to more distant nodes.

As mentioned hereinabove, the identification field is four bits long. A 0000 identification field value indicates a message type transfer while a 1111 (F) identification field value indicates an Fcode type transfer. The other fourteen possible identification field values (I-E) are used to distinguish between different DMA transfers. When a node receives data with a 000000 distance field and a DMA type identification, it uses the broadcast table to determine what to do with the data based on the value of the identification field. Thus the four-bit identification field allows each node to be preprogrammed to identify and forward up to fourteen different incoming DMA transfers from each direction on the bus during the same general time period.

DMA, message and Fcode type transmissions from the device interface unit to the intermediate port may arrive as either "type A" or "type B" transfers. Referring to FIG. 3, type A data transfers enter the intermediate bus port 52 from the intermediate bus 28 having data and identification fields but not having a distance field. This type of data transfer is thereafter transmitted from the intermediate port 52 to a programmable distance table 50 which associates forwarding identification and distance fields and a two-bit direction field with each incoming identification field and transmits the forwarding fields, along with the incoming data field, to the local port 44. Type B data transmission arriving at the intermediate bus port 52 already contain distance, identification, direction and data fields when they arrive at the intermediate bus port and are routed from the intermediate port 52 without acquiring forwarding distance, identification, or direction fields in the distance table. The distance, identification and data fields of transmission to be sent to distant nodes are forwarded through the local port 44 either to the left or to the right port 30 or 32 (or both) through the decrementing units 30 and 40 according to bit states of the direction field.

The use of the distance table 50 in forwarding DMA type data transfers permits a reduction in the amount of information carried on the intermediate bus 28 when transmitting data from the adaptor unit 26 to the interface unit 24, since the distance table obviates the need for a distance field in the incoming data. The distance table 50 also translates between incoming and forwarding identification fields. Since each possible DMA transfer identification code (I-E) represents a separate DMA transfer sequence being written to a memory device, the identification field permits the node to keep track of up to fourteen different DMA data sequences arriving on the system bus, making sure that each incoming DMA word is stored in the appropriate DMA sequence storage location in the memory device being accessed.

Data may be written to or read from distance table 50 and the broadcast tables in forwarding units 34 and 36 through Fcode transfers arriving at the interface unit 24 from any processing device over any bus 18, 20 or 28 and transmitted to the Fcode/error unit 48. The 32-bit data field of an Fcode message includes a single-bit read/write indicating field, a 15-bit register select field, and a 16-bit field which contains either data to be written into a selected register or table entry in the node or information identifying the node to receive the results of a register read operation caused by the Fcode. When the Fcode/error unit receives a write type Fcode transfer, it modifies the contents of a selected register or table entry. When it receives a read type Fcode transfer, the Fcode unit reads the contents of a selected register or a selected table entry and returns the data in a message to a processor at a selected node.

The Fcode/error unit 48 also receives error signals from various sources, and intercepts transmissions which contain parity or other errors, and then transmits messages to a controlling processor serviced by the bus advising the processor of the nature of the error.

Bus Interface Unit

Figure 4:
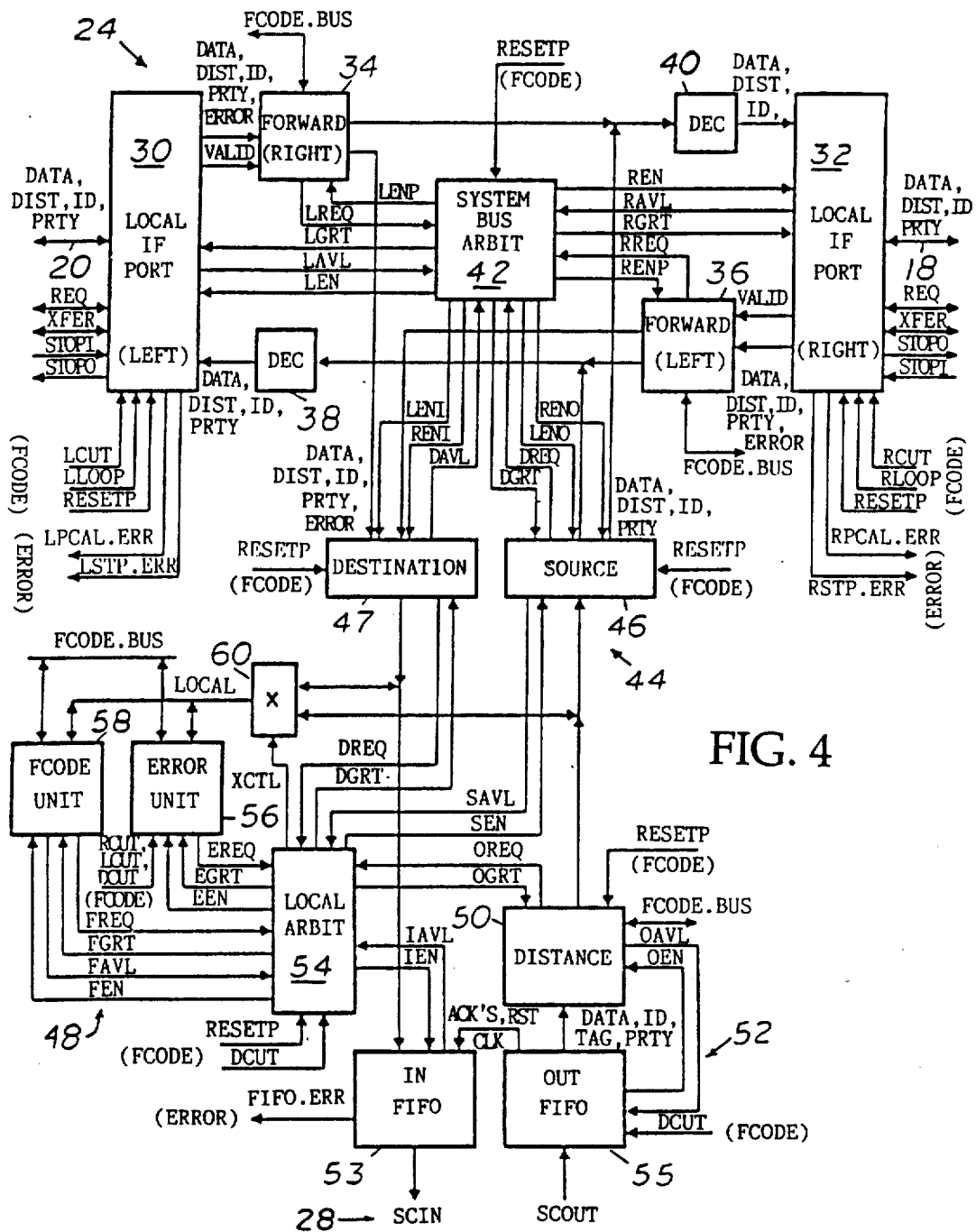
FIG. 4 is a more detailed block diagram of the bus interface unit of FIG. 3.

Referring now to FIG. 4, the bus interface unit 24 of FIG. 2 is depicted in more detailed block diagram form, including in particular the various signal flow control signal interfaces between the arbitrator units 42 and 54 and other blocks of the interface unit, along with local interface bus control signal connections between the node and its right and left nearest neighbor nodes. Local port 44 comprises a source unit 46 and a destination unit 47; the Fcode/error unit 48, comprises an Fcode unit 58, an error unit 56 and a cross-connect ("X") unit 60; and the intermediate port 52 comprises an "in fifo" unit 53 and an "out fifo" unit 55.

Data passes between the node and its left nearest neighbor node over bi-directional local interface bus 20 connected to left port 30 and between the node and its right nearest neighbor over bidirectional local interface bus 18 connected to local port 32. Data arrives at local interface unit 24 from the device interface unit 26 of FIG. 2 over a uni-directional "SCout" portion of the intermediate bus 28 and is stored in the out fifo unit 55. Data to be transmitted from the local interface unit 24 to the device interface unit is first stored by in fifo unit 53 and then transmitted over a uni-directional "SCin" portion of the intermediate bus 28 to the device interface controller.

The local interface buses 18 and 20 are bidirectional, but data can be sent over these buses in only one direction at a time. The local ports on either end of a local interface bus may each be in either "send" or "receive" modes. Initially, when the bus system is first powered up, the Fcode unit 58 of every node transmits a resetp signal to the left and right local ports 30 and 32 placing every port on the bus in the receive mode. When data from the device accessing the system bus through one node is subsequently stored in, for instance, the left local port 30, for further transmission along the bus in the leftward direction, the left port enters the send mode on the next bus clock cycle, while the opposing port of the left nearest neighbor remains in the receive mode. The left port then transmits the data to the neighbor port. As long as the opposing port does not have data to send in the opposite direction, and as long as the left port continues to receive data from the right port 32 or from the local port 44, the left port continues to send data to the opposing port on every bus clock cycle.

A set of four control lines connected between the local interface port and its opposing nearest neighbor port coordinates data flow on the local interface bus. A bi-directional "xfer" line is pulled low by either opposing port when the port is currently sending data to the other port. A bidirectional "req" line is pulled low by a port currently in the receive mode when it has data to send to the opposing port. Each port pulls low a uni-directional "stopo" line to the opposing port when it can no longer accept data input from the opposing port. The stopo output of one port comprises a "stopi" input of the opposing port. When a port currently in a send mode detects that the opposing port has asserted (pulled low) the req signal, it switches to the receive mode on the next bus clock cycle while the opposing port switches to the send mode. Thus as long as each opposing port has data to transmit to the other, the transmission direction alternates on each bus clock cycle. However, if one port is unable to accept more data from its opposing port, it continues to remain in the send mode on every clock cycle and asserts the stopo signal ignoring the req signal from the opposing port, causing the opposing port to remain in the receive mode until such time as the port asserting the stopo signal can accept more data from the opposing port.

When the left local port 30 has received data from its nearest neighbor port over local interface bus 20, it stores the data in an internal pipe register. The longest stored incoming data is transmitted to forwarding unit 34 along with a "valid" signal indicating that it has transmitted valid data to the forwarding unit. Forwarding unit 34 then determines whether the incoming distance field is larger than 000000. If so, the forwarding unit transmits a two-bit request signal "lreq" to the system bus arbitrator 42 telling the arbitrator that it has data to forward to the right local port 32. Whenever the right port is able to receive data from the left or local port, it transmits an available signal (ravl) to the arbitrator and when the arbitrator determines that the data can be transmitted to the right port 32, it transmits an output enabling signal to the forwarding unit 34 causing it to forward the incoming data, distance, and identification fields through decrementing unit 40 to the right port 32. The decrementing unit decrements the distance field by 1. Arbitrator 42 then transmits an input enabling signal (ren) to the right port 32 causing it to store the data for subsequent transmittal to the next port over local interface bus 18. The system bus arbitrator 42 also transmits a grant signal (lgrt) to the left port 30, indicating that the data has been forwarded. The left port then clears this data from its internal pipe register and shifts the remaining data forward in the pipe register transmitting the next longest stored data therein, if any, to the forwarding unit 34. The system bus arbitrator controls the passage of data from the right port to the left port in a similar fashion.

When an incoming distance field is 000000, the forwarding unit 34 supplies a new forwarding distance and identification field from an internal broadcast table and determines whether the data is to be forwarded to the next node, is to be received locally, or both. If the data is to be forwarded to the next node, the forwarding unit 34 transmits the appropriate lreq signal to the system arbitrator 42 which then uses the lenp and ren enabling signals to forward the data, distance and identification fields from the forwarding unit to the right port 32, when the lreq and ravl signals indicate that the data can be forwarded. The forwarded distance and identification fields are provided by the broadcast table in forwarding unit 34, and the incoming distance and identification fields from the left port 30 are abandoned.

When the incoming distance field of data from left port 30 is 000000 and the forwarding unit 34 determines from data stored in the broadcast table that the incoming data from left port 30 is intended to be received locally, forwarding unit 34 transmits a differently encoded lreq signal to arbitrator 42. Destination unit 47 sends an available signal (davl) to the arbitrator 42 whenever it can accept data from the left or right ports 30 or 32. When the lreq signal indicates that data is to be sent to the destination unit 47, and the davl signal indicates that the destination unit can receive the data, the arbitrator 42 transmits a left input enable signal (len) to the destination unit, causing it to store the distance, data, identification, parity and error fields from the forwarding unit 34 in an internal "left side" pipe register. The arbitrator 47 then transmits the lgrt signal to the left port 30 permitting it to shift forward its internal pipe register. Data transmission from right port 32 to the destination unit 47 is handled in a similar fashion except that the incoming data is stored in a different "right side" pipe register in the destination unit on receipt of a right input enable signal (reni) from the system arbitrator 42.

The data from the left or right port stored longest in the left or right side pipe register in destination unit 47 is applied to inputs of in fifo unit 53 and X unit 60. The destination unit checks the error field of the data for error codes and transmits a two-bit request signal (dreq) to local arbitrator 54 indicating the data is to be forwarded to the error unit 56 if an error code is detected. If no error code is detected, the destination unit checks the identification field to see if the data is an Fcode and also checks a portion of the data field to determine if the Fcode is intended for the Fcode unit 58 or is intended for another Fcode unit in the device interface unit 26 of FIG. 2. If the data comprises an Fcode intended for Fcode unit 58, the destination unit 47 transmits the dreq signal to the local arbitrator 54 encoded to indicate that the data is to be forwarded to the code unit 58. If the data in destination unit 47 is not intended for the Fcode unit 58 and the error field indicates no error, the dreq signal to arbitrator 54 is encoded to tell the arbitrator to forward the data to in fifo unit 53 for subsequent transmission to the device interface unit.

If the error field of the incoming data indicates an error, the local arbitrator 54 immediately transmits an enabling signal (xctl) to X unit 60 causing the data in destination unit 47 to be transmitted to the error unit 56. If the data is intended for the Fcode unit 58, the arbitrator 54 waits until the Fcode unit transmits an available signal (favl) to the arbitrator, indicating that the Fcode unit can accept a new Fcode input, and then transmits an appropriate xctl signal to the X unit 60. The X unit then transfers the data to the Fcode unit. The arbitrator 54 also transmits an input enable signal (fen) to the Fcode unit, causing it to acquire the incoming Fcode data. If the data in the destination unit is to go to the device interface unit via the in fifo unit 53, the local arbitrator 54 waits until it detects an available signal (iavl) from the in fifo unit and then transmits an input enable signal (ien) to the in fifo unit causing it to store the data from the destination unit. Once the data has been forwarded to the appropriate unit, local arbitrator 54 transmits a grant signal (dgrt) to the destination unit 47, causing the destination unit to shift the data out of its internal pipe register.

Data arriving from the device interface unit 26 of FIG. 2 via the SCout lines of the intermediate bus 28, is stored in out fifo unit 55 of intermediate port 52. Out fifo unit 55 contains a 64-stage, first-in, first-out buffer for receiving high speed transmissions from another fifo unit at the other end of the SCout lines in the device interface unit. The fifo unit 55 receives data at the intermediate bus 28 clock rate, and forwards the data to the distance unit 50 at a slower, system bus clock rate. Whenever out fifo unit 55 transmits a data word to distance unit 50, the out fifo unit transmits an acknowledge signal back to the sending fifo buffer in the device interface unit via in fifo unit 53 and SCin bus 28. The sending fifo buffer maintains a count of the number of data words sent to the out fifo unit 55, decrementing the count whenever the out fifo unit sends an acknowledge signal. When the count reaches 64, out fifo buffer 55 is full and the sending unit stops sending data until it receives an acknowledge signal indicating that the out fifo has emptied a stage by sending data to the distance unit.

When the distance unit 50 can accept data from the out fifo unit 55, it transmits an available (oav) signal to the out fifo unit. If the out fifo unit 55 then has data to send to the distance unit 50, it transmits an input enable signal (oen) to the distance unit causing it to store the current output of the out fifo unit. The out fifo unit then shifts the data out of its 64-stage fifo buffer and transmits the acknowledge signal back to the sending fifo buffer in the device interface unit.

Distance unit 50 organizes the data received from out fifo unit 55 into the distance, data, identification and parity field format utilized by the system bus and determines whether the incoming data is intended to be transmitted to a distant node via source unit 46, to the Fcode unit 58, to the error unit 56, or to the in fifo unit 53. The distance unit 50 also determines from the identification field whether the forwarding identification and distance fields are to be provided by its internal distance table and adds the forwarding fields if necessary. The distance unit 50 transmits a three-bit request signal (oreq) to the local arbitrator 54 indicating the forwarding destination of the data currently stored in the distance unit. If the data in distance unit 50 is to go to the Fcode unit 58, the error unit 56, or the in fifo unit 53, the oreq signal to the local arbitrator 54 is set accordingly and the arbitrator initiates the appropriate enabling signals (xctl, een or fen) to effectuate the data transfer. If the data is to go to the source unit 46 for further transmission to a distant node via right or left ports 32 or 30, the arbitrator waits until it receives an available signal (savl) from the source unit indicating that it can accept the data. Arbitrator 54 then transmits an input enable signal (sen) to the source unit 46, causing it to store the data from distance unit 50, and also transmits a grant signal (ogrt) to the distance unit indicating the transfer is complete.

The source unit 46 has an internal "left" pipe register for receiving data to be sent to the left port, and an internal "right" pipe register for receiving data to be sent to the right port. The distance unit 50 transmits data to both pipe registers in source unit 46 at the same time, regardless of the forwarding direction, along with a two-bit direction field indicating whether the data is to be sent to the left or the right or both. When source unit 46 contains data to be forwarded, it transmits a two-bit request signal (dreq) to the system bus arbitrator 42 indicating whether the data is to go to the left, right or both directions according to the direction field provided by the distance unit. When the bus arbitrator receives the appropriate available signal (lavl, ravl, or both) from the left port 30 or right port 32, it output enables the appropriate left or right pipe register in source unit 46 using left or right enable signals (leno or reno) and input enables the left port 30 or right port 32 using the len or ren signals, thereby effectuating the transfer of data from the source unit 46 to the left or right port. When the transfer is complete, the arbitrator 42 transmits a grant signal (dgrt) to the source unit to shift the data out of the pipe registers.

The Fcode unit 58 can also send messages to distant nodes via source unit 46, or to the device interface unit via in fifo 53, by first transmitting an appropriately coded request signal (freq) to the local arbitrator 54. When the local arbitrator 54 detects the appropriate available signal (savl or iavl) from the source unit 46 or the in fifo unit 53, it transmits an appropriately encoded xctl signal to the X unit 60 to route the data from the Fcode unit 58 to the source unit 46 or to the in fifo unit 53. The local arbitrator then input enables the source unit 46 using the sen signal or the in fifo unit using the ien signal. The arbitrator 54 then transmits a grant signal (fgrt) to the Fcode unit output enabling the Fcode unit to effectuate the transfer.

The error unit 56 can also send messages to distant nodes via source unit 46 or to the device serviced by the device interface unit via in fifo 53 by first transmitting an appropriately coded request signal (ereq) to the local arbitrator 54. When the arbitrator detects the appropriate available signal (savl or iavl) from the source unit 46 or the in fifo unit 53, it transmits an input enable signal (een) to the error unit 56 and an appropriate xctl signal to the X unit 60 to route the data from the error unit 56 to the source unit 46 or to the in fifo unit 53 and input enables the source unit, using the sen signal, or the in fifo unit, using the ien signal, to effectuate the data transfer. The arbitrator 54 then transmits a grant signal (egrt) to the error unit to output enable the error unit.

When the node is the last node on the left end of the system bus, the Fcode unit is normally programmed to continuously transmit an "lcut" signal to the left port 30. If the left port then inadvertently receives forwarded data to the left local interface bus 20, it sets a bit in the error field, transmitted to the destination unit 47 via the forwarding unit 34, to indicate a "cut" error. Destination unit 47 then diverts the incoming data to the error unit. Similarly the Fcode unit 58 sends an "rcut" signal to the right port 32 if the node is the last node on the right end of the system bus or is otherwise not to communicate with the node to the right.

The Fcode unit 58 may also be programmed to place the left port in a "loop" mode by continuously transmitting a "lloop" signal to the port. In this mode data sent to the output register in left port 30 is forwarded back into the incoming data pipe register of the same port rather than to the nearest neighbor port to the left. The right port 32 can also be placed in the loop mode by an "rloop" signal from the Fcode unit. The loop mode is typically used to test the system bus by transmitting data from one end of the bus to a far end and back again, the far end node being placed in the loop mode. Data arriving intact at the transmitting end indicates proper bus function. If no digital device 12 (of FIG. 1A) is serviced by the node, the Fcode unit may be programmed to continuously transmit a "dcut" signal to the out fifo unit 55 to prevent the out fifo unit from inadvertently enabling the distance unit 50. The dcut signal is also sent to the local arbitrator 54 to prevent the arbitrator from input enabling the in fifo unit 53. The lcut, dcut, and rcut signals from the Fcode unit are also transmitted to the error unit 56 for purposes discussed hereinbelow in conjunction with the operation of the error unit.

The Fcode unit generates a reset signal (resetp) when the system is first powered up. This signal is transmitted to the left and right ports 30 and 32, to the system bus arbitrator 42, to the source unit 46, the destination unit 47, local arbitrator 54 and distance unit 50 to reset flip-flops, registers and other storage devices in these units to initial conditions.

The left and right ports contain internal circuits which can determine if the port and its nearest neighbor are both inadvertently trying to send data to one another at the same time. If the left port 30 detects this situation, it transmits a protocol error (lpcal.err) signal to the error unit. Similarly, the right port 32 sends an "rpcal.err" signal to the error unit when it detects a protocol error. The left and right ports also contain circuits which can determine if the nearest neighbor port inadvertently sends data to the port while the port is transmitting the stopo signal. In such case the left or right port transmits an error signal (lstp.err or rstp.err) to the error unit 56.

Local Interface Port

Figure 5:
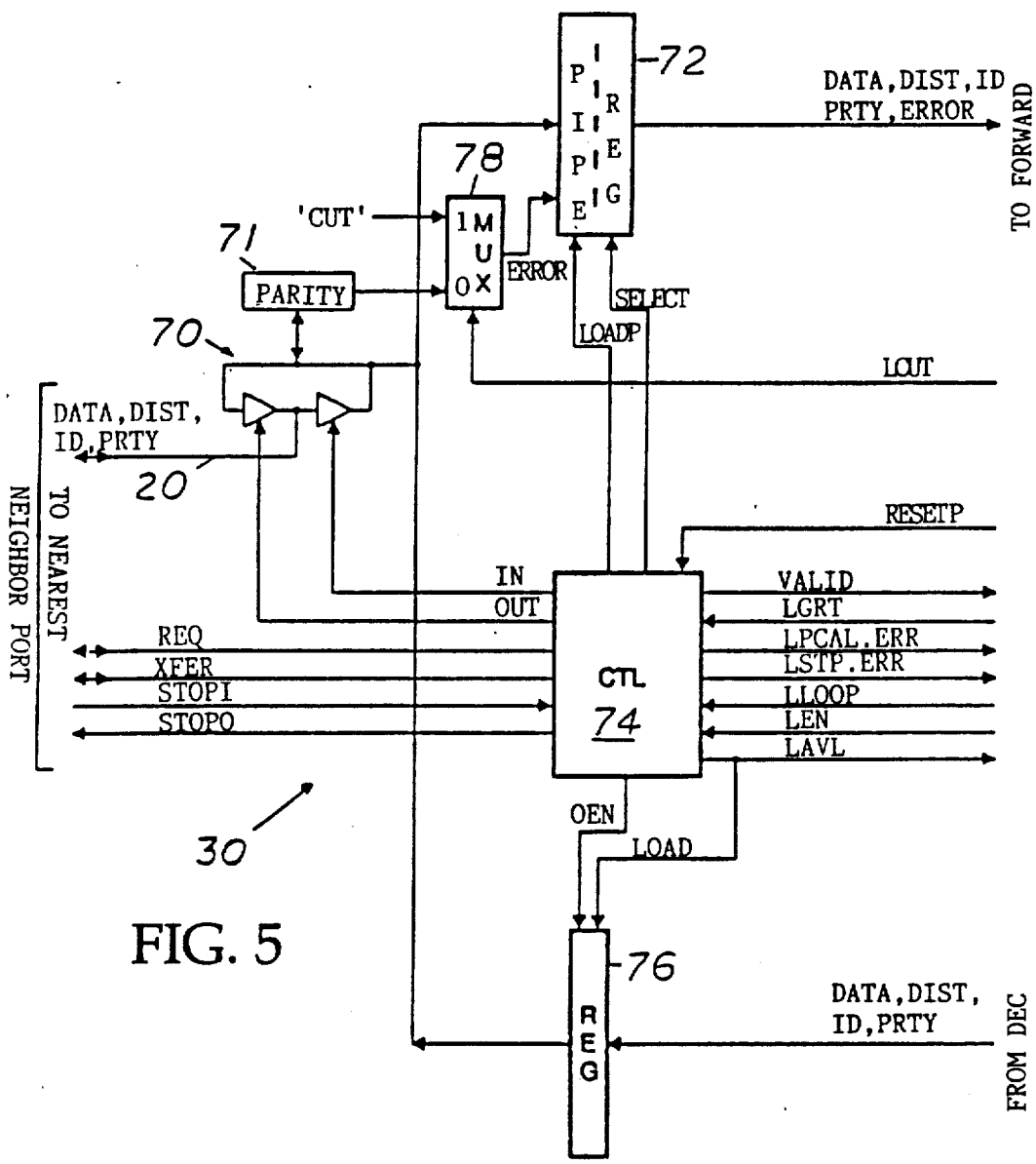
FIG. 5 is a combination block and schematic diagram of the left local interface bus port of FIG. 4.

The left and right local interface ports 30 and 32 are identical in internal configuration and only the left port will be described in detail. Referring to FIG. 5 the left local interface port 30, depicted in combination block and schematic diagram form, includes a bi-directional buffer circuit 70 connecting the local interconnect bus 20 to the node and a parity circuit 71 for checking the parity of the incoming data against the incoming parity field. On receipt of an enabling signal (in) from a control circuit 74, a buffer circuit 70 passes incoming data, including the distance, data, identification and parity fields to a two-stage pipe register 72. Register 72 stores the incoming data on receipt of an input enabling signal (loadp) from a control circuit 74. Data arriving from the decrementing unit is stored in an output register 76 on receipt of an input enabling signal (load) from the control circuit 74 and is subsequently transmitted outwardly on the local interconnect bus 20 through the buffer circuit 70 when register 76 receives an output enabling signal (oen) and when the buffer 70 receives an enabling signal (out) from the port control circuit 74.

A multiplexer circuit 78 transmits an error code field to the pipe register 72 at the same time the associated distance, data, identification and parity fields are transmitted from the buffer circuit 70. The multiplexer selects from among two possible input codes according to the state of the cut signal from the Fcode unit 58 at FIG. 4. One input is a parity error code generated by the parity circuit in buffer 70 and the other input is a preselected "cut" error code. The cut signal from the Fcode unit is asserted when the node is the last node on the system bus or is not otherwise to communicate with a nearest neighbor node to the left. Normally, if the node is on the end of the bus, no data is transferred into the node from the pipe register 72. If the port attempts to communicate with the nearest neighbor port, the "cut" code in the error field will flag the error. When the CUT signal is not asserted, the error field from the multiplexer 78 is loaded into the pipe register 72 with incoming data and the error field flags any parity errors discovered by the parity circuit 71.

The port control circuit 74 keeps track of the fill status of the two-stage pipe register 72 and of the output register 76 and also monitors the status of the req, xfer and stopi inputs from the neighbor port, the grt and en signals from the system bus arbitrator and the loop and resetp signals from the Fcode unit. Using the information conveyed by these signals, the control circuit 74 controls the in and out enabling signals to buffer 70, the oen and load signals applied to output register 70, and the loading of data into the pipe register buffer 72 using a loadp signal and a select signal. The state of the select signal determines which stage of the fifo buffer 72 receives the incoming data and which stage forwards the data into the node. The control circuit 74 also transmits the available signal (lavl) to the system bus arbitrator when the register 76 is not full, and transmits the valid signal to the forwarding unit when the pipe register 72 is not empty. The control circuit 74 generates the protocol error signal (pcal.err) when nearest neighbor ports try to send data to each other over the local interconnect bus at the same time and also generates the stp.err signal when the port inadvertently receives data from its nearest neighbor while transmitting a stopo signal.

The control circuit 74 also receives the "loop" signal (lloop) generated by the Fcode unit 58 of FIG. 4 during bus system tests when data is to be passed through register 76 to the pipe register 72 of the same port rather than outward on bus 20 to the pipe register of the nearest neighbor port. If the lloop signal is asserted while the register 76 is full, the port control circuit 74 waits until the pipe register 72 is not full and then initiates the output enable signal (oen) to the register 76 followed by an input on signal (loadp) to register 72, thereby effecting a loop-type data transfer.

Figure 6:
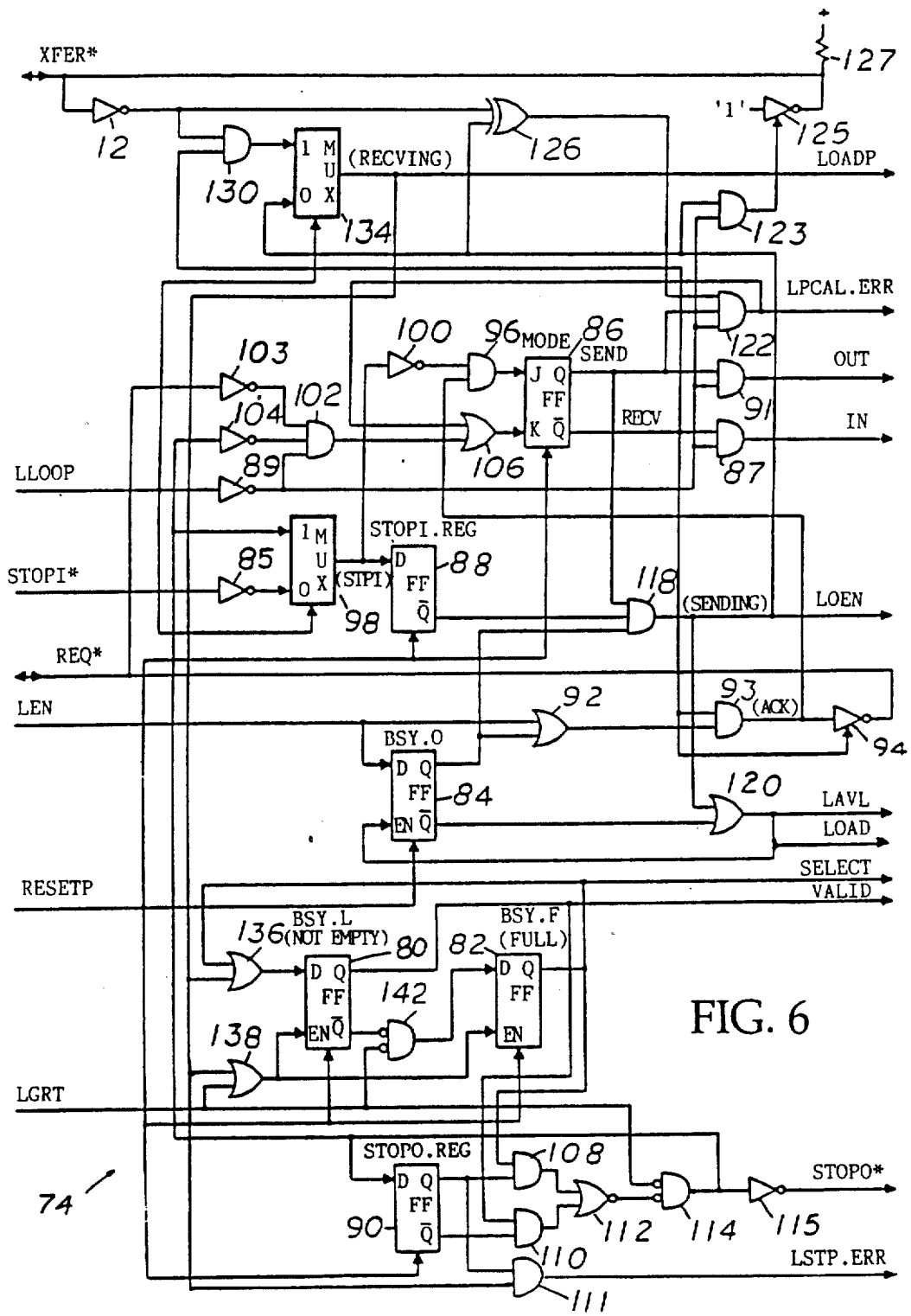
FIG. 6 is a schematic diagram of the control circuit of FIG. 5.

Referring to FIG. 6, the control circuit 74, depicted in circuit diagram form, comprises a set of six flip-flops. A D-type flip-flop 80 is set when the pipe register 72 of FIG. 5 is not empty, i.e., when it is currently storing one or two incoming data words in its two stages. Another D-type flip-flop 82 is set when the pipe register is full, i.e., when the pipe register is storing two data words. A third D-type flip-flop884 is set when data is present in the port output register 76 of FIG. 5. A JK-type flip-flop 86 is set when the port is in the send mode and reset when the port is in the receive mode. A fourth D-type flip-flop 88 maintains a one bus clock cycle history of the stopi control input, while another D-type flip-flop 90 maintains a one system clock cycle history of stopo control output.

When the bus system is initialized, a system reset signal (resetp) from the Fcode unit resets all of the flip-flops in the left and right ports of each node on the system bus. A port can receive, but not send, data over the local interface bus when it is in the receive mode. A port can send but not receive, data over the bus when it is in the send mode. When the mode control flip-flops 86 of each port are reset by the reset signal (resetp), each port enters into the receive mode by driving the −Q output of flip-flop 86 high. The −Q output of flip-flop 86 is applied to an input of an AND gate 87 while the loop signal input is inverted by an inverter 89 and applied to another input of AND gate 87. The output of AND gate 87 comprises the enabling signal (in) for buffer 70 of FIG. 5, input enabling the buffer when the port is in the receive mode but not in a loop mode. The −Q output of flip-flop 86, which is high when the port is in the send mode, is applied to one input of another AND gate 91 while the inverted loop signal from inverter 89 is applied to another input of the AND gate. The output of AND gate 91 is the enabling signal (out) applied to buffer 70 of FIG. 5 and output enables the buffer when the port is in the send mode but not in the loop mode. The −Q output of flip-flop 86 is also applied to an input of an AND gate 93 driving an inverting tri-state buffer 94 which pulls down the req signal to the neighbor port when the output of AND gate 93 is high. The −Q output of flip-flop 86 also enables buffer 94.

The input enable signal (len) from the bus arbitrator controls the D input of flip-flop 84 and the flip-flop is enabled by the register available signal (lavl). Thus the Q output of flip-flop 84 is set when the register has been loaded and is reset by the available signal (lavl) in the absence of an enable signal (len). The Q output of flip-flop 84 and the !en signal are applied to separate inputs of an OR gate 92 while the output of OR gate 92 is applied to a second input of AND gate 93. Thus the output of AND gate 93 will go high, driving the request signal (req) low, if the port is in the receive mode (i.e., flip-flop 86 is reset) and if data is currently stored in the output register of the port (i.e., flip-flop 84 is set). The output of AND gate 93 is also connected to an input of another AND gate 96. A multiplexer 98 has its switching state controlled by the lloop signal and when the port is not in the loop mode, the stopi signal, inverted by an inverter 85, is passed through the multiplexer 98, inverted again by an inverter 100 and applied to another input of AND gate 96. The inverse of the stopo output signal appearing at the output of an AND gate 114 is applied to another input of multiplexer 98 and, if the port is in the loop mode, the multiplexer 98 passes the inverted stopo signal input to inverter 100, rather than the inverted stopi signal input. The output of AND gate 96 drives the J input of flip-flop 86.

The req signal output of driver 94 is connected to an input of an AND gate 102 through an inverter 103, while the inverted stopo signal output of AND gate 114, inverted again by inverter 104 and the inverted loop signal output of inverter 89 are applied to other inputs of AND gate 102. The output of AND gate 102 and the output of an AND gate 122, the lpcal.err error signal, are applied as inputs to an OR gate 106 which drives the K input of flip-flop 86.

When the port is in the receive mode (i.e., the −Q output of flip-flop 86 is high) and the output register 76 of FIG. 5 contains data for transmission (i.e., the Q output of flip-flop 84 is high), the output of AND gate 93 is also high, driving the req line low through buffer 94. If the opposing nearest neighbor port has not asserted the stopi signal (or if this port has not asserted the stopo signal when in the loop mode), the output of AND gate 96 will be high, setting the flip-flop 86 on the next bus clock cycle, thereby placing the port in the send mode and driving the req signal high. When the req signal goes high, the K input to flip-flop 86 goes low. As long as the K input to flip-flop 86 stays low the port will remain in the send mode, but when the K input to flip-flop 86 goes high again the flip-flop will reset, placing the port back in the receive mode. The K input to the flip-flop 86 will go high if the neighbor port has data to send and drives the req signal low, provided this port is not asserting its stopo signal. The K input to flip-flop 86 will also go high if this port drives the req line low while in the loop mode, provided the stopo signal is not asserted. The K input will also go high on occurrence of a protocol error indicating that both ports are in the send mode at the same time. In any of these cases, the port switches from the send mode to the receive mode. Otherwise, if only one port has data to be transmitted, that port remains in the send mode until it detects a req signal from the neighbor port. When both ports have data to be transmitted over the local interconnect bus, the ports alternate sending and receiving.

The inverted stopo signal output of AND gate 114 is applied to the D input of flip-flop 90 so that the flip-flop stores the state of the stopo signal at the end of the last bus clock cycle, all flip-flops being clocked by a system bus clock (not shown). The Q output of flip-flop 90, along with the Q output of flip-flop 82 are applied as inputs to an AND gate 108, while the -Q output of flip-flop 82 and the Q output of flip-flop 80 are applied as inputs to another AND gate 110. The outputs of AND gates 108 and 110 drive inputs of NOR gate 112 and the output of a NOR gate 112 drives an inverting input of an AND gate 114. The grant signal (lgrt) from the system arbitrator is applied to another inverting input of AND gate 114. The output of AND gate 114 is inverted by an inverter 115 whose output provides the stopo signal. The output of AND gate 114 comprises the inverted stopo signal applied to the D input of flip-flop 90, to an input of multiplexer 98, and to inverter 103. Thus if stopo was asserted during a last bus system clock cycle, and the port's pipe register is currently full, then stopo is asserted (driven low) during this clock cycle. However, if the port is currently receiving a grant signal from the bus arbitrator, allowing the port to shift data out of the pipe register, the stopo signal is not asserted. Also if stopo was not asserted during the last bus clock cycle, and the pipe register is not empty, then stopo is asserted during the current cycle, in the absence of a grt signal from the bus arbitrator. Thus if the pipe register contains only one entry, stopo will be asserted during every other bus clock cycle until the other port sends data to fill the pipe register. When the pipe register is full, the stopo signal remains asserted during every bus clock cycle. When the fifo buffer is empty, the stopo signal is not asserted during any bus clock cycle.

The stopi signal, or the stopo signal if in the loop mode, is applied through multiplexer 98 to the D input of flip-flop 88 so that flip-flop 86 stores the state of the stopi signal during the last bus clock cycle. The $-Q$ output of flip-flop 88, along with the Q output of flip-flop 84 and the Q output of flip-flop 86 are connected to inputs of an AND gate 118, having an output driving an input of an OR gate 120. Another input of OR gate 120 is controlled by the $-Q$ output of flip-flop 84. The output of OR gate 120 comprises the available signal (lavl) transmitted to the system bus arbitrator to indicate that the output register of the port is able to accept new data. The lavl signal is generated by the port when the output register is empty (i.e., the $-Q$ output of flip-flop 84 is low) or if the port is in the send mode and the neighbor port has not asserted stopi or this port has not asserted stopo while in the loop mode. If the port is in the send mode, and the neighbor port is ready to receive data, the output register is emptied during the current bus clock cycle and will be ready to receive data on the next clock cycle. Therefore the lavl signal is initiated during the current cycle. The lavl signal is also transmitted as the load signal to output register 76 of FIG. 5, which loads whatever data appears at its input terminals when the lavl signal is high. When the control circuit receives a high input enable signal (len) from the system arbitrator, flip-flop 84 drives low the load signal output of OR gate 120, causing register 76 to retain the last data stored therein.

The xfer line from the nearest neighbor port is terminated by a resistor 127 connecting the line to a positive voltage source which pulls the line high when neither port is sending data. The output of an inverting tri-state buffer 125 is connected to the xfer line while the input of buffer 125 is connected to a high logic level source. Buffer 125 is enabled by the output of an AND gate 123 the inputs of which comprise the output of AND gate 118 and the inverted loop signal output of inverter 89. The output of AND gate 118 is high when the port is sending. Thus the xfer line is pulled down by buffer 125 when the port is sending data but is not in the loop mode.

The protocol error signal (pcal.err), indicating that both ports are attempting to send data over the local interconnect bus at the same time, is generated by an AND gate 122. The xfer signal is inverted by an inverter 124 and applied to an input of an XOR gate 126, while the output of AND gate 118, which is high when the port is sending, is applied to another input of the XOR gate. The loop signal from the Fcode unit, inverted by inverter 89, is applied to an input of AND gate 122, while the output of XOR gate 126 and the Q output of flip-flop 86 (indicating when the port is in the send mode) are applied to other inputs of the AND gate 122. The protocol error signal output of gate 122 is driven high if the port starts sending without asserting (driving low) the xfer signal. The protocol output signal is also driven high if the port enters the send mode while the xfer signal is low but the protocol error signal is disabled when the port is in the loop mode.

The inverted xfer signal output of inverter 124 is also connected to an input of an AND gate 130, while the $-Q$ output of flip-flop 84 is connected to another input of the AND gate 130. The output of AND gate 118 and the output of gate 130 are applied to separate inputs of a multiplexer 134 the switching state of which is controlled by the loop signal. The output of multiplexer 134 comprises the input enable signal (loadp) for the pipe register 72 of FIG. 5. Thus the loadp signal will be generated if the port is sending while in the loop mode, or if the port is not in the loop mode but is in the receive mode and the neighbor port is currently sending data.

The loadp signal output of multiplexer 134 is also applied to one input of an OR gate 136, and the Q output of flip-flop 82, indicating when the pipe register is full, is applied to another input of OR gate 136. The output of OR gate 136 drives the D input of flip-flop 80. Thus the D input of flip-flop 80 will go high if the pipe register is input enabled or if the pipe register is full. The loadp signal is also applied to one input of another OR gate 138, with the grant signal (lgrt) from the system arbitrator being applied to another input of OR gate 138. The output of the OR gate 138 drives an enable input of flip-flop 80, the flip-flop thereby being set by the grant signal if the pipe register is full or if a loadp enable occurs. The Q output of flip-flop 80, indicating that the pipe register is not empty, comprises the valid signal transmitted to the forwarding unit.

The $-Q$ output of flip-flop 80 is also applied to an inverting input of an AND gate 142, while the grant signal (lgrt) is applied to another inverting input of AND gate 142. The output of AND gate 142 drives the D input of flip-flop 82 and the output of OR gate 138 also drives an enable input of flip-flop 82. The D input of flip-flop 82 is therefore high when the port pipe register is not empty and the grant signal is not asserted. If the D input is high when the pipe register is loadp enabled, flip-flop 82 will set to indicate that the pipe register is full. The D input of flip-flop 82 will go low when a grant signal occurs, permitting data to be read out of the pipe register, and flip-flop 80 will be reset to indicate that the pipe register is no longer full.

The output of multiplexer 134 and the Q output of flip-flop 90 are connected to inputs of an AND gate 111, the output of which comprises the lstp.err signal. The output of multiplexer 134 is high when the port is receiving data and the output of flip-flop 90 is high for one bus clock cycle after the port has initiated a stopo signal. Thus the lstp.err signal to the error unit will be driven high when the port inadvertently receives data after having initiated the stopo signal.

Forwarding Unit

Figures 7, 9:
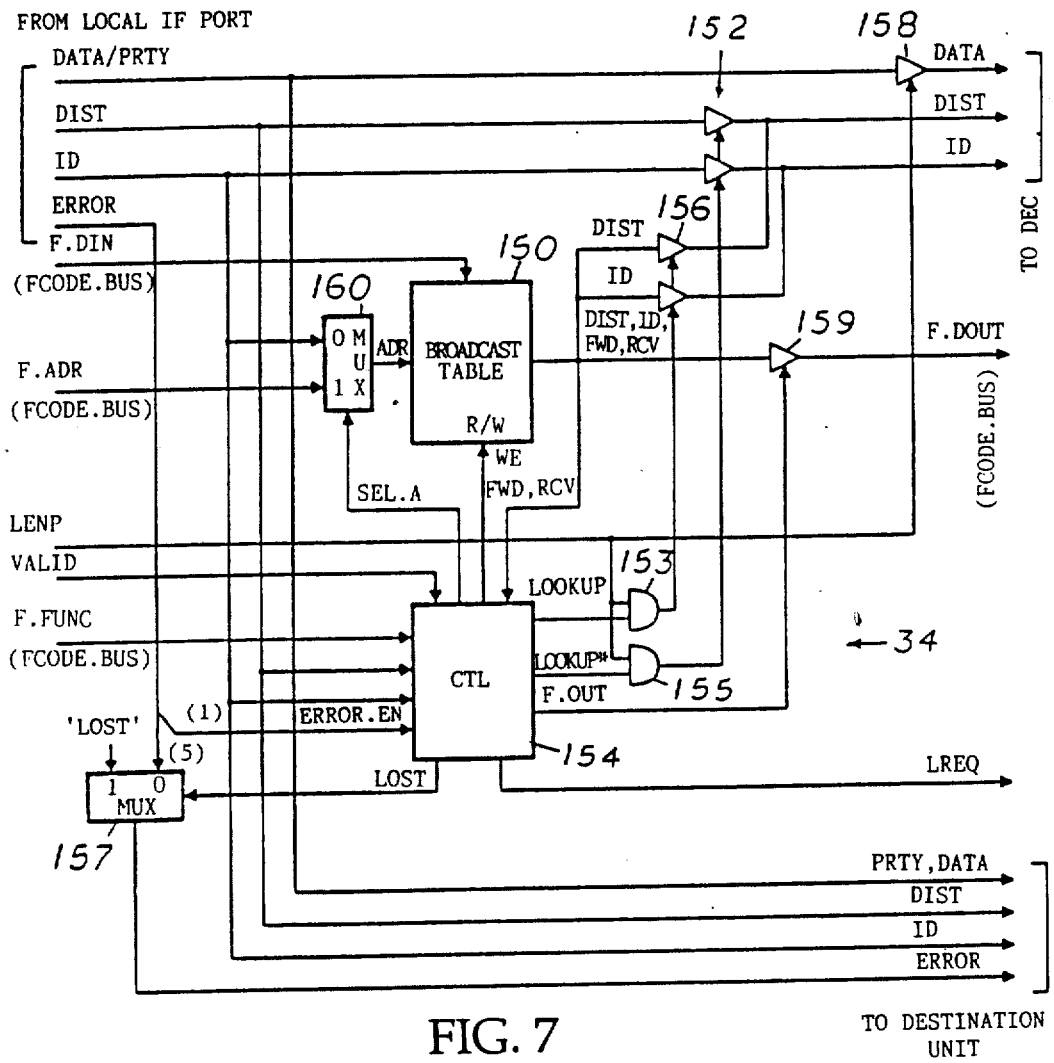
FIG. 7 is a combined block and schematic diagram of one forwarding circuit of FIG. 4.
FIG. 9 is a block diagram of one decrementing circuit of FIG. 4.

Referring to FIG. 7, the right forwarding unit 34 of FIG. 4 is depicted in more detailed block diagram form. The left forwarding unit 36 of FIG. 7 is similar and is not further detailed herein. The forwarding unit 34 includes a broadcast table 150, suitably comprising a random access memory or similar device capable of providing forwarding identification and distance fields in response to receipt of an incoming identification field. The incoming distance and identification fields from the left local port are applied to inputs of a set of tri-state buffers 152 while the incoming data field is applied to other tri-state buffers 158. The incoming distance, identification, parity and data fields are also routed through forwarding unit 34 directly to input terminals of the destination unit 47 of local port 44. The incoming identification field is further connected to an input of a multiplexer 160 while address lines (f.adr) of the Fcode bus from Fcode unit 56 are connected to another input of the multiplexer. Multiplexer 160 is switched by a select (sel.a) signal from control circuit 154. The output of the multiplexer 160 addresses broadcast table 150. The distance and identification fields are additionally applied as inputs to a control circuit 154.

The broadcast table 150 is addressed by an incoming identification field when multiplexer 160 passes the incoming identification field from left port 30 to address terminals of the broadcast table. Forwarding distance and identification fields are stored in broadcast table 150 at each address location corresponding to an incoming identification field. When the broadcast table is addressed by an incoming identification field, the forwarding distance and identification fields at the current address are read out and applied to inputs of a set of tri-state buffers 156. The forwarding distance and identification field outputs of buffers 156 are connected in common with the corresponding outputs of buffers 152 and, along with the data field output of buffers 158, are transmitted to the right port 32 of FIG. 4 by way of the decrementing unit 40 when buffers 152 and 158 are enabled. Alternatively, when buffers 156 and 158 are enabled, the forwarding distance and identification fields read out of broadcast table 150 are transmitted to the decrementing unit.

Buffers 156 are output enabled by a signal from an AND gate 153 while buffers 152 are output enabled by a signal from another AND gate 155. The enable signal (lenp) from the system bus arbitrator enables buffers 158 and also drives one input each of AND gates 153 and 155. A "lookup" signal from the control circuit 154 is applied to a second input of AND gate 153, and a "lookup*" signal of an opposite state is applied to a second input of AND gate 155. When the control circuit 154 detects a valid signal from the left port, indicating that valid data is being transmitted to the forwarding unit 34, the control circuit 154 checks the distance field to see if it is zero. If the incoming distance field is non-zero, indicating that incoming distance field is to be passed without modification, to the decrementing unit 40, control circuit 154 asserts the two-bit request signal (Ireq) to the arbitrator indicating that data is to be transmitted to the decrementing unit and also asserts the lookup* signal. When the system arbitrator subsequently asserts the enable signal (lenp), enabling buffers 158, the output of AND gate 155 goes high, enabling buffers 152. The incoming data, distance and identification fields are then passed on to the decrementing unit.

In addition to the forwarding identification and distance fields stored at each memory location of the broadcast table 150, the table also stores a two- bit indicating field including a "fwd" bit indicating whether the incoming data is to be forwarded to the right port and an "rcv" bit indicating whether the incoming data is to be received by the local port. If the incoming distance field is zero, and the fwd output bit stored in the distance table with the forwarding distance and identification fields indicates that the data is to be forwarded to the right port, control circuit 154 asserts the lookup signal and also an lreq signal to the system bus arbitrator indicating that data is to be passed to the right port. Then when the arbitrator asserts the lenp signal, the output of gate 153 goes high, buffers 156 and 158 are enabled, and the forwarding distance and identification fields, along with the incoming data fields, are passed to the decrementing unit.

If the distance field is zero and the rcv bit stored with the forwarding distance and identification fields indicates that incoming data is to be received by the destination unit 47, the control circuit 154 generates another lreq signal to the arbitrator. This tells the arbitrator that the forwarding unit contains data to be sent to the destination unit. When the destination unit is ready to receive data, the arbitrator input enables it and the data from the forwarding unit is stored therein. Thus, depending on the states of the fwd and rcv bits stored in broadcast table 150, incoming data having a zero distance field may be forwarded to the right port, to the destination unit, or to both locations.

One bit (error.en) of the error field from left port 30, which may indicate a parity or a cut error, is applied as an input to control circuit 154 and all bits of the error field are also applied to an input to a multiplexer 157. A "lost" code is applied as another input to multiplexer 157 and the error field output of multiplexer 157 is forwarded to the destination unit 47 along with the incoming data, parity, distance and identification fields. The switching state of multiplexer 157 is controlled by a "lost" signal from control circuit 154. The multiplexer is switched to pass the lost code as the error field to the destination unit 47 whenever data having a zero distance field is received and the control circuit determines that neither the fwd nor the rcv bits are set. This situation is considered to be an error since under normal circumstances at least one of the fwd and rcv bits will be set. When a lost error is detected, the control circuit 154 generates an lreq signal to the system arbitrator to indicate that data including the "lost" coded error field is to be stored in the destination unit. The lost field is later decoded in the error unit 58 and appropriate action taken. When no lost error occurs, multiplexer 157 is set to pass the error field from the left port on to the destination unit.

The data output terminals of broadcast table 150 are applied through a buffer 159 to data output lines (f.out) of the Fcode bus, buffer 159 being output enabled by an f.out signal from control circuit 154. Data input lines (f.din) of the Fcode bus are applied to the data input terminals of the broadcast table 150 while control lines (f.func) of the Fcode bus are applied as inputs to the control circuit 154. When multiplexer 160 is switched by the control circuit 154 in response to control commands from the Fcode bus, it connects the address lines of the Fcode bus to the addressing terminals of the broadcast table 150. The distance and identification fields at any address in broadcast table 150 may then be read or written by the Fcode unit according to the state of a write enable (we) signal from control circuit 154 to the read/write control input of the broadcast table.

Figure 8:
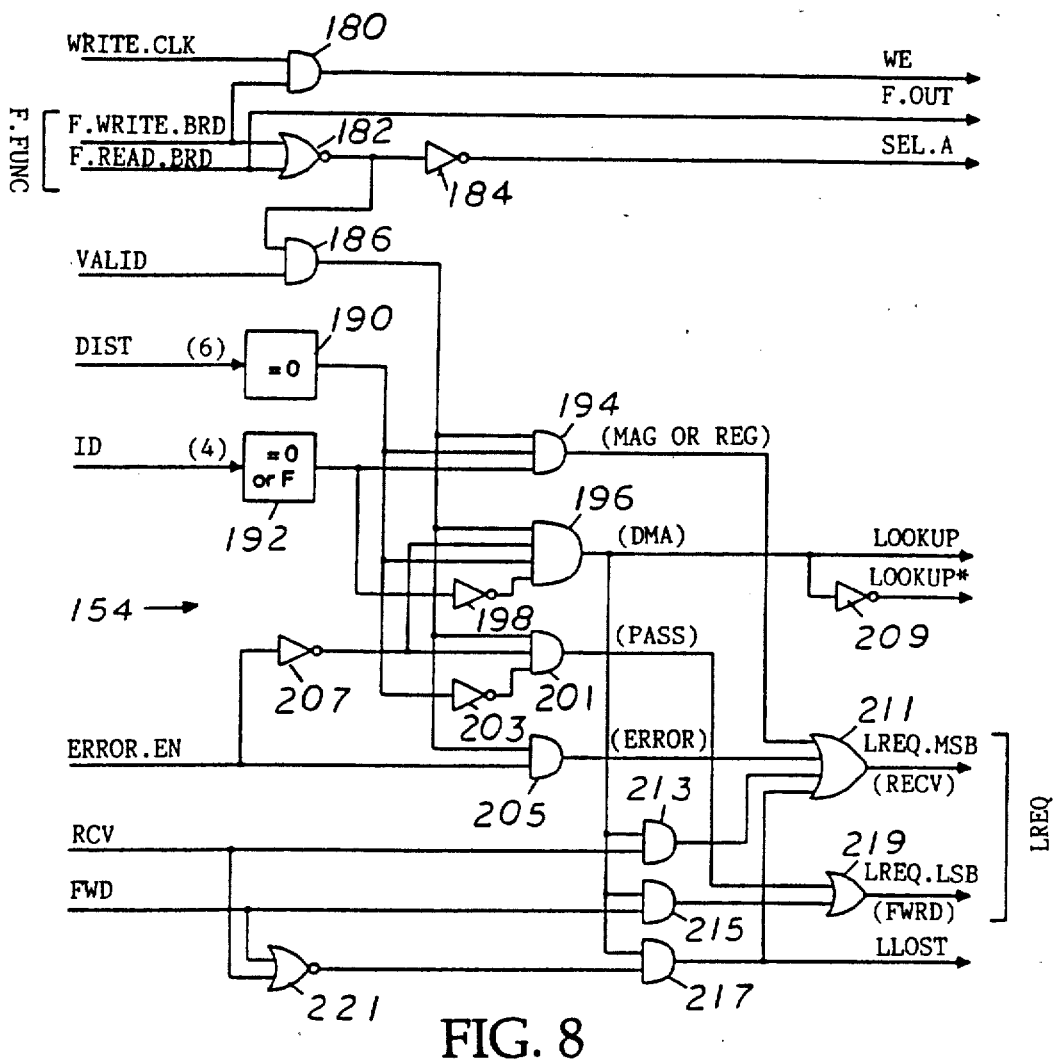
FIG. 8 is a schematic diagram of the control circuit block in FIG. 7.

The control circuit 154 of the forwarding unit 34 is depicted in more detailed block and schematic diagram form in FIG. 8. A write (f.write.brd) and a read (f.read.brd) control line of the Fcode bus are applied as inputs to a NOR gate 182 and the output of NOR gate 182, inverted by an inverter 184, comprises the sel.a signal to multiplexer 160. The read control line is also forwarded as the f.out signal to enable buffer 159 of FIG. 7. The write control line is applied as one input to an AND gate 180 while a clock signal (write.clk) is applied to another input of the AND gate. The output of AND gate 180 comprises the write enable signal (we) to the broadcast table 150 of FIG. 7. The output of NOR gate 182 is also connected to an input of an AND gate 186, and the valid signal from the left port 30 is connected to another input of gate 186. The output of AND gate 186 is therefore high when the port is transmitting valid data to the forwarding unit and the Fcode unit is not attempting to read or write data from or to the broadcast table.

The distance field is applied to another decoder 190 which outputs a high bit if the distance field is zero. The identification field is decoded by still another decoder 192 which outputs a high bit if the identification field indicates that the data is a message (a 0000 identification field) or an Fcode (a 1111 identification field) type transfer.

The outputs of decoder 190, AND gate 186 and decoder 192 are all connected to inputs of an AND gate 194. The output of AND gate 194, set high when a valid message or Fcode type transfer carries a 000000 distance field, is applied as an input to an OR gate 211. The output of OR gate 211 provides one bit (lreq.msb) of the lreq signal to the system bus arbitrator, which is set high when data is to be received by the destination unit. The outputs of the AND gate 186 and decoder 190, also drive inputs to an AND gate 196. The output of decoder 192, inverted by an inverter 198, drives another input to AND gate 196. The error.en bit of the incoming error field is inverted by an inverter 207 applied to a fourth input of gate 196. Thus the output of AND gate 196, the lookup signal output of the control circuit, is driven high when the data in the forwarding unit is part of a DMA transfer, has a 000000 distance field, and does not have an error field indicating an error has occurred, provided that the broadcast table is not currently being accessed by the Fcode unit. The lookup signal is inverted by an inverter 209 to produce the lookup* signal.

The output of AND gate 186, the output of inverter 207, and the output of distance field decoder 190, inverted by an inverter 203, provide inputs to another AND gate 201. The output of AND gate 201 is connected to an input of an OR gate 219. The output of OR gate 219 comprises another bit (lreq.lsb) of the lreq signal to the system bus arbitrator which is set when valid incoming data from the left port has a non-zero distance field and no error indicated by the error field. This bit tells the system arbitrator to forward the data to the right port.

The output of AND gate 186, and the error.en of the incoming distance field, are connected to inputs of an AND gate 205 having an output connected as another input to OR gate 211. The lreq.msb bit is thus also initiated if incoming data containing an error indication in the error field is currently in the forwarding unit. This bit tells the bus arbitrator to send the data including the error field to the destination unit of the local port for subsequent transfer to the error unit.

The rcv bit from the broadcast table, along with the output of AND gate 196, are applied as inputs to another AND gate 211, the output of which drives another input to OR gate 211. Thus the control circuit 154 also sets the lreq.msb bit when a high rcv bit is received as a result of a broadcast table lookup. The fwd bit from the broadcast table 150, along with the output from AND gate 196, drive inputs of an AND gate 215, the output of which provides another input to OR gate 219. Thus OR gate 219 also sets the lreq.lsb bit when a fwd bit is received as a result of a broadcast table lookup. The fwd and rcv bits also drive inputs of a NOR gate 221, and the output of the NOR gate, along with the output of AND gate 196, are applied as inputs to an AND gate 217. The output of AND gate 217, the lost control signal to error multiplexer 157, is also connected to one input of OR gate 211. Therefore, when neither a high rcv or fwd bit is returned as a result of a broadcast table lookup, the lost signal is generated to switch the state of multiplexer 157 and the lreq.lsb bit is set to ensure the data is sent to the destination unit 47 of FIG. 4 for forwarding to the error unit.

Decrementing Unit

The decrementing unit 40 of FIG. 4, depicted in FIG. 9, comprises an adder 162, having the distance field as one input and a binary −1 as another input such that the distance field output of the adder is less than the distance field input by one. The data, identification and the decremented distance fields are applied as inputs to a parity generator 161 which produces the appropriate two-bit parity field. The parity, distance, data, and identification fields are forwarded to the right port.

System Bus Arbitrator

Figure 10:
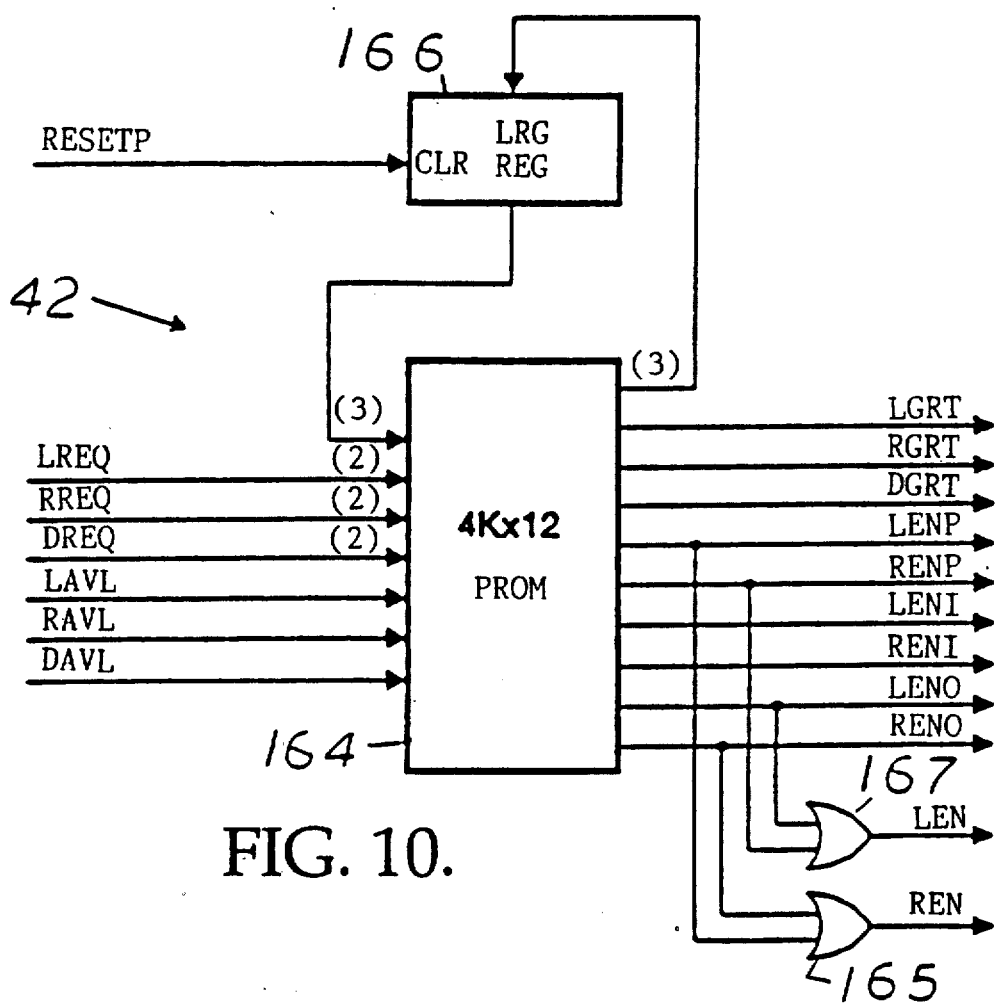
FIG. 10 is a block diagram of system bus arbitrator of FIG. 4.

The system bus arbitrator 42 of FIG. 4, depicted in more detailed block diagram form in FIG. 10, suitably comprises a state machine including an addressable memory such as programmable read only memory (PROM) 164 and a register 166 for storing three "least recently granted" (LRG) bits. The two-bit request signals and the single-bit available signals from each of the right, left and local ports and the three LRG bits stored in register 166 address the PROM 164 while all of the grant and enable signals to the ports (except the len and ren enable signals) and three "next least recently granted" (NLRG) bits, applied to the input of register 166, comprise the data output of the PROM 164. The lenp and reno enable signals are applied as inputs to an OR gate 165 which generates the ren enable. Similarly, the renp and leno enable signals are applied as inputs to an OR gate 167 which outputs the len enable signal. The len and ren signals could also be produced by PROM 164 but the use of OR gates 165 and 167 permits a reduction in the required size of the PROM.

By storing appropriate data in each addressable location of the PROM, a wide variety of arbitrating schemes can be implemented. In the preferred embodiment of the invention, the LRG bits stored in register 166 comprise an indexing field used to ensure that requests for data transfer by the left, right and local ports are arbitrated evenly. If, for instance, the left and right ports are both receiving continuous data sequences from their neighbor ports to be forwarded to the local port, while the local port does not have any data to send, then the left and right ports must compete for the use of the local port each cycle; the local port can only accept incoming data from one port during each bus clock cycle. Without the LRG field applied at the input of the PROM 164, the PROM would be identically addressed on each bus clock cycle and, accordingly, would output the same data on each bus clock cycle. Therefore the left or the right port would be granted access to the local port on every bus cycle while the other port would be denied access. With the LRG field applied to additionally address the PROM, eight different memory locations may be accessed for each possible set of req and available inputs. With the NLRG fields at each of the eight addresses differing from one another and set to point to different memory areas of PROM 164, the PROM can respond to up to eight consecutive identical req/available input patterns with up to eight different GRT and EN patterns which may be adjusted to ensure balanced arbitration.

The PROM is addressed and the data is stored in each address location of the arbitrator PROM according to the following formats:

| PROM address bits | PROM data bits |
|---|---|
| 0-2: LRG | 0-2: NLRG |
| 3: lreq.msb | 3: lgrt |
| 4: lreq.lsb | 4: rgrt |
| 5: rreq.msb | 5 dgrt |
| 6: rreq.lsb | 6 lenp |
| 7: dreq.msb | 7 renp |
| 8: dreq.lsb | 8 leni |
| 9: lavl | 9: reni |
| 10 ravl | 10: leno |
| 11: davl | 11: reno.1h12 |

Destination Unit

Figure 11:
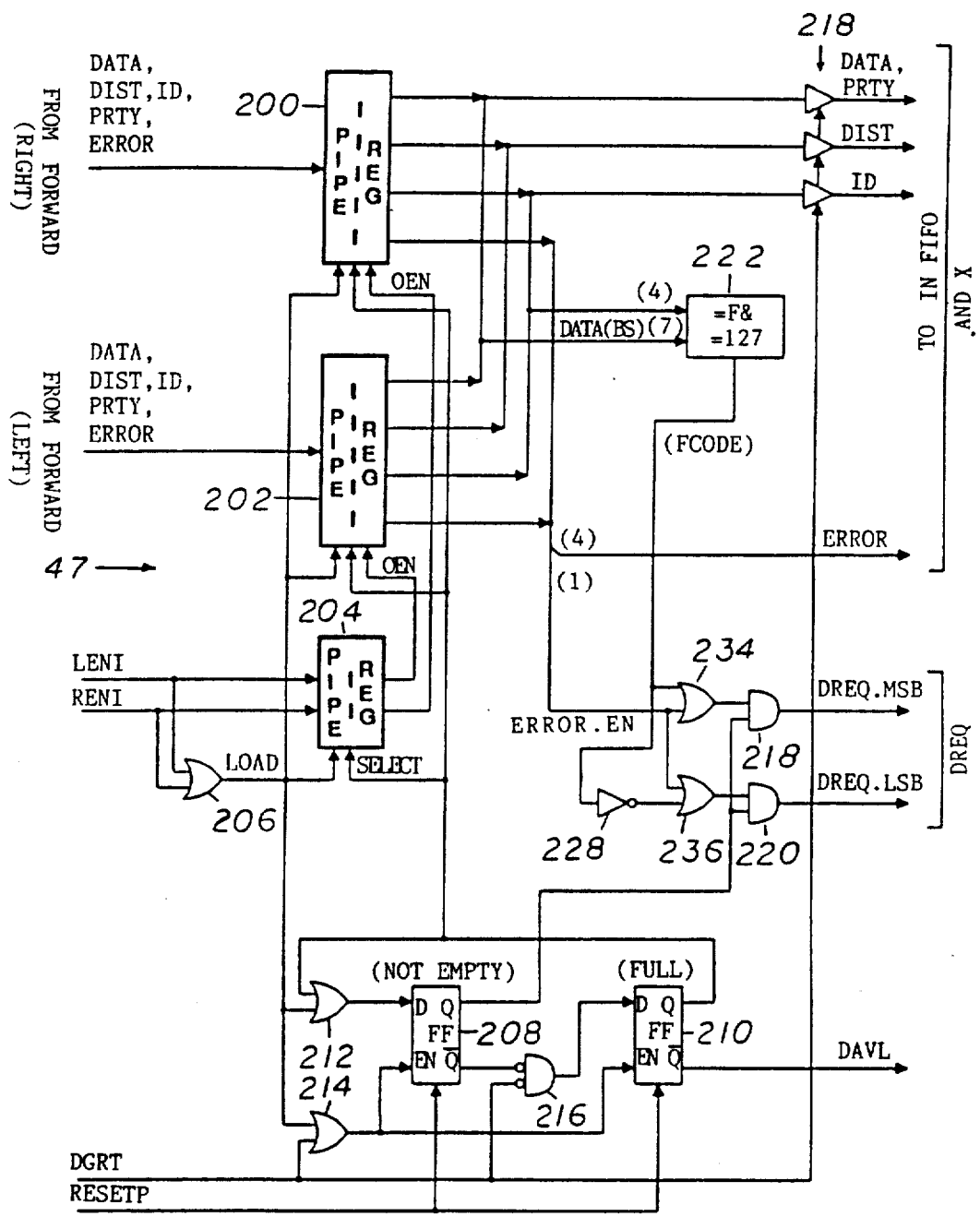
FIG. 11 is a schematic diagram of the destination unit of FIG. 4.

Referring to FIG. 11, the destination unit 47 of FIG. 4, depicted in more detailed block and schematic diagram form, comprises two-stage right and left side pipe registers 200 and 202 respectively, and a two-stage enable signal pipe register 204. Incoming data, distance, identification, parity and error fields from the right forwarding unit 34 are applied to input terminals of the left side pipe register 200, while similar fields from the left forwarding unit 36 are applied to input terminals of the right side pipe register 202. The left and right input enable signals (leni and reni) from the system bus arbitrator 42 are connected to the input terminals of the enable signal pipe register 204 and are also connected to inputs of an OR gate 206, the output of which, a load control input of each pipe register 200, 202 and 204. Thus when a left or right input enable signal is transmitted to the destination unit 47, all three registers load the data appearing at their input terminals.

The destination unit 47 also comprises a pair of D-type flip-flops 208 and 210. Flip-flop 208 is set when the pipe registers are not empty, i.e., when they contain either one or two sets of data. Flip-flop 210 is set when the pipe registers are full, each containing two sets of data. The load enable signal output of OR gate 206 drives inputs of an OR gate 212 and another OR gate 214. The grant signal (dgrt) from the system arbitrator 42 is connected to another input of OR gate 214 while the Q output of flip-flop 210 is connected to another input of OR gate 212. The output of gate 212 drives the D input of flip-flop 208, the output of gate 214 driving an enable input of both flip-flops 208 and 210. The −Q output of flip-flop 208 is applied to an inverting input of an AND gate 216 and the lgrt signal from local arbitrator 54 of FIG. 4 is applied to another inverting input of the AND gate. The output of AND gate 216 drives the D input of flip-flop 210. Flip-flop 208 is set by the high output of gate 212 whenever the destination unit 47 receives a left or a right input enable signal from the system bus arbitrator and is reset whenever the local arbitrator transmits a grant signal to the destination unit, provided the Q output of flip-flop 210 is low indicating that the pipe registers are not full. Flip-flop 210 is set by a high output of AND gate 216, indicating that the pipe registers are not empty and that no grant signal is currently being issued, whenever a new load signal is generated by OR gate 206 to enable flip-flop 210 through gate 214. Both flip-flops 208 and 210 are reset by the resetp signal from the local Fcode unit 56.

The −Q output of flip-flop 210, asserted when the pipe registers are not full, provides the available signal (davl) to the system bus arbitrator 42. The Q output of flip-flop 210 is applied to each pipe register 200, 202, and 204 to control which stage of the pipe register is to receive the next data to be loaded. Pipe register 204 is continuously output enabled, the longest stored left enable bit (leni) output enables the left pipe register 202 output, and the longest stored right enable (reni) bit output enables the right pipe register output 200. The corresponding data, parity, distance and identification field outputs of the right and left side pipe registers 200 and 202 are connected through a set of tristate buffers 218 to the in fifo unit 53 and to the X unit 60 of FIG. 4. The buffers 218 are enabled by the lgrt signal from local arbitrator 54.

The Q output of flip-flop 208 drives an input of an AND gate 218 and an input of another AND gate 220. The current identification field and a portion of the data field are driven by a decoder 222 which outputs a high bit if the identification field indicates that the current pipe register output data is an Fcode type transmission, provided the data field portion indicates the Fcode transmission is intended to access a register or table in the bus interface unit 24 rather than in the device interface unit 26 of FIG. 2.

The current error.en bit of the error field output of either pipe register 200 or 202 is applied as an input to an OR gate 234 along with the output of decoder 222. The decoder 222 output is high when the error field indicates an error condition or when the current data output of the pipe register is intended for the Fcode unit. The output of OR gate 234 is connected as an input to an AND aate 218 and the Q output of flip-flop 208 is connected to another input of AND gate 218.

The output of Fcode decoder 222, inverted by an inverter 228, and the error.en bit are applied as inputs to an OR gate 236, while the output of OR gate 236 is connected to an input of AND gate 220. The output of AND gate 218, one bit (dreq.ngb) of the two-bit dreq signal to the local arbitrator, is high if the current output of the pipe registers comprises either an Fcode transfer, intended to access registers or tables on the bus interface unit of this node, or any transfer containing an error indication in the error field. The output of AND gate 220, the other bit (dreq.lsb) of the dreq signal to the loyal arbitrator, is high when the current pipe register output is not an Fcode transmission directed to the Fcode unit 54 of the node nor is any transfer containing an error indication in the error field. If the outputs of both AND gates 218 and 220 are high, the transmission contains an error indication to be directed to the error unit 58 of the node. If the output of AND gate 218 is high, while the output of AND gate 220 is low, the current pipe register output is an Fcode to be directed to the Fcode unit 56 of the node. If the output of the AND gate 218 is low while the output of the AND gate 220 is high, the current pipe register output is a DMA transmission, a message, or an Fcode transmission to be directed to the device interface unit via the In fifo unit 53 of the node. Therefore outputs of AND gates 218 and 220 transmitted to the local arbitrator 52 indicate the presence and desired destination of data stored in the destination unit 47.

When the pipe registers 200, 202 and 204 are not full, flip-flop 210 transmits the available signal (davl) to the system arbitrator 42. When the system arbitrator receives the davl signal, along with a request signal from the right or left forwarding unit indicating that the forwarding unit has data to transmit to the destination unit, the arbitrator sets the appropriate left or right input enable signal (leni or reni) to a high state while maintaining the other enable signal at a low state. If the pipe registers are currently empty, high and low enabling signal bits are stored in pipe register 204 and immediately sent to output enable the appropriate left or right pipe register. The appropriate data, parity, distance, and identification output fields from the enabled pipe register are applied to the inputs of buffers 218. At the same time, the enable signals, acting through gates 206, 212 and 214, set flip-flop 208, the Q output of which enables AND gates 218 and 220 to transmit the appropriate request code to the local arbitrator 54. When the local arbitrator determines that the destination error unit 58, Fcode unit 56, or in fifo buffer 53 is ready to accept the data, it transmits the dgrt signal to the destination unit 47 to enable buffers 218, thereby transferring the out data. The grant signal also causes the flip-flop 208 to reset.

If the pipe registers already contain one data word which has not been forwarded to the in fifo unit or X unit of FIG. 4, an incoming enabling signal sets flip-flop 210, thereby changing the pipe register stage to receive incoming data from the right or left forwarding units. After the longest stored data in the pipe register is then transmitted to the appropriate destination, the select signal changes state and the second longest stored data is outputted from the pipe registers. If both pipe register locations are full, then the available signal (davl) from flip-flop 210 is low and the system arbitrator 42 refrains from input enabling the pipe registers until the available signal goes high again as a result of a grant signal from the local arbitrator. Thus the destination unit 47 acts as a buffer providing temporary storage of data from the right and left ports to the local port, error and Fcode units, and provides an interface point wherein control of data flow passes from the system arbitrator 42 to the local arbitrator 54.

Source Unit

Figure 12:
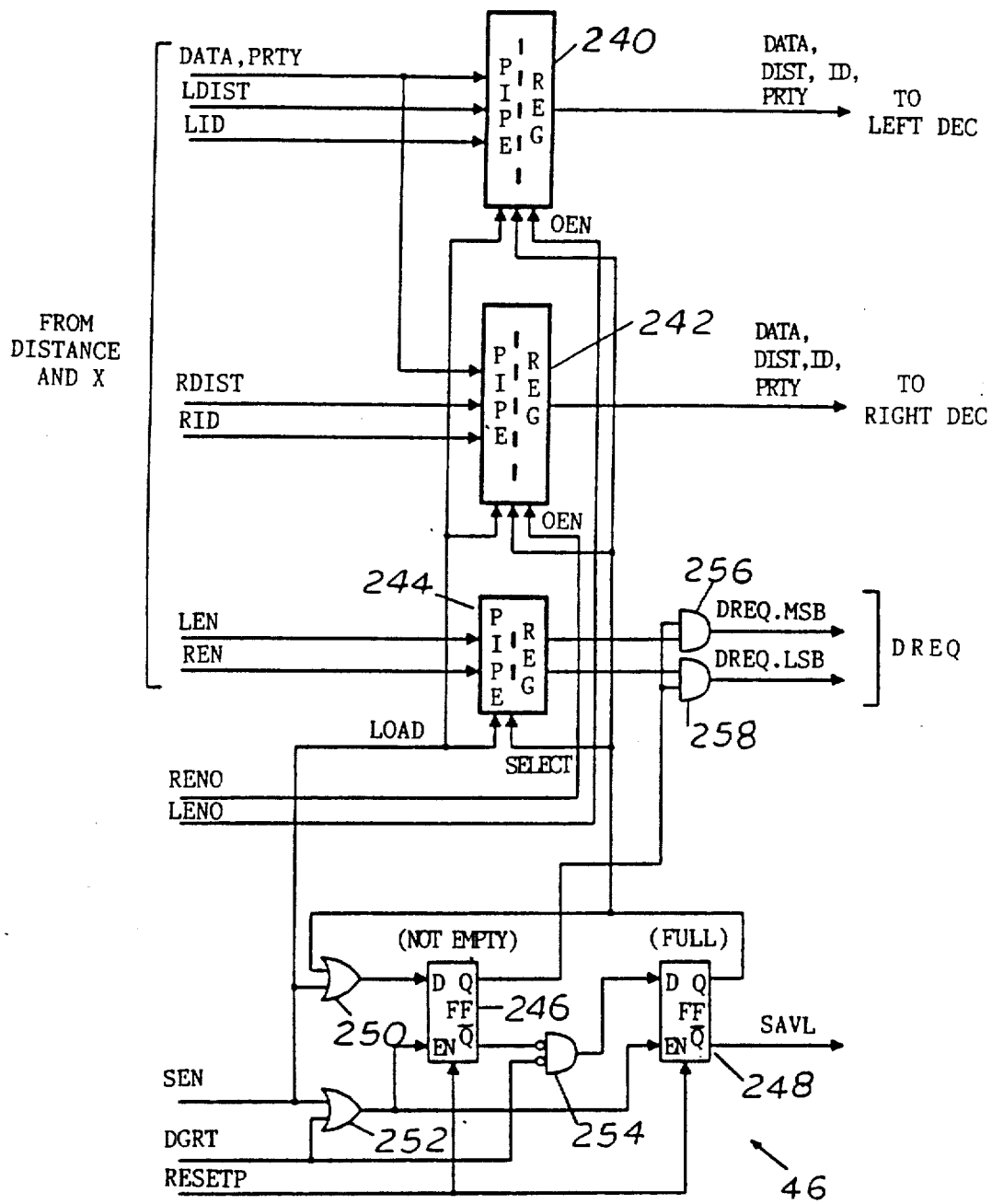
FIG. 12 is a schematic diagram of the source unit of FIG. 4.

Referring to FIG. 12, the source unit 46, depicted in more detailed schematic diagram form, comprises a two-stage left side pipe register 240, a two-stage right side pipe register 242, and a two-stage enable signal pipe register 244. The data and parity fields from the distance table 50 or X unit 60 of FIG. 4 are applied as parallel inputs to both the right and left side pipe registers 242 and 240. "Left side" distance and identification fields (ldist and lid) from the distance table 50 and X unit 60 comprise additional inputs to the left side pipe register 240, while separately derived "right side" distance and identification fields (rdist and rid) from the distance table and X unit comprise additional inputs of the right side pipe register 242. The left and right input enable signals (len and ren) from the distance table 50 and the X unit 60 are connected to input terminals of the enable signal pipe register 244. All three pipe registers are input enabled by a signal (sen) from local arbitrator 54. Left side pipe register 240 and right side pipe register 242 are separately output enabled by left and right output enable signals (reno and leno) from system arbitrator 42. Register 244 is continuously output enabled.

Source unit 46 also includes a D-type flip-flop 246, set when the pipe registers 240, 242 and 244 are not empty, and a D-type flip-flop 248, set when the pipe registers are full. The input enable signal (sen) from local arbitrator 54 is applied to an input of an OR gate 250 while the Q output of flip-flop 248 is connected to another input of the OR gate. OR gate 250 drives the D input of flip-flop 246. The input enable signal (sen) from local arbitrator 54 is also connected to an input to another OR gate 252 as is the grant signal (dgrt) from the system arbitrator 42. The output of OR gate 252 is connected to the enabling inputs of both flip-flops 246 and 248. The −Q output of flip-flop 246, along with the grant signal, drive inverting inputs of an AND gate 254, the output of which drives the D input of flip-flop 248. The Q output of flip TM flop 248 selects the stages of the pipe register 240, 242, and 244 to receive incoming data while the −Q output of flip-flop 248 provides the available signal (savl) to the local arbitrator 54. Both flip-flops 242 and 248 may be reset by the resetp signal from the Fcode unit 56 of FIG. 4.

The Q output of flip-flop 246 is connected to inputs of a pair of AND gates 256 and 258. A left enable output bit terminal of pipe register 244 is connected to a second input of AND gate 256, while the right enable output bit terminal of pipe register 244 is connected to a second input of AND gate 258. The outputs of AND gates 256 and 258 transmit the two-bit request signal (dreq) to system bus arbitrator 42 to indicate that the source unit 46 contains data to be forwarded to the right or left decrementing units and to indicate whether the right, left or both decrementing units are to receive the data.

When the source pipe registers 240, 242, and 244 are not full, the available signal output of flip-flop 248 is high, indicating to the local arbitrator 54 that the source unit can accept more input data. When the local arbitrator determines that a sending unit (the distance table 50, the Fcode unit 56, or the error unit 58) is ready to transmit data to the source unit 46, it sends a high enable signal (sen) to the source unit to set flip-flop 246 and input enable the pipe registers 240, 242, and 244. Assuming the pipe registers were initially empty, register 244 passes the incoming left and right enable bits from the sending unit through AND gates 256 and 258 to the system arbitrator 42 as the two-bit request signal. When the system arbitrator determines that the left port, right port or both ports are ready to receive the data in the source unit, it output enables the appropriate one or both of the left and right pipe registers 240 and 242 according to the states of the request signal. The data in the pipe registers 240 and/or 242 is then sent to the corresponding decrementing unit and the system arbitrator 42 transmits the dgrt signal to the source unit. The dgrt signal resets flip-flop 246.

If the pipe registers 240, 242 and 244 contain one set of input data which has not yet been forwarded, then an incoming input enable signal (sen) from the local arbitrator 54 sets flip-flop 248, causing the incoming data to be stored at a second storage location in pipe registers 240, 242, and 244, and terminating the available signal (savl) to the local arbitrator. When the data stored in the first stage of the pipe registers is forwarded and a grant signal (dgrt) is sent to the source unit, flip-flop 248 is reset and the available signal is again asserted.

Thus the source unit 46 acts as a two-stage buffer for storing locally generated data transmissions until they can be forwarded to the left or the right on the system bus.

Output Fifo

Data transmissions from the device interface unit 26 of FIG. 2 to the bus interface unit 24 are received by the out fifo unit 55 of FIG. 4. These data transmissions can be grouped into two types, hereinafter referenced as "type A" and "type B". A type A transmission is typically used to send DMA data from a memory device accessed by the device interface unit 26 to a remote device over the system bus, although a type A transmission may also be used to send Fcodes and messages. The distinguishing feature of type A transmissions is that they initially do not contain distance fields; the distance fields necessary to forward the data on the system bus are added by the distance table 50 after a type A data transmission is passed to the distance table from the out fifo unit 55. Data words traveling on the system bus include a six-bit distance field, a four-bit identification field a 32-bit data field, and a two-bit parity field as illustrated in FIG. 14D. In a type A data transfer, the 32 bits required to fill the data field of one system bus data word are transmitted from the device interface unit 26 to the out fifo unit 55 in a sequence of two words: a data word one, illustrated in FIG. 14A, and a data word two, illustrated in FIG. 14B. Data word one contains a two-bit tag field (tag2), an 18 bit data field (data), a single-bit parity field (pr2), and a single-bit data valid field (dv). Data word two comprises a two-bit tag field (tag1), a four-bit identification field (id), a 14-bit- data field (data), a single-bit parity field (prl), and a single-bit data valid field (dv).

A type B transmission is typically used to send message and Fcode transmissions from the device interface unit 26 to the system bus, although it may also be used to send DMA data transmissions. In type B transmissions the distance fields are established in the device interface unit 26 and not in the distance table 50 of the bus interface unit 24, and the information required to assemble bus data word according to the format of FIG. 14D is transmitted from the device interface unit 26 to the out fifo unit 55 in a sequence of three words: a data word one as illustrated in FIG. 14E, a data word two as illustrated in FIG. 14F, and a data word three illustrated in FIG. 14G. Type B data word one comprises a two-bit tagO field, a 10-bit unused field, a single-bit "ind" flag field, a single-bit "dir" field, a six-bit distance field, a single-bit parity (prl) field, and a single-bit data valid (dv) field. Type B data word two contains a two-bit tag field (tag3), an 18-bit data field, a single-bit parity field (pr3), and a single-bit data valid field (dv). Type B data word three includes a two-bit tag field (tagl), a four-bit identification field, a 14-bit data field, a single-bit parity field (pr2). and a single-bit dv field.

The out fifo unit 55 is adapted to receive the two data words of a type A transmission and to assemble a type A output data word as illustrated in FIG. 14C in response thereto, including a two-bit "ctag" field, a four-bit identification field, a 32-bit data field, and a two-bit parity field. The type A output word of out fifo unit 55 is then transmitted to the distance table 50 which creates the data word of the format of FIG. 14D to be forwarded along the system bus.

Out fifo unit 55 is also adapted to receive the three data words of a type B transmission and to assemble a sequence of two type B output data words in response thereto as illustrated in FIGS. 14H and 14I. The second type B output word of FIG. 14H is assembled from the fields conveyed in type B data words two and three of FIGS. 14F and 14G and is substantially similar to the type A fifo output word of FIG. 14C. The first data output word of FIG. 14I, assembled from the data conveyed in type B data word one of FIG. 14E, includes a two-bit ctag field, a 32-bit data field, and a two-bit parity field. The 32-bit data field includes two occurrences each of the single-bit dir and ind fields and the six-bit distance field of the data word one of FIG. 14E, along with six-bit and ten-bit unused fields. The two out fifo type B output words are transmitted to the distance unit 50 which reformats them as system bus type data words as in FIG. 14D and then forwards them to the appropriate receiving unit.

Figure 13:
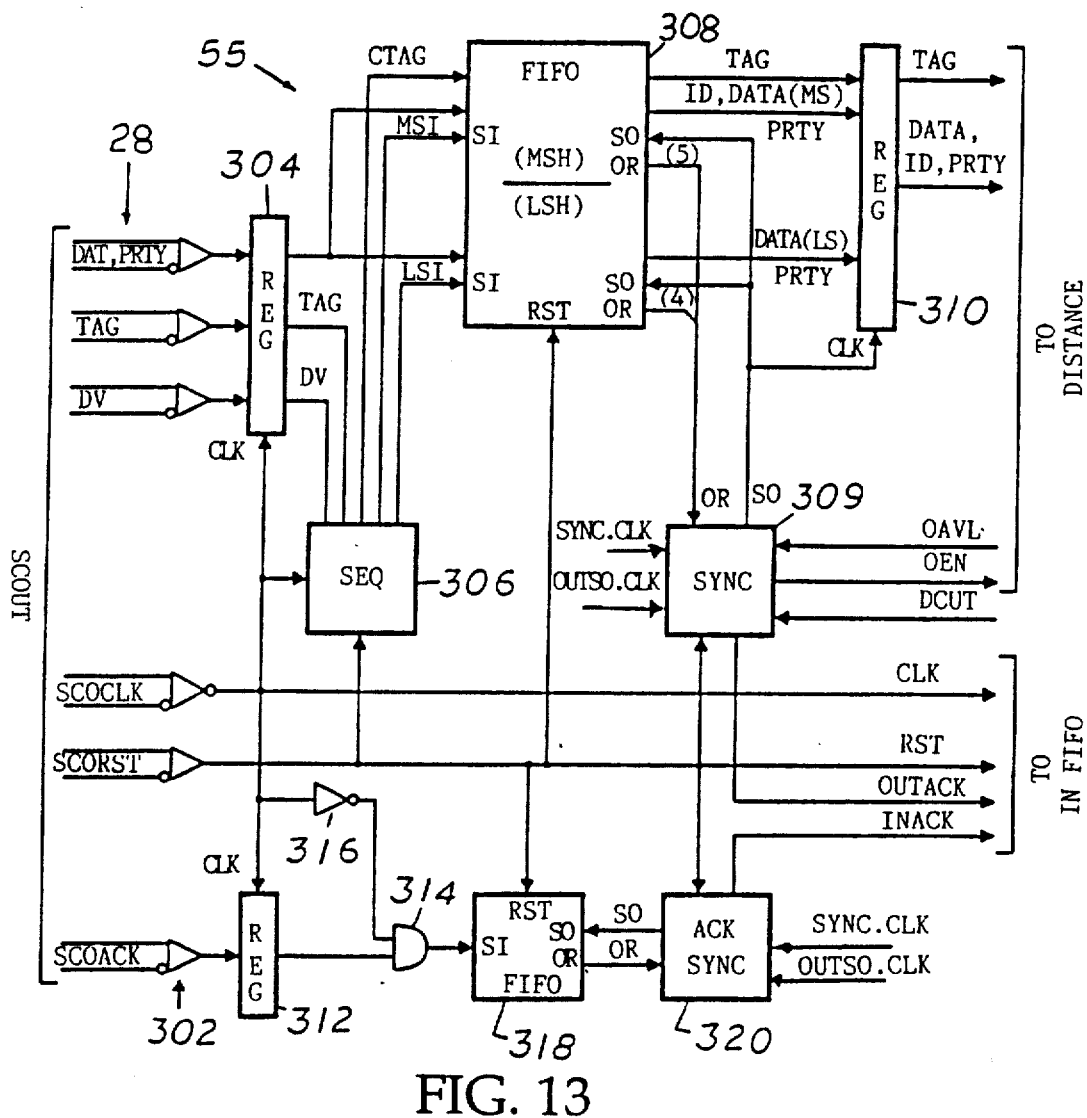
FIG. 13 is a combined block and schematic diagram of the out fifo buffer of FIG. 4.

Referring to in FIG. 13, the out fifo unit 55 of FIG. 4, depicted in combination block and schematic diagram form, includes a set of buffers 302 terminating the SCout lines of intermediate bus 28. The outputs of selected buffers 302 are applied as inputs to a register 304 which stores the identification, data, parity, tag, and valid fields of incoming type A or B data words as they arrive on the SCout bus lines. Register 304 is input enabled by a bus clock signal (scoclk) originating in the DMA control unit 26 and transmitted to the out fifo unit 55 over another SCout bus line to another receiving buffer 302.

The out fifo unit 55 includes a sixty-four stage fifo buffer 308 having two independently input enabled fifo sections, one for storing a most significant half (MSH) of each fifo output data word to be transmitted to the distance unit 50 and another for storing a least significant half (LSH) of the data word. The dv and tag fields in each incoming type A or B data word stored in register 304 are forwarded to a sequence control unit 306 while the identification, data and parity fields in stored register 304 are applied to inputs of both the MSH and LSH sections of fifo buffer 308. A ctag field, generated by the sequence control unit 306, is also applied to an input of the MSH portion of fifo buffer 308.

When the first word of a two-word type A transmission arrives in register 304, the sequence unit 306 determines from the dv bit that valid data has been stored in the register and from the tagl field that it is a first word of a type A sequence. The sequence unit 306 then generates a selected ctag code (a binary 10), and transmits an input enabling signal (msi) to the shift-in (si) control terminal of the MSH portion of fifo buffer 308 to load the identification, data and parity fields from register 304 into the MSH section of fifo 308. When the second word of the type A transmission is stored in register 304, the sequence unit 306 detects the dv and tag2 fields and transmits another input enabling signal (lsi) to the shift-in control terminal of the LSH section of fifo buffer 308 to load the data and parity fields in register 304 into the LSH section.

In the preferred embodiment, the MSH section of fifo buffer 308 is implemented using five separate fifo buffer circuits, each generating a separate output ready (or) signal when valid data is stored therein. The LSH section of buffer 308 is implemented using four separate integrated circuits. The nine separate output ready terminals from the LSH and MSH circuits are connected to inputs of a synchronizing circuit 309. The available signal (oavl) from the distance table 50 is transmitted to circuit 309 when the distance table is ready to accept more data from the out fifo unit 55. The data stored longest in fifo buffer 308 is applied to input terminals of a register 310. When synchronizing circuit 309 detects all nine output ready signals and the oavl signal from the distance unit 50, synchronizing circuit 309 transmits a shift-out (so) pulse to buffer 308 and to a clock input of register 310, causing the register to store the output data from the fifo buffer 308 and causing the fifo buffer to subsequently output the next longest stored data. The data stored in register 310 thus contains all of the fields of the type A fifo output word depicted in FIG. 14C and is transmitted to input terminals of the distance unit 50. Thereafter, the synchronizing unit 309 transmits the oen enable bit to the distance unit, causing the distance unit to acquire the data in register 310. The distance unit 50 then processes the data to produce the system bus type data transfer word of a format shown in FIG. 14D.

When the data word one of a type B data transfer (as illustrated in FIG. 14E) arrives in register 304 of the output fifo unit 55, the sequence unit 306 detects the dv and tag0 fields and then generates a selected ctag field (i.e., a binary 00) and transmits both shift-in signals (msi and lsi) to the fifo buffer 308 so that data in register 304 is stored in both MSH and LSH sections of the fifo buffer. When this data is the longest stored data in the fifo buffer, and when the synchronizing unit 309 detects the available signal from the distance unit 50, the synchronizing unit transmits the shift-out signal to the fifo buffer 308 and register 310, and then transmits the enable signal (oen) to the distance unit 50, thereby transferring to the distance unit the data in register 310 in the format depicted in FIG. 14I. The distance table 50 utilizes only one set of the duplicated fields in this data word. The duplication of fields results from the simultaneous loading of the same data word into both sections of the fifo buffer 308 which is necessary in order to maintain proper alignment of subsequently loaded corresponding data pairs in the MSH and LSH sections of the buffer.

When the second data word of the type B sequence (FIG. 14F) arrives in register 304 it is stored in the LSH section of fifo buffer 308, along with a selected ctag code (a binary 11) generated by the sequence unit 306, and when the third data word of the type B sequence (FIG. 14G) arrives, it is stored in the MSH section of fifo buffer 308. The data is then shifted through the fifo buffer and stored in register 310 for further transmission to the distance unit 50 in a manner similar to the way in which the type A data is forwarded. The data stored in register 310 derived from the second and third words of the type B transmission appears in the format shown in FIG. 14H.

Figure 15:
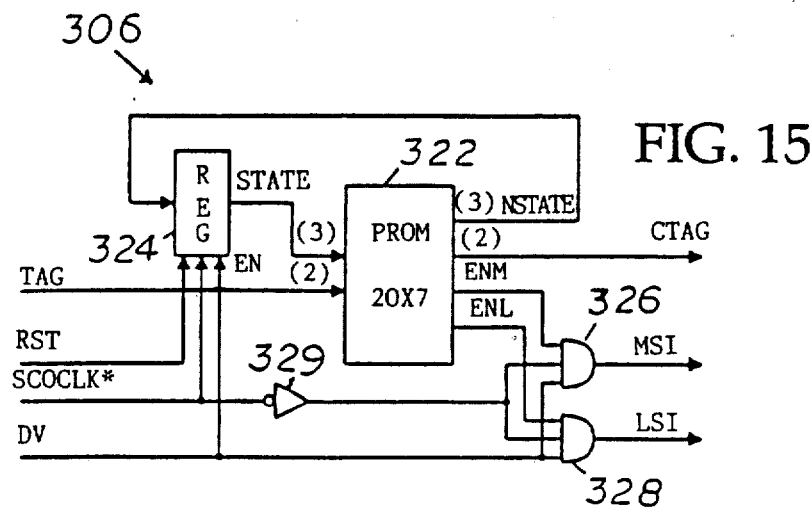
FIG. 15 is a schematic diagram of the sequencing circuit of the out fifo buffer of FIG. 13.

Referring to FIG. 15, the sequence control circuit 306 of out fifo unit 55, depicted in block diagram form, includes a state machine comprising a 20x7 programmable read only memory (PROM) 322 and a state register 324. At each addressable storage location, the PROM 322 stores a three-bit next state field (nstate), a two-bit ctag field, a single most significant enable bit (enm), and a single least significant enable bit (enl). The PROM 322 is addressed by a three-bit state field (state) stored in state register 324 and the two-bit tag field from an incoming type A or B data transmission oord stored in register 304 of the output fifo unit 55 of FIG. 13. The currently addressed ctag field is transmitted to the MSH section of fifo buffer 308, the currently addressed nstate field is applied as an input to state register 324, and the currently addressed enm and enl bits are applied as inputs to a pair of AND gates 326 and 328 respectively. The interface bus clock signal (scoclk) is inverted by an inverter 329 and applied as an input to both AND gates 326 and 328. The dv bit from the data stored in register 304 is also drives inputs of both AND gates. The outputs of AND gate 326 adn 328 respectively provide the msi and lsi shift-in control signals transmitted to fifo buffer 308 of FIG. 13.

Data is stored in PROM 322 according to the following Table I:

TABLE I

| address | | data | | | |
|---|---|---|---|---|---|
| state | tag | nstae | ctag | enm | enl |
| 0 | 0 | 1 | 0 | 1 | 1 |
| 0 | 1 | 0 | 1 | 1 | 1 |
| 0 | 2 | 2 | x | 0 | 1 |
| 0 | 3 | 4 | x | 0 | 1 |
| 1 | 0 | 0 | 1 | 1 | 1 |
| 1 | 1 | 0 | 1 | 1 | 1 |
| 1 | 2 | 4 | x | 0 | 1 |
| 1 | 3 | 3 | x | 0 | 1 |
| 2 | 0 | 0 | 1 | 1 | 0 |
| 2 | 1 | 0 | 2 | 1 | 0 |
| 2 | 2 | 0 | 1 | 1 | 0 |
| 2 | 3 | 0 | 1 | 1 | 0 |
| 3 | 0 | 0 | 1 | 1 | 0 |
| 3 | 1 | 0 | 3 | 1 | 0 |
| 3 | 2 | 0 | 1 | 1 | 0 |
| 3 | 3 | 0 | 1 | 1 | 0 |
| 4 | 0 | 0 | 1 | 1 | 0 |
| 4 | 1 | 0 | 1 | 1 | 0 |
| 4 | 2 | 0 | 1 | 1 | 0 |
| 4 | 3 | 0 | 1 | 1 | 0 |

In table I the numerals represent the decimal equivalent of the indicated binary bit field while the "x" indicates that the state of the field at this storage location is irrelevant. A reset signal is initially applied to register 324 to set the current state field to 000. When the 00 tag field from the first word of a type B sequence and the 000 state field address the PROM 322, the PROM outputs a 00 ctag field to assert the enm and enl inputs to AND gates 326 and 328. If the dv bit in register 304 is set, indicating the data therein is valid, then the msi and lsi output bits of AND gates 326 and 328 are driven high on the rising edge of the next scoclk pulse. The 001 nstate output field is then stored in the state register 324 on the trailing edge of the clock pulse, provided that the register is input enabled by the dv bit. When the second word of the B sequence is received, the applied tag3 (10) field and the new 001 state field cause the PROM to output a low enm bit and a high enl bit, causing the data in register 324 be shifted into the LSH section of the fifo buffer. The next state (Q11) is then stored in register 324 so that when the tag1 field (01) of the third word of the B type sequence is applied with the state field to address the PROM 322, the PROM outputs a (11) ctag field, a low enl bit and a high enm bit. This causes the ctag field and the incoming data in register 304 of FIG. 13 to be shifted into the MSH section of the fifo buffer 308. In a similar fashion, the data stored in PROM 322 causes the sequence circuit 306 to generate the proper sequence of ctag, enl and enm signals in response to a type A data transfer. On detection of any sequence of data words having tag fields in other than in a type A or type B sequence, PROM 322 outputs an (01) ctag field which is stored in fifo 308. This ctag field is recognized by the distance table 50 of FIG. 4 as indicating an out-of-sequence error and appropriate action is taken as described hereinbelow.

Figure 16:
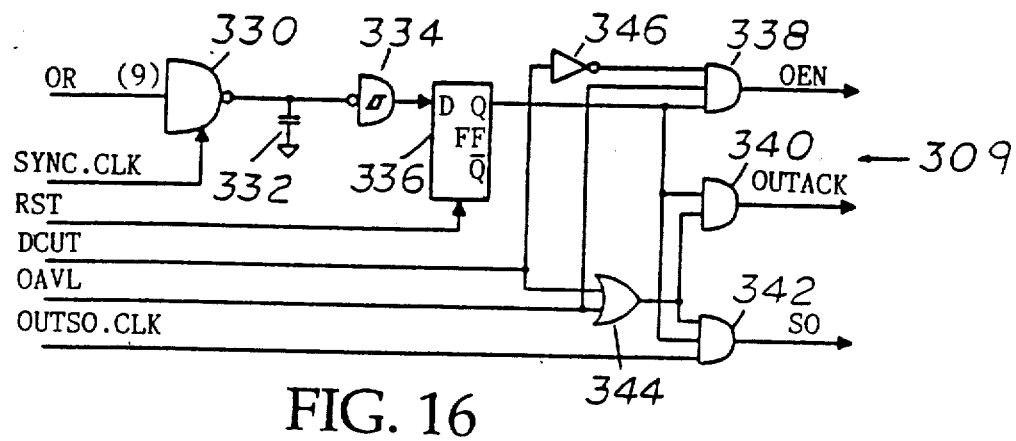
FIG. 16 is a schematic diagram of the synchronizing circuit of the out fifo buffer of FIG. 13.

Referring to FIG. 16, the out fifo synchronizing circuit 309, depicted in schematic diagram form, includes a tri-state NAND gate 330 which receives the nine output ready (or) signals from the various MSH and LSH sections of the out fifo buffer 308, and outputs a high bit when enabled by a synchronizing clock signal (sync.clk) unless all of the inputs are high. The output of AND gate 330 is applied to a capacitor 332 and to an inverting input of a hysteresis gate 334, the output of which drives a D input of a D-type flip-flop 336. The Q output of flip-flop 336 is connected to inputs of a set of three AND gates 338, 340 and 342. The CUT signal (dcut) from the Fcode unit 58 of FIG. 4 is applied to an input of an OR gate 344 and also inverted by an inverter 346 and applied to another input of AND gate 338. The available signal (oavl) from the distance unit 50 of FIG. 4 drives another input of OR gate 344 and a third input of AND gate 338. The output of OR gate 344 drives additional inputs of AND gates 340 and 342. A shift-out clock signal (outso.clk) is applied as a third input to AND gate 342. The output of AND gate 338 comprises the enable signal (oen) to the distance unit 50, the output of AND gate 340 comprises an acknowledge signal (outack) to in fifo unit 53, and the output of AND gate 342 comprises the shift-out signal to fifo buffer 308. The purpose of the outack signal is described in detail hereinbelow.

The CUT signal (dcut) is asserted only when no device is to access the bus through the node. If the CUT signal is asserted, the enable signal (oen) to the distance table 50 cannot be asserted. Therefore no data in the out fifo buffer 308 can be forwarded to the distance table.

Flip-flop 336 is initially reset by a reset (rst) signal from the Fcode unit 58 of FIG. 4. Before any data is sent to the fifo buffer 308, the output ready signals from the buffer are all low. The output of AND gate 330 goes high during each sync.clk pulse, charging capacitor 332 and driving the D input of flip-flop 330 low. The Q output of the flip-flop is also low, driving the outputs of AND gates 338, 340 and 342 low. When valid data arrives in the fifo buffer 308, the output ready signals go high. During a high portion of the synchronizing clock (sync.clk) cycle, the output of NAND gate 330 goes low, discharging capacitor 332. When capacitor 332 discharges below a low threshold level of gate 334, the output of gate 334 rises, causing flip-flop 336 to set on the next clock pulse. The high Q output of the flip-flop causes gates 338, 340 and 342 to drive the oen, outack, and shift-out signals high. Capacitor 332 is sized so that during the off portion of the sync.clk signal, voltage remains below in upper threshold limit of the hysterisis AND gate 334, even though the capacitor may be receiving a small charging current from NAND gate 330 which typically leaks a small amount of charging current when off.

Referring again to FIG. 13, a fifo buffer in the device interface unit 26, which transmits data to the out fifo unit 55, stores data prior to transmission in a sixty-four stage fifo buffer similar to buffer 308 and transmits data alternately shifted out of its MSH and LSH sections to fifo unit 55. The buffer in the device interface unit maintains a count of the number of buffer stages currently containing data, incrementing the count whenever data is shifted into its fifo buffer and decrementing the count whenever data is shifted out of the fifo buffer 308 in out fifo unit 55. When the number reaches sixty-four, the buffer in the device interface unit stops sending data because the fifo buffer 308 on the other end of the bus may be full. The out fifo unit 55 transmits an output acknowledge signal to the sending fifo unit whenever it shifts out data and the sending fifo unit decrements the count when it receives the acknowledge signal.

The acknowledge signal is not however, sent directly to the sending fifo unit. When the synchronizing unit 309 transmits a shift-out signal to the fifo buffer 308, it also transmit an output acknowledge (outack) signal to the input fifo unit 53, described in more detail hereinbelow, which forwards the acknowledge signal over the SCin bus to a receiving fifo unit in the device interface 26. The receiving fifo unit then passes the output acknowledge signal to the sending fifo unit which decrements its buffer count.

Data transmissions from the in fifo unit 53 to a receiving fifo unit in the device interface unit also involve the use of sixty-four stage fifo buffers on each end. As described in more detail below, the in fifo unit 53, which acts as a sending unit to transmit data back to the device interface unit, also maintains a count of the number of currently loaded buffer stages and decrements the count when it receives a shift-out acknowledge signal generated by the receiving unit in the device interface unit. In this case, the acknowledge signal is routed first to the fifo sending unit in the device interface unit, and then over the SCout bus to the out fifo unit 55, which forwards the acknowledge signal to the input fifo unit 53.

Referring again to FIG. 13, the shift-out acknowledge signal (scoack) from the DMA unit is stored as a single-bit in a register 312 on the rising edge of eac pulse of the SCout bus clock (scoclk). The bit stored in register 312 is applied as an input to an AND gate 314 while the scoclk signal, inverted by an inverter 316, is applied as another input to the AND gate. The output of AND gate 314 drives a shift-in (si) terminal of another sixty-four stage fifo buffer 318. Whenever the scoack bit in register 312 is set, indicating a shift-out acknowledge, the output of AND gate 314 goes high on the trailing edge of the current scoclk pulse, causing the fifo buffer 318 to shift-in. The data terminals of buffer 318 float, so a binary 0 is loaded into the buffer on occurrence of each shift-in signal from AND gate 314. After the shift in has occurred, the fifo buffer 318 transmits an output ready (or) signal to an acknowledge synchronizer circuit 320 which responds with a shift-out signal to the buffer 318 on occurrence of the next local clock signal (sync.clk). At the same time the synchronizer circuit 320 also transmits an acknowledgement (inack) to the input fifo 53 which then decrements its buffer storage count.

Figure 17:
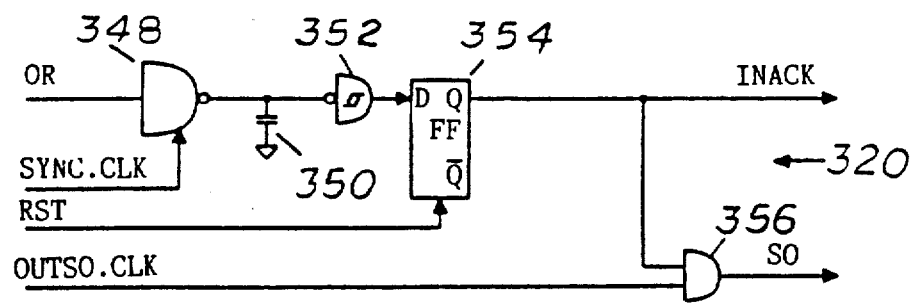
FIG. 17 is a acknowledge synchronizing circuit of the out fifo buffer of FIG. 13.

The output acknowledge fifo synchronizing circuit 320, depicted in schematic diagram form in FIG. 17, is similar to synchronizing circuit 309 of FIG. 16. The output ready signal from fifo buffer 308 is applied as an input to a tri-state NAND gate 348, the output thereof being connected to a capacitor 350 and the inverting input of a hysteresis AND gate 352. The output of gate 352 drives the D-input of a flip-flop 354 which is reset by a reset (rst) signal from the Fcode unit. The Q output of the flip-flop 354 comprises the acknowledge output signal (inack) of synchronizer 320, which is also applied as an input to an AND gate 356 along with a controlled pulse width local clock signal (outso.clk). The output of AND gate 356 comprises the shift-out signal to fifo buffer 318. The acknowledge synchronizer circuit 320 operates in a generally similar fashion to the out fifo synchronizer circuit 309 of FIG. 16.

The acknowledge fifo buffer 318 and the synchronizing unit 320 of FIG. 13 permit the receipt of acknowledge signals (scoack) in synchronization with the SCout bus clock (scoclk) signal and the transmission of acknowledge signals (inack) to the in fifo unit 53 in synchronization with the local clock (sync.clk) signal. Similarly, the data fifo buffer 308, sequence unit 306, and the synchronizing unit 309 permit receipt of data from the DMA control unit synchronized according to the bus clock signal and forwarding of data to the distance unit 50 synchronized to the local clock signal.

Distance Unit

Figure 18:
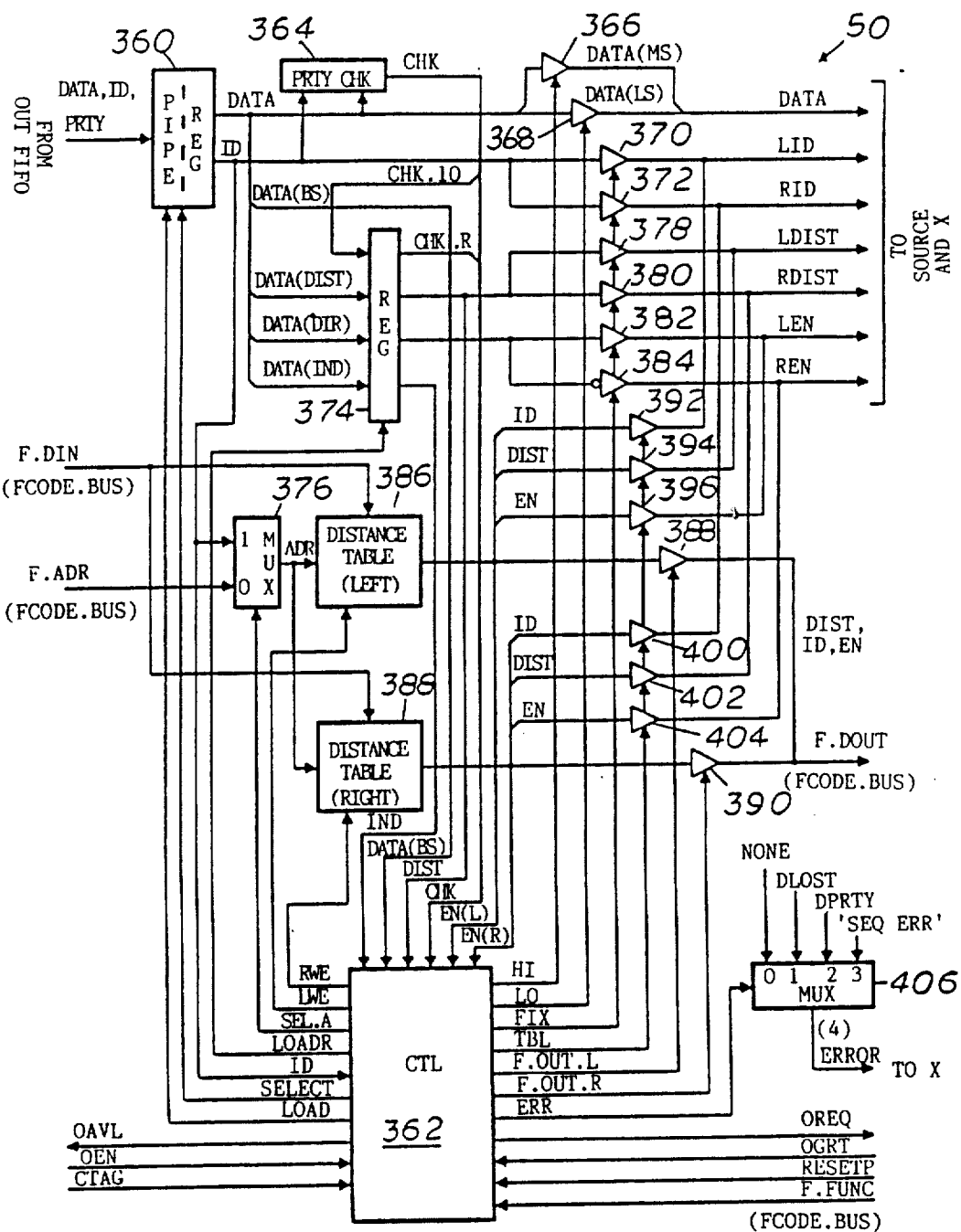
FIG. 18 is a schematic diagram of the distance table of FIG. 4.

Referring to FIG. 18, the distance unit 50, depicted in block diagram form, is adapted to receive type A data output words from the out fifo unit 53 in the format depicted in FIG. 14C, or type B out fifo unit output words in the format depicted in FIGS. 14H and 14I. Incoming data, identification and parity fields are stored in a two-stage pipe register 360. A distance unit control circuit 362 keeps track of which stages of pipe register 360 are full and controls the stage into which incoming data is accepted by asserting a select signal (sel.a) applied to a stage select control input of the pipe register.

When the out fifo unit has data to be transmitted to the distance unit 50, and it detects an oavl signal from the control circuit 362, it sends an enable signal (oen) back to the control circuit. The control circuit 362 then transmits a "loadr" signal to an input enable terminal of the pipe register 360, causing the register to store the incoming data, identification and parity fields from the output register 310 of the out fifo buffer 55 of FIG. 13. At the same time, the ctag field from output register 310 is acquired by control circuit 362. The ctag field is two bits wide and a 00 ctag field indicates that the incoming data is the first word of a type B transmission from the out fifo unit of a format illustrated in FIG. 14I. A 01 ctag field indicates that the incoming data is invalid due to a sequence error detected by the sequence control unit 306 of the out fifo 55. A 10 ctag field indicates that the incoming data is a type A transmission of the format illustrated by FIG. 14C and a 11 ctag field indicates that the incoming data is the second fifo output word of a type B data transfer of the format shown in FIG. 14H.

The first data word stored in pipe register 360 is outputted from the pipe register to a parity checking circuit 364, which transmits a parity error indicating signal (chk) to the control circuit 362 and also to an input of an assembly register 374. The four-bit identification field output of register 360 provides inputs to two tri-state buffers 370 and 372, the control circuit 362, and a multiplexer circuit 376. The fourteen most significant bits (bits 0–13) of the 32-bit data field in the pipe register are supplied as inputs to a 14-bit tri-state buffer 366, while the eighteen least significant bits of the data field are applied as inputs to an 18-bit tri-state buffer 368. Bits 1–6 of the data field are also transmitted as a "data(bs)" field to the control circuit 362. Bits 24 and 25 of the data field are further applied as "data(ind)" and "data(dir)" input fields respectively to assembly register 374. Bits 26–31 of the data field provide a "data(dist)" field input to register 374.

The assembly register 374 is input enabled by a "loadr" signal from control circuit 362 when it determines from the ctag field that the pipe register 360 output data is the first word of a two word type B sequence transfer (per FIG. 14I) from the out fifo unit 55. The ind bit of FIG. 14H is stored in register 374 as the data(ind) field, the dir bit is stored as the data(dir) field, and the six "dist" bits are stored as the data(dist) field. One bit (chk.to) of the chk field from the parity check circuit is also stored in register 374 to indicate any error in the data fields in the register. The data(dist) field thus stored in assembly register 374 provides inputs to two tristate buffers 378 and 380 while the stored single-bit data(dir) field is applied as an input to a tri-state buffer 382 and also to an inverting input of another tri-state buffer 384. The chk.10 bit stored in assembly register 374 is transmitted as a "chk.r" field to the control circuit 362, and the data(ind) field is also transmitted to the control circuit as an "ind" field.

Address lines (f.adr) of the Fcode bus are connected to a second input of multiplexer 376, the switching state of which is controlled by a "sel.a" signal from control circuit 362 in response to a command, carried on an "f.func" control line of the Fcode bus, from the Fcode unit 55 of FIG. 4. The output of multiplexer 376, comprising selectively either addressing data from the Fcode bus or the identification field output of pipe register 360, is connected to addressing terminals of both a left and a right distance table 386 and 388, respectively, suitably comprising random access memories. A set of Fcode bus data lines are applied to data input terminals of the left and right distance tables and the data output terminals of the distance tables are connected to the Fcode bus data lines through tri-state buffers 388 and 390, the buffers being enabled by signals from the control circuit 362. Data may be written into or read out of selected addressable storage locations in the distance tables by the Fcode unit by transmitting control signals to control circuit 362, causing it to switch the multiplexer 376 to address the tables with an address carried on the Fcode bus, and to enable the appropriate buffer 388 or 390.

Stored at each address in distance tables 386 and 388 are a four-bit identification field, a six-bit distance field and a single-bit enable field. When left distance table 386 is addressed by an incoming identification field from pipe register 360, a forwarding identification field stored at that address is transmitted to a tri-state buffer 392. Also, a stored forwarding distance field is transmitted to another tri-state buffer 394, and a stored left enable bit "en(1)" is transmitted to a third tri-state buffer 396. Similarly, when the right distance table is addressed by an identification field from the pipe register 360, stored forwarding identification and distance fields and the right enable bit "en(r)" are transmitted to tristate buffers 398, 400 and 402 respectively. The left and right enable bits are additionally transmitted to the control circuit 362.

The distance table 50 converts a type A data word output of the pipe register 360 (FIG. 14C) into a system bus data transfer word (FIG. 14D) to be forwarded to the left or right or in both directions on the system bus.

The distance tables 386 and 388 are preloaded using Fcodes with selected forwarding identification, distance and enable bits. When a table is addressed by a selected incoming identification field of a type A data word in the pipe register 360, the appropriate identification and distance fields for the bus transfer word are outputted. If the bus transfer word is to be sent along the system bus to the left of the node, the left enable bit at that address in the left distance table 386 is set and if the data word is to be sent to the right on the system bus, the right enable bit in distance table 388 is set. Both right and left enable bits are set if the bus word is to travel in both directions.

When the pipe register 360 is not full, the control circuit 362 transmits an available (oavl) signal to the out fifo unit. When the out fifo unit has data to transmit to the distance unit, it responds with the enable signal (oen) to the control circuit 362, which then initiates the load signal to the pipe register 360, causing the pipe register to store the incoming data.

If the control circuit 362 determines from the ctag field that the current output of the pipe register 360 is the first word of a two word type B sequence, the control circuit initiates a loadr signal causing the assembly register 374 to store the data from the pipe registers appearing at the assembly register input terminals. If the current output of the pipe register is the first or second word of a type B sequence or a type A word, control circuit 362 determines whether a parity error has occurred according to the chk field from the parity checker 364 and the chk.r bit from the assembly register 374, and generates an error field (err) coded to indicate the type of error, if any. The control circuit 362 can also determine from the ctag field if a sequence error has occurred, and can determine from the right and left enable bits if a type A data output of register 360 is "lost" due to a failure to set either enable bit in the distance tables 386 and 388. The err field, coded to reflect any of these errors, controls the switching state of a multiplexer 406 which selectively fills an error field output to the error unit 56 of FIG. 4 via the X unit 60 of FIG. 4 with "lost", "prty", or "seq err" codes if one of the above-mentioned errors has occurred. Also, if an error has occurred, the control circuit 362 transmits a three-bit request (oreq) code (111) to the local arbitrator 54 indicating that an error has occurred. The arbitrator responds with a grant (ogrt) signal to the control circuit 362 which causes the control circuit to enable buffer 366 with an enabling signal (hi) and buffer 368 with another signal (lo), and to enable buffers 370, 372, 378, 380, 382, and 384 with a third enabling signal (fix). The local arbitrator then routes the data, identification and distance fields in registers 360 and 374, along with the error field from multiplexer 406, to the error unit 58 of FIG. 4 through the X unit 60.

If no error has occurred, and the control circuit 362 etermines from the ctag field that the output of the pipe register 360 is a type A word, the control circuit 362 initiates a different three-bit oreq signal (010) to the arbitrator 54 indicating that it wants to send data to the source unit 46. When the arbitrator responds with the ogrt signal, the control circuit 362 output enables buffers 366 and 368 with the hi and lo signals, and output enables buffers 392, 394, 396, 400, 402, and 404 with a "tbl" signal, thereby transmitting the data field output of pipe register 360 and the distance, identification and enable fields from left and right distance tables 386 and 388 to the source unit 46 of FIG. 4.

If the control circuit 362 determines from the ctag field that the current output of the pipe register 360 is the first word of a two word type B sequence, the control circuit initiates a loadr signal causing the assembly register 374 to store the data from the pipe registers appearing at the assembly register input terminals. If the control circuit 362 determines that the next output of the pipe register 360 is the second word of the type B sequence the control circuit 362 checks the data(dist) data(bs), data (ind), and identification fields to determine whether the data is:

1. an Fcode or message to be sent to another node via the source unit 46;
2. a "special" transmission (described in detail hereinbelow);
3. an Fcode transmission directed to the Fcode unit 56 of this node; or
4. an Fcode or a diagnostic message to be routed back to the device interface 26 via the in fifo unit 52.

If the control circuit determines that the pipe register 360 output is a special transmission, it transmits a 100 encoded signal to the local arbitrator 54. When the arbitrator responds with the ogrt signal, the control circuit 362 output enables buffer 368 with the lo signal, the buffer thereby outputting the data(ls) portion, of the message, the rest of which is supplied by the error unit. If the control circuit 362 determines that the pipe register 360 output is an Fcode or a message to be sent to another node via the source unit 46, it transmits a (010) encoded oreq signal to the local arbitrator 54. When the arbitrator responds with the ogrt signal, the control circuit output enables buffers 366 and 368 with the hi and lo signals, and output enables buffers 370, 372, 378, 380, 382, and 384 with the fix signal, the buffers thereby routing the data(ms) and data(ls) field outputs of pipe register 360, and the distance identification and enable field outputs from the assembly register 374 to the source unit 46.

If the control circuit 362 determines that the pipe register output is an Fcode to be sent to the Fcode unit 56 of this node, it transmits a 101 encoded oreq signal to the local arbitrator 54. When the arbitrator responds with the ogrt signal, the control circuit 362 output enables buffers 366 and 368 with the hi and lo signals, and output enables buffers 370, 372, 378, 380, 382, and 384 with the fix signal, thereby routing the data(ms) and data(ls) field outputs of pipe register 360, and the distance identification and enable field outputs from the assembly register 374 to Fcode unit via the X unit 60.

If the control circuit 362 determines that the pipe register output is intended to be sent back to the device interface unit 26 via the in fifo unit of FIG. 4, it transmits a 001 encoded oreq signal to the local arbitrator 54. When the arbitrator responds with the ogrt signal, the control circuit 362 output enables buffer 366 and 368 with the hi and lo signals, and output enables buffers 370, 372, 378, 380, 382, and 384 with the fix signal, thereby transmitting the data(ms), data(ls) and identification field outputs of pipe register 360, and the distance and enable field outputs from the assembly register 374 to the in fifo unit 53 via the X unit 60.

A "special" transmission is a message initiated by the device interface unit 26 of FIG. 2 and sent to a selected processing device. The message indicates that the last data word of a DMA transfer sequence has been sent out of the device interface unit. The device interface unit sends the special transmission to the bus interface unit in the form of a type B transmission conveying, within the least significant portion of the data field, the identification number of the completed DMA sequence. In a special transmission, the ind bit of the type B data word of FIG. 14I is set. When the control circuit 362 determines from the ind bit that the pipe register output is a special transmission, it transmits an encoded oreq signal to the local arbitrator 54, and when the local arbitrator responds with the ogrt signal, the control circuit 362 output enables only buffer 368, which transmits the least significant portion of the incoming data field to the source unit 46 or the in fifo unit 53 of FIG. 4. The distance, identification, and direction fields required to route the data on the bus to the selected processing device are prestored in the error unit 56 of FIG. 4, along with a most significant portion of the data field containing a selected vector identifying the purpose of the transmission. When the local arbitrator transmits the ogrt signal to the distance table to send the least significant portion of the data field of the special transmission to the source unit or the in fifo unit, it also transmits grant and enabling signals to the error unit and the X unit 60 of FIG. 4, so that the distance, direction, and identification fields and the most significant portions of the data field stored therein are also sent to the source unit 46 or the in fifo unit 53. The source unit then forwards the message on the system bus to the selected processing device, while the in fifo unit transmits the message to the processing device serviced by this node.

Figure 19:
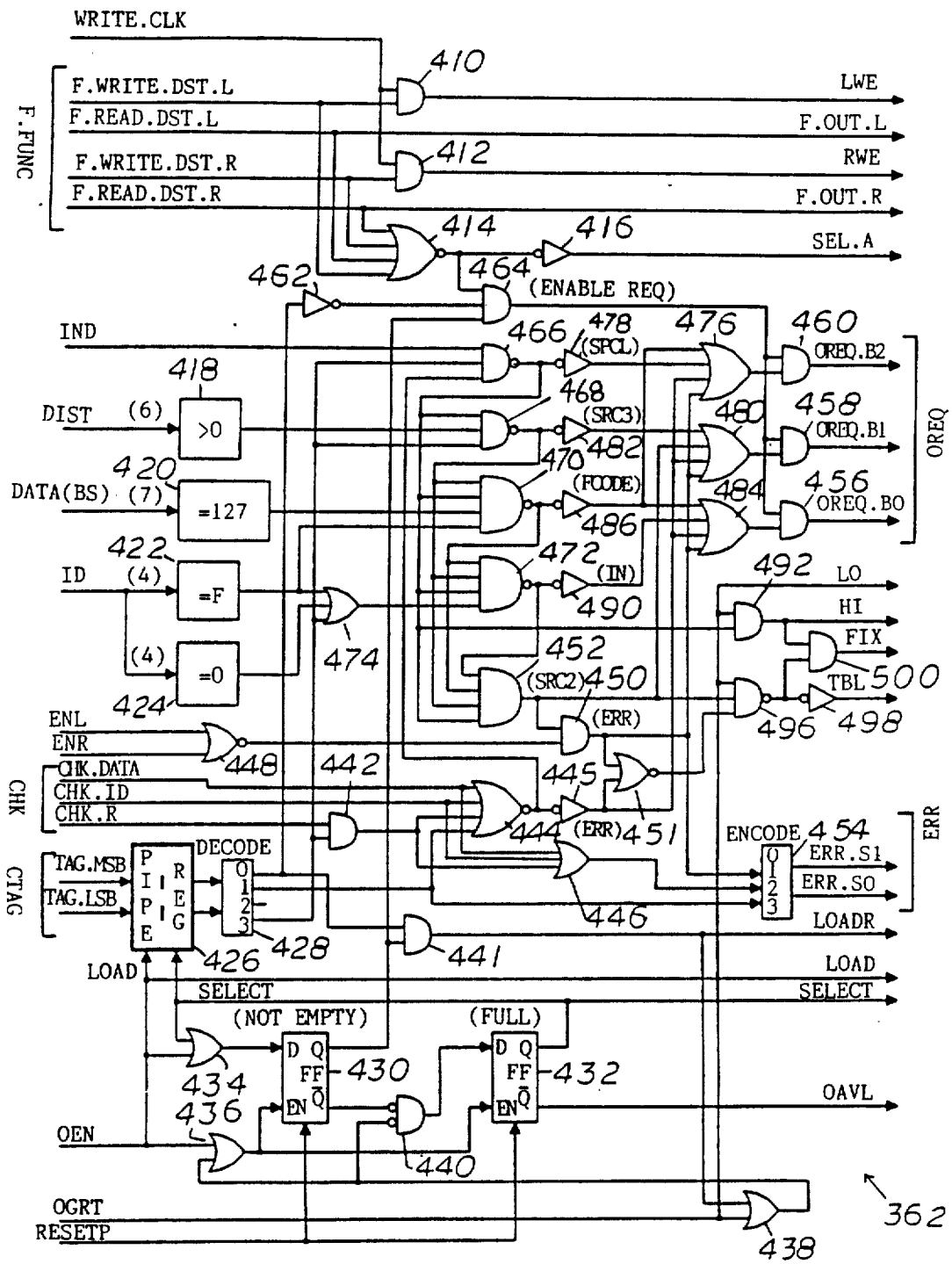
FIG. 19 is a schematic diagram of the control circuit of the distance table of FIG. 18.

Referring to FIG. 19, the distance unit control circuit 362 of FIG. 18 is depicted in more detailed block and schematic diagram form. The f.func portion of the Fcode bus, applied to control unit 362, includes f.write.dst.1, f.read.dst.1, fwrite.dst.r, and fread.dst.r control lines which are asserted when data is written to or read from the left or right distance tables. The f.write.dst.1 line is connected to an AND gate 410 while the f.write.dst.r line is connected to another AND gate 412. A clock signal (write.clk) is applied to second inputs of both AND gates 410 and 412. The output of gate 410 comprises the write enable (lwe) signal to the left distance table 386 of FIG. 18, while the output of gate 412 comprises the write enable (rwe) signal to the right distance table 388 of FIG. 18. The f.read.dist.1 and the f.read.dist.r signals are directly forwarded as the f.out.1 and f.out.r enabling signals to the left and right distance table output buffers and are also applied, along with the f.write.dis.r and f.write.dist.1 signals as inputs to a NOR gate 414. The output of NOR gate 414, which is low only when the distance tables are being accessed by Fcode data, is inverted by an inverter 416 and then applied as the sel.a signal to address multiplexer 376 of FIG. 18 so that the distance tables are addressed by the Fcode bus when any of the f.func signals are asserted.

The distance field from assembly register 374 is applied to a detector circuit 418 which determines if the distance field is greater than 0, indicating that the current pipe register 360 output data is intended for transfer to a distant node. Another detector circuit 420 determines if the data(bs) field from assembly register 374 is equal to 127 (decimal), indicating that the current pipe register output is intended for the Fcode unit 56 if the pipe register output data is an Fcode. A detector 422 checks the identification field of the pipe register 360 output to determine if the data in pipe register 360 is to be part of an Fcode message (i.e., a 1111 identification) while another detector 424 checks the identification field to see if the register output data is to be part of a message type transmission (i.e., a 0000 identification field). The output of each detector 418, 420, 422, and 424 is high if the detected condition is true.

The two-bit ctag field from the out fifo unit 55 is loaded into another two-stage pipe register 426 according to the same select and load signals applied to the pipe register 360. Therefore the ctag field corresponding to the current output of pipe register 360 is also outputted from pipe register 426. The ctag output of pipe register 426 is decoded by a decoder 428 which has outputs 0, 1, 2 and 3 indicating when the ctag code is one the four possible binary states 00, 01, 10, and 11, respectively. A pair of flip-flops 430 and 432 monitor the fill status of the pipe registers 426 and 360 and generate the appropriate select and oval signals. Flip-flop 430 is set if the pipe registers are not empty while flip-flop 432 is set if both stages of the pipe registers are full. The Q output of flip-flop 432, the select signal and the oen signal from the out fifo unit 55 are connected to inputs of an OR gate 434, the output of which drives the D input of flip-flop 430. The −Q output of flip-flop 432 is the oval signal. The ogrt signal from the local arbitrator 54 and the loadr signal are applied inputs to an OR gate 438. The output of OR gate 438 and the oen signal from out fifo unit 55 drive inputs of an OR gate 436, the output of which controls the count enable inputs of flip-flops 430 and 432. The −Q output of flip-flop 432 along with the output of OR gate 438 are applied to inverting inputs of AND gate 440, having an output connected to the D input of flip-flop 432. Both flip-flops may be reset by a resetp signal from the Fcode unit. The Q output of flip-flop 430 is also applied to an input of an AND gate 441 while output 0 of the decoder 428 is coupled to another AND gate 441 input. AND gate 441 produces the loadr signal which input enables the assembly register 374 when the ctag code is 00, indicating that the pipe register 360 output is the first word of the two-word type B data transfer sequence.

The chk.r bit, set if the data in assembly register 374 contains a parity error, along with output 3 of decoder 428, set if the current pipe register 360 and assembly register 374 comprise a completed type B sequence, are applied as inputs to an AND gate 442. The output of AND gate 442, along with the other two bits of the chk field, chk.data and chk.id, indicating if the data or identification output fields of pipe register 360 contain parity errors, all drive inputs of a NOR gate 444. Output 1 of decoder 428, set if the ctag field indicates an out of sequence error, additionally provides an input to NOR gate 444. The output of NOR gate 444 is therefore high, unless a parity or an out-of-sequence error has invalidated the current pipe register or assembly register output.

The output of AND gate 442 is further connected to an input of an OR gate 446, while the chk.data and chk.id bits are applied to other input of OR gate 446. Therefore, the output of OR gate 446 is high if any data parity error has occurred. The enl and enr bits from the right and left distance tables drive inputs of a NOR gate 448, the output of which drives an input of an AND gate 450. The output of another AND gate 452, which is high when the current output of pipe register 360 is a type A transmission, is coupled to another input of AND gate 450. The output of AND gate 450 is therefore high if both distance tables supply 0 enable bits, and therefore indicates that the data is "lost", since it cannot be forwarded without at least one high left or right enable bit. The output of AND gate 450 is connected to an input 1 of an encoder 454. The output of OR gate 446, indicating a data parity error, is connected to an input 2 of the encoder. The chk.id bit of the chk field, indicating an identification field parity error, is coupled to an input 3 of encoder 454, while output 1 of decoder 428, indicating an out-of-sequence error, is connected to an input 4 of the encoder. The output of encoder 454 comprises two err field bits (err.s0 and err.sl) which control the switching state of multiplexer 406 of FIG. 18.

The three-bit oreq signal to the local arbitrator 54 is generated by a set of three AND gates 456, 458, and 460. The output of NOR gate 414, which is high except when the Fcode unit is accessing the distance tables, the output 0 of decoder 428, inverted by an inverter 462, and the Q output of flip-flop 430 are all connected to inputs of an AND gate 464, the output of which provides an input to each of AND gates 456, 458, and 460. The output of AND gate 464 is therefore high, enabling the oreq siqnal ⓒutput of AND gates 460, if the Fcode unit is not currently accessing the distance tables, if the current output of the pipe register is other than the first word of a type B sequence, and if the pipe register is not empty.

The ind bit from the assembly register 374 of FIG. 18, output 3 of the decoder 428, and the output of OR gate 444 are all applied as inputs to a NAND gate 466. The output of gate 466 is thus low if the ind bit is set, indicating that the data in the assembly register 374 is part of a special transfer intended for the error unit 58 of FIG. 4, if the ctag code is (11) indicating that the output of the pipe register 360 is the second word of the type B message sequence conveying the special transfer data, and if no data parity error has occurred. Therefore the output of NAND gate 466 is low if the distance unit is ready to generate an oreq signal to the arbitrator unit 54 to request a special type data transfer to the error code unit 58 of FIG. 4.

The output of NAND gate 466, the output of detector 418 and output 3 of decoder 428 are all connected to inputs of another NAND gate 468. The output of gate 468 is therefore low if the current pipe register output data is the second word of a type B transfer sequence, is not part of a special transfer, and is intended for transmission to a distant node. Thus the output of NAND gate 468 is low if the distance unit 50 is ready to generate an oreq signal to the arbitrator unit 54 requesting a a "src3" type transfer of data to the source unit 46 of FIG. 4 wherein the distance, identification and enable fields were transmitted from the out fifo unit 55 and were not generated by the distance tables.

The output of NAND gates 466 and 468, and the outputs of detectors 420 and 422 are connected to inputs of another NAND gate 470. The output of gate 470 is therefore low if the current pipe register output identification field indicates an Fcode transfer, if the data(bs) output field of the assembly register 374 indicates that the Fcode transfer is to access registers in the interface unit 24 of the local of the node, and if the transmission is neither a special nor an src3 type transfer. Thus the output of NAND gate 470 is low if the distance unit is ready to generate an oreq signal to the arbitrator unit 54 requesting an "Fcode" transfer cf data to the Fcode unit 56 of the local node.

The output of NAND gates 466, 468 and 470, and the output of an OR gate 474, are applied as inputs to another NAND gate 472. The inputs to OR gate 474 comprise the outputs of detectors 422 and 424 and output 3 of decoder 428. The output of gate 472 is therefore low if the current pipe register output identification indicates an Fcode or message type transfer not intended for the Fcode unit 56 of the local node or to be transmitted to any other node. Thus the output of NAND gate 470 iṣ low if the distance unit is ready to generate an oreq signal to the arbitrator unit 54 requesting a transfer of data back to the device interface unit 26 via the in fifo buffer 53.

The inputs to an AND gate 452 comprise the outputs of NOR gates 466, 468, 470 and 472. The output of AND gate 452 is therefore high when all of the outputs of the four AND gate inputs are high. This occurs only when the pipe register 360 output data is a type A transfer to be forwarded to a distant node using identification, distance and enable fields from the right or left distance tables. Thus a low output of AND gate 452 indicates that the distance unit is ready to generate an oreq signal to the arbitrator unit 54 requesting an "src2" transfer data to the source unit 46.

A second input to AND gate 460 is driven by the output of an OR gate 476 having as inputs the output of inverter 445, the output of AND gate 450 and the outputs of NAND gates 466 and 470, inverted by a pair of inverters 478 and 486, respectively, A second input to AND gate 458 is driven by the output of another OR gate 480 which has as inputs the output of AND gate 468, inverted by inverter 482, the outputs of AND gates 450 and 452 and the output of inverter 445. The output of an OR gate 484 is applied to a second input of AND gate 456, the inputs to OR gate 484 comprising the output of AND gate 450, the output of inverter 445 and the outputs of AND gates 470 and 472, inverted by inverters 486 and 490 respectively. Thus the output of AND gate 460 the oreq.b2 bit, is high when the distance unit requests a special, Fcode or error type transfer through the X unit 60 to the Fcode unit 56 or the error unit 58. The output of AND gate 458, the oreq.bl bit is high when the distance unit requests an src3 or src2 transfer to the source unit or an error code transfer to the error unit. The output of AND gate 456, the oreq.b0 bit, is high when the distance unit requests an Fcode or error type transfer through the X unit 60 or requests a transfer to the in fifo 53. The arbitrator 54 decodes the three-bit oeeq signal to determine which of the six types of data transfer is requested by the distance unit 50.

The grant signal (ogrt) returned by the local arbitrator 54 following receipt of an ore q signal comprises the lo enable signal enabling buffer 360 of FIG. 18 to forward the least significant portion of the data field in the pipe register 360. The grant signal is also applied as an input to an AND gate 492 while the output of AND gate 466 is applied as another input to the AND gate 492. The output of AND gate 492 comprises the hi signal enabling buffer 366 of FIG. 18 to forward the most significant portion of the data field in the pipe register. Thus the most and the least significant portions of the data field are always forwarded on receipt of a grant signal, except in the case of a special type data transfer where only the least significant portion of the data is forwarded.

The grant signal also drives an input of another AND gate 496. Other inputs of AND gate 496 are driven by the output of AND gate 452 and NOR gate 451. The tbl signal, enabling the output buffers of the right and left distance tables, is produced by an inverter 498, which inverts the output of NAND gate 496. Thus the tbl signal is asserted on receipt of a grant signal when the data in the pipe register is a type A transfer and does not include any parity or out-of-sequence errors. The output of NAND gate 496 and the output of AND gate 492 are connected to inputs of another AND gate 500 producing the fix signal enabling the output buffers of the assembly register 374. Thus the fix signal is asserted on receipt of a grant signal when the current outputs of the pipe register 360 and the assembly register 373 are not to access the distance table and do not comprise a special transmission.

In Fifo Buffer Unit

Figure 20:
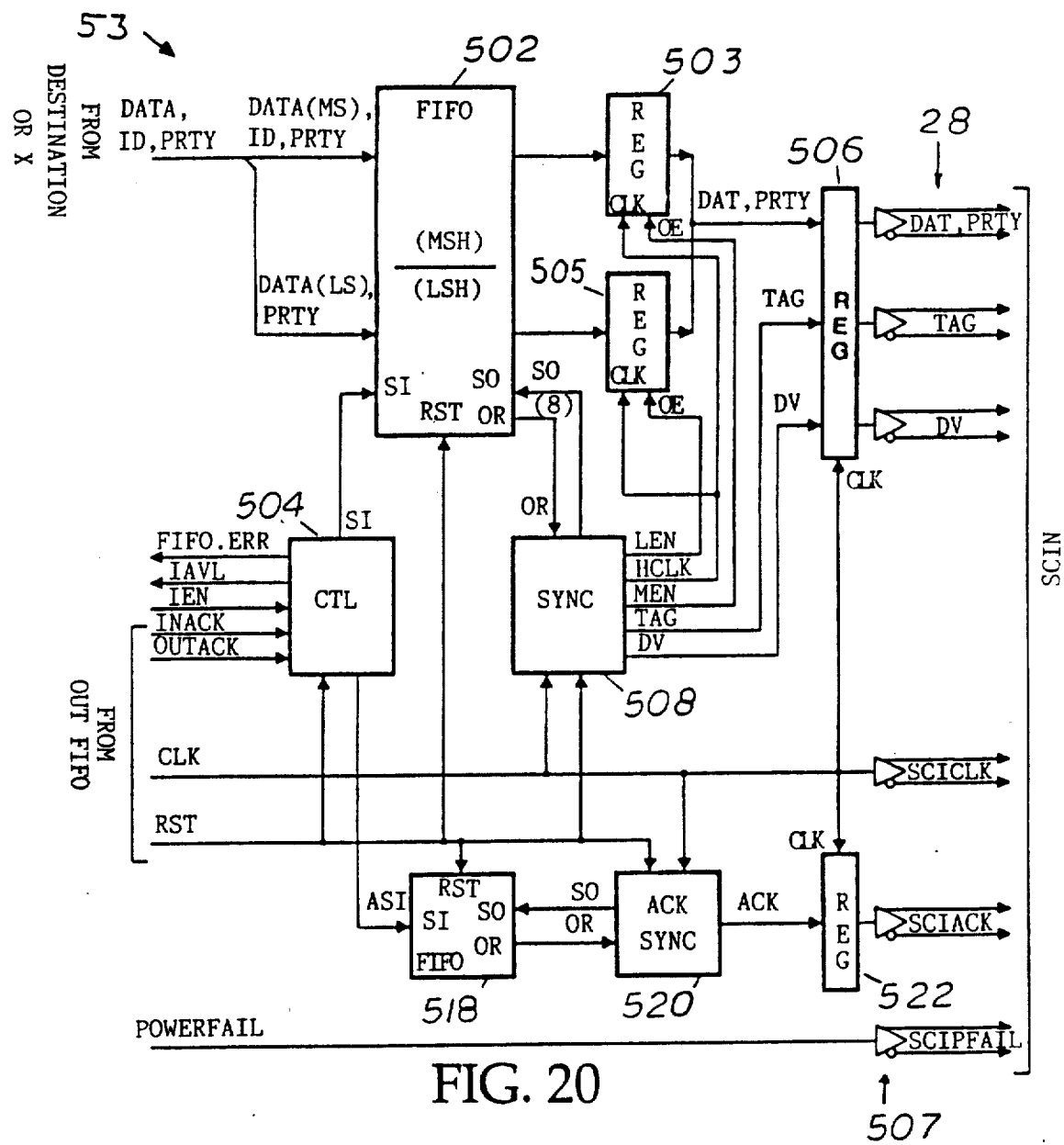
FIG. 20 is a combined block and schematic diagram of the in fifo unit of FIG. 4.

Referring to FIG. 20, the in fifo buffer unit 53 of the intermediate port 52 of FIG. 4, depicted in block diagram form, is adapted to receive data transfers from the destination unit 47 or from the X unit 60 of FIG. 4 and to forward them to the device interface unit 26 over the SCin portion of the local I/0 bus 28. Incoming data is stored in a sixty-four stage fifo buffer 502 similar to the fifo buffer 308 of the out fifo unit 55 of FIG. 13, but having MSH and LSH sections each implemented utilizing four separate intggrated circuits each. The identification field, the fourteen most significant bits of the data field, data (ms), and the associated parity bit of the incoming data are applied as inputs to an MSH section of the fifo buffer 502. The eighteen least significant bits of the data field, data(ls), along with their associate parity bit, are applied as inputs to an LSH section of fifo buffer 502. A control circuit 504 maintains a count of the number of data words currently stored in fifo buffer 502 and transmits available signal (iavl) to the local arbitrator 54 of FIG. 4 when the buffer is currently storing less than 64 words. When the arbitrator 54 determines that the destinat;on unit 47 or the X unit 60 is reddy to transfer data to the in fifo unit 53, and the control circuit 504 is currently asserting the iavl signal, the arbitrator transmits an enable signal (ien) to the control circuit. The control circuit 504 then transmits a shift-in (si signal to a shift in input of each section of fifo buffer 502 causing the buffer to shift in the incoming data. The control circuit 504 also increments its internal count of filled buffer stages.

The data stored longest in the MSH section of the buffer 502 is applied as an input to a register 503 while the longest stored data in the LSH section of buffer 502 is applied as an input to another register 505. The outputs of registers 503 and 505 are connected in parallel to inputs of a register 506. Data stored in register 506 is transmitted to a receiving fifo buffer in the dev:ce interface unit over the SCin bus via buffering amplifiers 507.

When the four MSH section circuits and the four LSH section circuits of fifo buffer 502 are not empty, they each transmit an output ready (or) signal to a synchronizing circuit 508. Synchronizer 508 then transmits an hclk signal to clock inputs of both registers 503 and 505, causing them to acquire the input data. Synchronizer 508 then transmits a shift-out (so) signal to the ifo buffer 502 causing it to shift-out the data. The synchronizer circuit next transmits a tag field (indicating that the data to be stored in register 506 is the first word of a two-word transmission), a single-bit data valid (dv) field to another input of register 506, and an output enable signal (men) to register 503. Register 503 then transmits the stored MSH data to register 506. Register 506 stores the data from register 503 along with the tag and dv fields from synchronizer 508 on receipt of the next bus clock signal (clk). When this data is stored in register 506, it is further transmitted to the device interface unit over the SCin bus. The synchronizer circuit 508 then output enables register 505 with another enabling signal (len), causing the LSH data in register 505 to be transmitted to register 506. At the same time, the synchronizing circuit applies the dv bit and another tag field as input to register 506, indicating that the data in the register is the second word of a two-word transmission. The LSH data, tag and dv bit inputs are then stored in register 506 on receipt of the next clock pulse, and are further transmitted to the device interface unit over the SCin bus.

On receiving the MSH and LSH data words from the in fifo unit 53, the receiving fifo unit in the device interface 26 stores them in the MSH and LSH sections of its 64-stage fifo buffer and transmits an acknowledge signal to a sending fifo unit in the device interface unit 26 which forwards tle acknowledge signal to the out fifo unit 55 over the SCout bus. The out fifo unit then transmits an acknowledge signal (inack) to the control circuit 504 of the in fifo unit 53 and on receipt of the inack signal, the control circuit decrements the count of words stored in fifo buffer 502.

Figure 21:
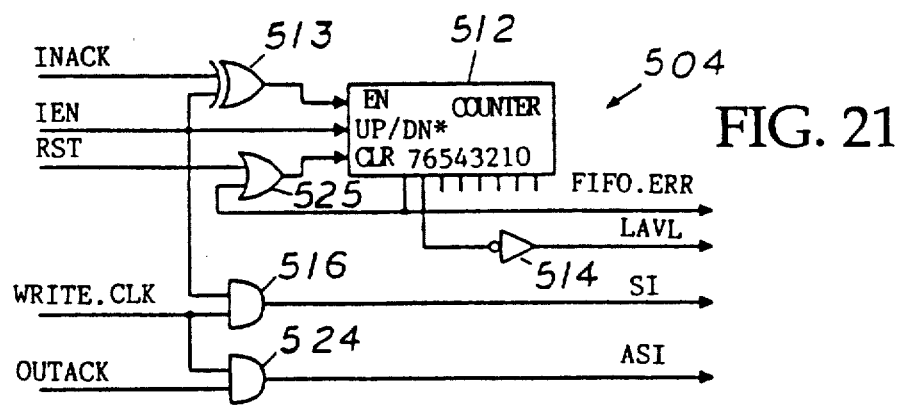
FIG. 21 is a schematic diagram of the sequencing circuit of the in fifo buffer of FIG. 20.

The control circuit 504, depicted in schematic diagram form in FIG. 21, includes a counter 512, count enabled by the output of an XOR gate 513, and having the inack and ien signals as inputs. The ien signal is also coupled to an up/down* control input of counter 512 so that the counter counts up when ien goes high and inack is low (i. e. when data is shifted into the fifo buffer 502 but a data out shift has not been acknowledged by the receiving fifo unit), counts down when ien is low and inack is high (i.e., when the receiving unit acknowl ) edges a shift-out but no shift-in has occurred during the current cycle), and does not count up nor down when inack and ien are both high or both low. When both inack and ien go high, data has been shifted into the in fifo buffer 502 during the same I/0 bus clock cycle that a shift out has been acknowledged. Since the number of words stored in the fifo buffers on either end of the SCir bus has not changed, the count in counter 512 remains unchanged. A counter bit (6), representing a count of sixty-four, is inverted by an inverter 514 to produce the iavl signal to the local arbitrator unit 54. The ien signal. along with a write.clk signal derived from the system bus clock, are applied to inputs of an AND gate 516 which produces the shift-in (si) signal as its output.

Counter 512 output bit 7 is set only when the buffer is overloaded. This bit is transmitted to the error unit as a "fifo.err" signal and also is applied as an OR gate 525. the output of which clears counter 512. The system reset signal rst also provides an input to OR gate 525.

Figure 22:
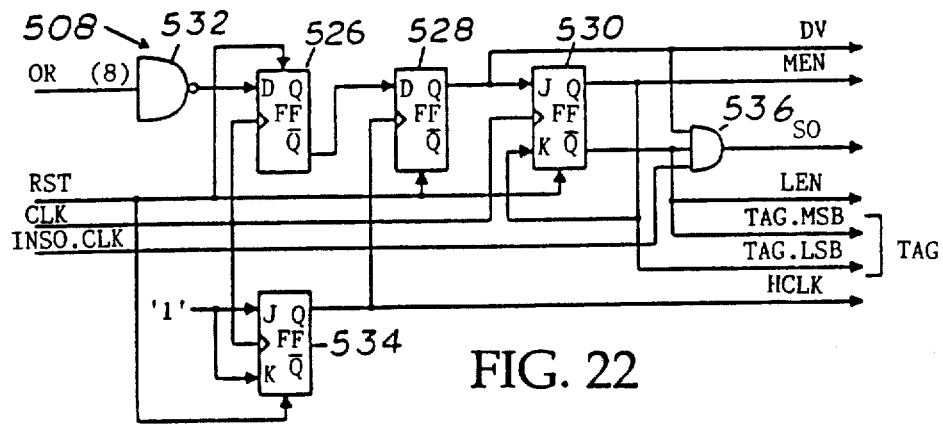
FIG. 22 is a schematic diagram of the synchronizing circuit of the in fifo buffer of FIG. 20.

The in fifo synchronizing circuit 503 of FIG. 20, depicted in detailed schematic diagram form in FIG. 22. comprises a set of two type D flip-flops 526 and 528, and two JK-flip-flops 530 and 534, all reset by the rst signal. The eight output ready (or) signals from the fifo buffer 502 are applied as inputs to a NAND gate 532 having an output connected to the D input of flip-flop 526. logical "1" is connected to the j and K inputs of flip-flop 534. The Q output of flip-flop 534 clocks flip-flop 528, and the clk signal clocks flip-flops 526, 530 and 534. The Q output of flip-flop 534, high during every other clk cycle, comprises the hclk signal which input enables registers 503 and 505 of FIG. 20.

Flip-flop 526 is reset when the fifo buffer is output ready, causing flip-flop 528 to set just after the next hclk signal is generated by flip-flop 534. The Q output of flip-flop 528 comprises the dv bit to be stored in register 506 cf FIG. 20 along with the data from registers 503 or 505. The Q output of flip-flop 528 is connected to the J input of flip-flop 530 while the Q output of flip-flop 530, comprising the men signal which output enables register 503, is fed back to its own K input. When the Q output of flip-flop 528 first goes high, the Q output of flip-flop 530 is driven high, output enabling register 503. On the next clk pulse, the F and K inputs to flip-flcp 530 are both high causing flip-flop 530 to reset. The −Q output of flip-flop 530 provides the len signal output enabling register 505.

The dv bit, the Q output of flip-flcp 530, and a controlled pulse-width clock signal (inso.clk) derived from the clk signal, are all applied as inputs to an AND gate 536 which produces the shift-out signal to the fifo buffer 502 after the MSH and LSH portions of the data have both beer stored in register 506 and transmitted to the device interface unit. One bit (tag.msb) of the tag signal applied to register 506 comprises the −Q output of flip-flop 530 while the other bit (tag.lsb) comprises the Q output of flip-flop 530.

Referring again to FIG. 20, the control circuit 53 also receives the outack signal generated by the out fifo unit 55 when it has received data from a sending fifo unit in the device irterface unit 26. The control unit then transmits a shift-in signal (asi) to a 64-stage acknowledge fifo buffer 518. When fifo buffer 518 is not empty, it transmits an output ready (or) signal to an acknowledge synchronizing circuit 520 which responds by transmitting a shift-out (so) signal to the fifo buffer 518 on the next clock cycle (clk) and also by transmitting a high acknowledge bit (ack) to another register 522. The ack bit is stored in register 522 on receipt of the clk signal and transmits a "sciack" signal to the receiving fifo unit in DMA control unit 26 over the SCin but 26. In FIG. 21, fifo control circuit 20 includes another AND gate 524 for producing theaasi signal in response to inputs driven high by the write.clk and outack signals.

Figure 23:
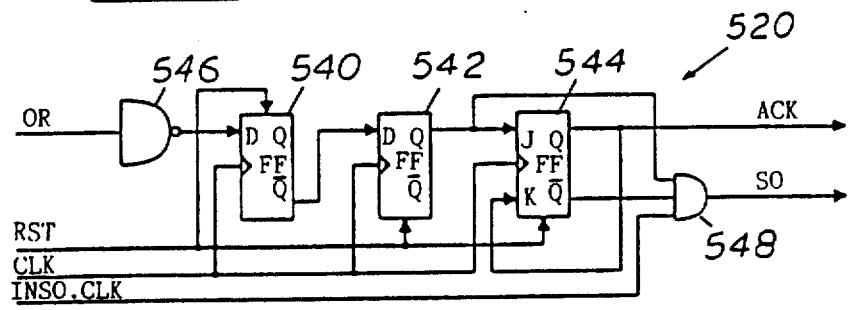
FIG. 23 is a schematic diagram of the acknowledge synchronizing circuit of the in fifo buffer of FIG. 20.

Re+ =rring to FIG. 23, the acknowledge synchronizing circuit 520 of FIG. 20, depicted in schematic diagram form, comprises a set of two type D flip-flops 540 and 542, and a JK flip-flop 544, all of which are reset by the system reset signal (rst) and clocked by the system clock si(nal (clk). The output ready (or) signal from the acknowledge fifo buffer 518 is applied as an input to a NAND gate 546 having an output connected to the D input of flip-flop 540. The −Q output of fliP-flop 540 is connected to the D input of flip-flop 542, while the Q output of flip-flop 542 is connecte1 to the J input of flip-flop 544. The Q output of flip-flop 544, providing the acknowledge signal ((ack) to the out fifo unit, is fed back to its K input. The Q output of flip-flop 542 and the −Q output of flip-flop 544, along with the inso.clk signal, drive inputs of an AND gate 548 which outputs the shift out signal, so, to the in fifo buffer. When the acknowledge fifo buffer 518 of FIG. 20 transmits the output ready signal (or) to the synchronizer 520, the output of AND gate 546 is driven low, resetting flip-flop 540. At the end of the first clk signal pulse thereafter, flip-flop 542 is set, permitting AND gate 548 to generate the shift out signal on the next pulse of the inso.clk signal. On the second system clock (clk) pulse, flip-flop 544 is set, its Q output producing the acknowledge signal and its −Q output turning off the shift out signal. Then, on the third system clock pulse, flip-flop 544 resets, turning off the acknowledge signal. Flip-flops 540 and 542 reset whenever the output ready signal goes low.

Fcode Unit

Figure 24:
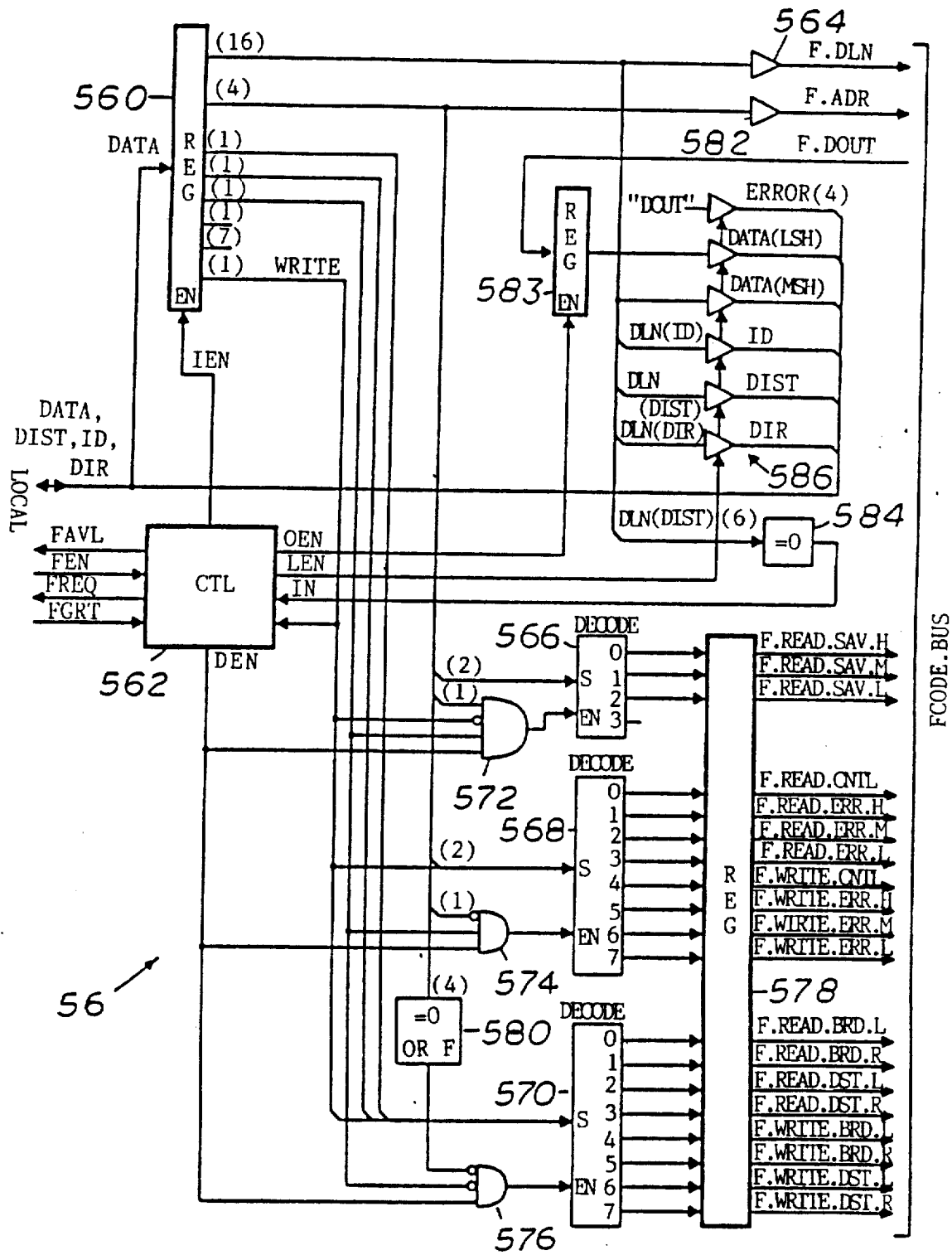
FIG. 24 is a combined block and schematic diagram of the Fcode unit of FIG. 4.

Referring to FIG. 24, the Fcode unit 56 of FIG. 4, depicted in more detailed block diagram form, is adapted to receive Fcode transmissions from the system bus via the destination unit 47 and X unit 60, or from the processing device connected to the node via the out fifo unit 55, distance unit 50, and X unit 60. When the Fcode is an instruction to write data into a register or table on the interface unit 24, the Fcode unit 56 decodes a portion of the data field in the Fcode to determine which register or table is to be accessed and then transmits data contained in another portion of the Fcode data field to the selected table or register over the Fcode bus, alorg with the appropriate write control and table addressing signals. When the Fcode is an instruction to read data in a selected table or register, the Fcode unit 56 decodes a portion of the Fcode data field to determine which register or table is to be read, transmits the appropriate table address and read control signals to the table or register over the Fcode bus, acquires the data read from the table or register over the Fcode bus, and then transmits a message containing the acquired data to a location on the system bus determined by data contained in the original Fcode transmission.

The sixteen most significant bits (msb) of the data field of an incoming Fcode transmission determine whether the transmission is a read or write request and which register or table location is to be accessed. The least significant sixteen bits of the data field of an incoming Fcode write type transmission comprise the data to be written to the register of the table location. In a real type Fcode transmission the sixteen least significant bits of the data field include the six-bit distance, four-bit identification, and single-bit direction fields necessary to route a return message containing the data read from the selected register of table location to a selected node. Another five of the sixteen least significant bits comprise a "vector" field containing any selected code to help the device serviced by the receiving node identify the source of the information. This vector field is also returned to the receiving node in the return message.

In FIG. 24, the 32-bit data field of the Fcode transmission is applied as an input to a register 560 which is input enabled by a signal (ien) from an Fcode unit control circuit 562. The control circuit keeps track of the status of the Fcode unit and transmits an available (favl) signal to the local arbitrator 54 when the Fcode unit 56 is ready to accept another Fcode message from the destination unit 47 or from the out fifo unit 55 of FIG. 4. The control circuit 562 generates the ien signal on receipt of an enable signal (fen) from the arbitrator.

The sixteen least significant bits of the data stored in register 560 are applied to a set of buffers 564 which drive data lines (f.dln) of the Fcode bus carrying the data to be written to a register or table during a write operation. Bits 0, and 9-15 are decoded by a logic circuit comprising three decoders 566, 568 and 570, AND gates 572, 574 and 576, and a detector 580 to produce a set of register read and write control signals to be stored in another register 578, the output thereof comprising write control lines of the Fcode bus connected to the read and write control inputs of the various registers and tables of the interface unit 24. Bits 1-7 of the Fcode are not decoded since this operation was performed by the destination unit 47 or the distance table 54 when the Fcode transmission was received by these units. As described hereinabove, these units transmit request signals to the local arbitrator 54 coded to indicate that the Fcode transmission is intended for the Fcode unit 56. Bit 8 of the most significant portion of the Fcode data field is also ignored by the decoding portion of the Fcode unit 56 because, the bit state is irrelevant to register or table location selection. Bits 12-15 of the most significant portion of the incoming data field are also transmitted through another set of buffers 582 and a set of four address lines (f.add) to address terminals of the distance tables in distance unit 50 and the broadcast tables in the left and right forwarding units 34 and 36. These four bits select the address location (1-E) to be accessed during a table entry read or write operation.

Decoder 566 and AND gate 572 are provided to determine when the Fcode was sent to read the state save register in the error unit 58. Most significant bits 14 and 15 are applied as inputs to decoder 566 while the output of AND gate 572 enables the decoder. Bits 9 and 13 are applied to noninverting inputs of the AND gate 572 while the read/write bit 0 is applied to an inverting input. An enabling signal (den) from control circuit 562 is applied as another input to AND gate 572. When bit 0 is low, indicating a read operation, and bits 9 and 13 are high, indicating that the state save register of the error unit 56 is to be accessed, and when AND gate 572 is enabled by the den signal, the output of AND gate 572 enables decoder 566. Bits 14 and 15 are decoded. The 0, 1 and 2 outputs of decoder 566, indicating the state of the two-bit input, are then stored in register 578 thereby driving high the appropriate read control line.

The decoder 568 determines when the Fcode is intended to access registers in the Fcode or error units. Most significant bits 0, 14 and 15 are applied as inputs to decoder 568 and the output of AND gate 574 enables the decoder. Bit 9 is applied to a non-inverting input of the AND gate, while bit 13 is applied to an inverting input and an enabling signal (den) from control circuit 562 is applied as another input to AND gate 574. When bit 9 is high and bit 13 is low, indicating the control or error status registers are to be accessed, and when the AND gate 574 is enabled by the den signal, the output of AND gate 574 enables decoder 566. Bits 0, 14 and 15 are then decoded. The 0-7 outputs of decoder 568, indicating the state of the three-bit input, are stored in register 578, thereby driving high the appropriate Fcode bus read or write control line.

The decoder 570 determines when the Fcode is intended to access the broadcast or distance tables. Most significant bits 0, 10 and 11 drive inputs to decoder 570 and the output of AND gate 576 enables the decoder. Least significant bits 12-15 are applied to detector circuit 580 which outputs a high bit if these four bits are a hexadecimal 0 or F. The output of detector 580, along with most significant bit 9, are applied to inverting inputs of the AND gate 576, while the enabling signal (den) from control circuit 562 is applied to a non-inverting input of the AND gate. When bit 9 and the output of detector 580 are low, indicating that one of the broadcast or distance table addresses is to be accessed, and when the AND gate 576 is enabled by the den signal, the output of AND gate 576 enables decoder 570. Bits 0, 10 and 11 are then decoded. The 0-7 outputs of decoder 570, indicating the state of the three-bit input, are stored in register 578, thereby driving high the appropriate Fcode bus read or write control line.

During a read operation, the return distance field data in the least significant portion of the incoming Fcode data field is applied to a detector 584 which outputs a high bit (in) to the control circuit 562 if the distance field is 0, indicating the local device is to receive the return message. The data from the accessed register or table location is returned on a set of data lines (f.dout) of the Fcode bus to a register 583 which is input enabled by a signal (oen) from control circuit 562. When the control circuit determines that a return message is ready to be transmitted, the control circuit transmits a two-bit request signal (freq) to the local arbitrator 54 indicating it has a message to send and whether it is to go to the device interface unit via in fifo unit 53 or to a distant node through source unit 46. At the same time, the control circuit 562 also output enables a set of buffers 586 with an enable signal (len), buffers 586 thereby transmitting as the return message on the local bus to the unit 60 the data in registers 583 and 560.

Figure 25:
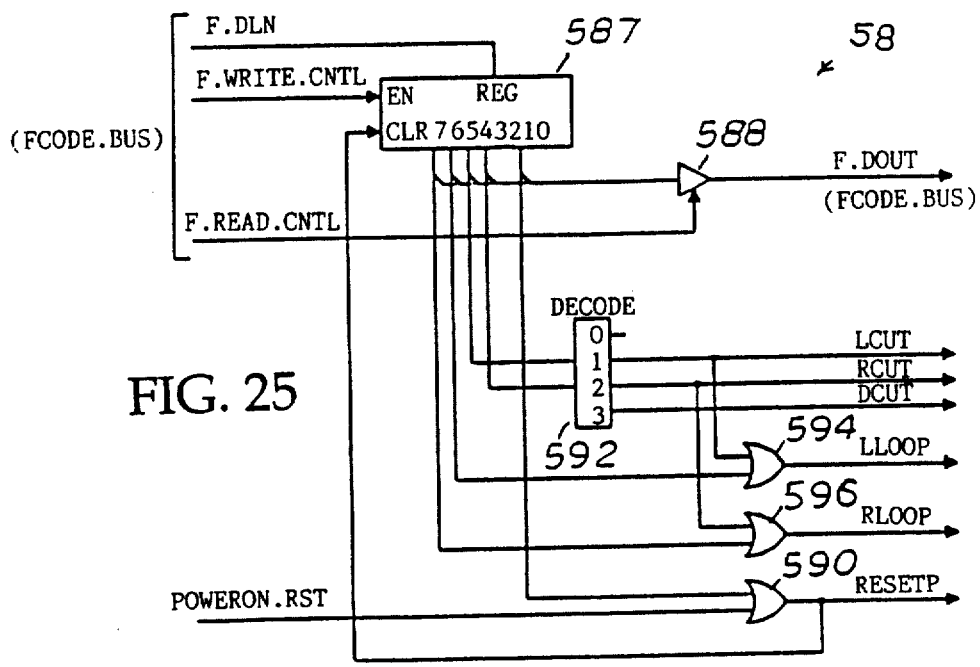
FIG. 25 is a schematic diagram of a portion of the control circuit of the Fcode unit of FIG. 24.

Referring to FIG. 25, depicting in block diagram form another portion of Fcode unit 56, the Fcode unit further comprises an eight-bit control register 587 for storing data controlling the current status of a set of fbpar, lcut, rcut, dcut, lloop, rloop and resetp signal outputs of the Fcode unit. This data is transmitted to data input terminals of register 587 over the f.din lines of the Fcode bus and stored in the register on receipt of an f.write.cntl signal from register 578 of FIG. 524. Data in register 587 may be read by asserting the f.read.cntl control line from register 578 which enables a buffer 588 connecting the register 587 output to the f.dout lines of the Fcode bus. Bit 2 in the register 587, set if the resetp signal is to be asserted, drives one input to an OR gate 590 while a "poweron.rst" signal, initiated when the bus system is initially energized, drives another OR gate input. The resetp signal for resetting all of the flip-flops and registers in the various circuits of the interface uni: 24, comprises the output of OR gate 590. The resetp signal is also applied to a clear input of register 587.

Bits 4 and 5 of register 587 determine whether or not the left, right or local ports are in the cut mode according to the following table (Table II) where "lcut" is a left port cut mode control signal, "rcut" is a right port cut mode control signal, and "dcut" is a local port cut mode control signal, the control signals being high when the port is in the cut mode:

TABLE II

| BIT 4 | BIT 5 | lcut | rcut | dcut |
|---|---|---|---|---|
| 0 | 0 | 0 | 0 | 0 |
| 0 | 1 | 1 | 0 | 0 |
| 1 | 0 | 0 | 1 | 0 |
| 1 | 1 | 0 | 0 | 1 |

Bits 4 and 5 of register 587 are connected to inputs of a decoder 592 which produces the appropriate lcut, rcut and dcut signals to be transmitted to the corresponding ports.

Bit 6 of register 587, set when the left port is to be in the loop mode, is applied to an input of an OR gate 594 as is the lcut signal output of decoder 592. The output of the OR gate 594, the lloop signal, is thus high, driving the left port into the loop mode when bit 6 is set or when the left port is also in the cut mode. Similarly bit 7 of register 587 is set when the right port is to be in the loop mode and is applied along with the rcut signal as inputs to another OR gate 596 producing the rloop signal for the right port.

Figure 26:
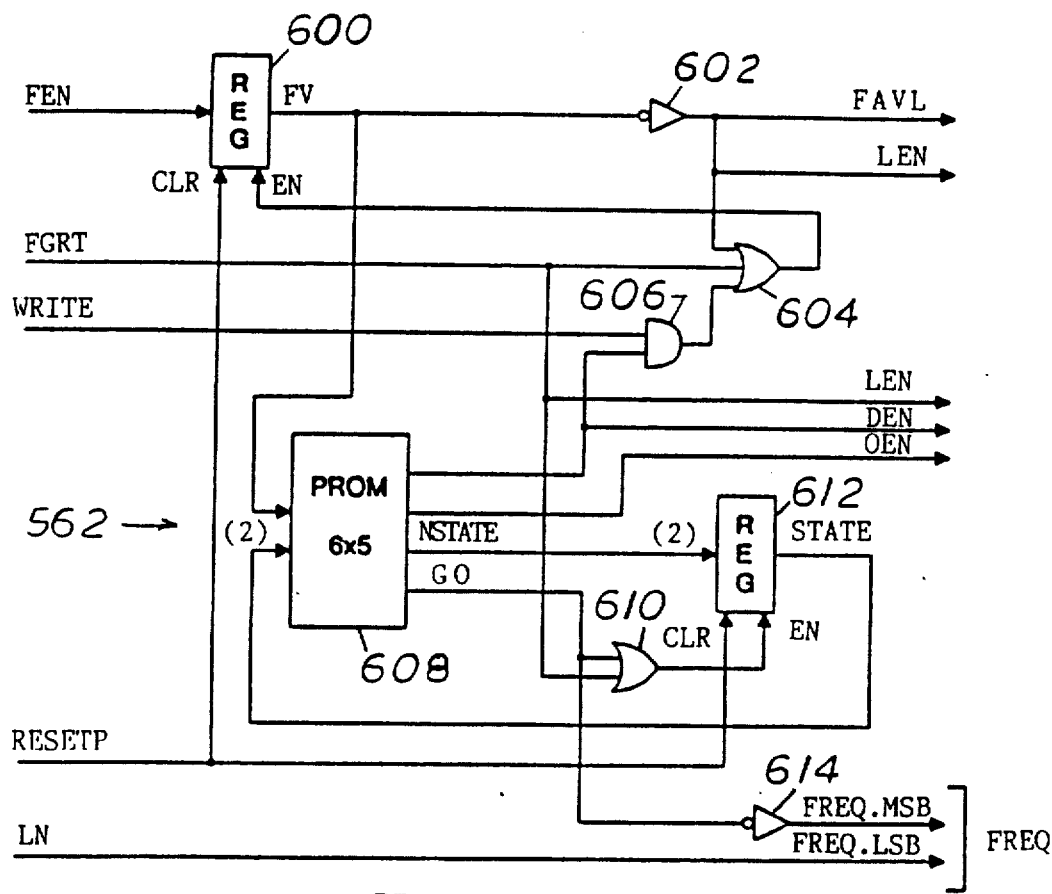
FIG. 26 is a schematic diagram of another portion of the control circuit of the Fcode unit of FIG. 24.

Referring to FIG. 26, the Fcode unit control circuit 562 of FIG. 24, depicted in more detailed block and schematic diagram form, is adapted to control the sequencing of Fcode read and write operations. The enable signal (fen) from the local arbitrator 54 is stored in a single bit register 600 enabled by the system clock. The current bit stored in register 600 is inverted by an inverter 602 and transmitted back to the local arbitrator 54 of FIG. 4 as the favl signal. The output of the inverter 602 also comprises the ien signal which input enables register 560. As soon as a high fen signal from the local arbitrator 54 is clocked into register 600, the ien signal is turned off and the current Fcode data field is stored in register 560. The grant signal (fgrt) from the local arbitrator 54 is connected to an input of an OR gate 604, the output of which controls the enable input (en) of register 600. When the fgrt signal is initiated, the current state of the fen signal is stored in register 600. The write bit (msb 0) of the Fcode data field, along with an enable nit (den output of the control circuit 562 generated by a programmable read only memory (PROM) 608, are applied as inputs to an AND gate 606. The output of AND gate 606, together with the favl signal, provide additional inputs to OR gate 604 so that register 600 is also input enabled when the favl signal goes high or when the write bit and the den signal from PROM 6u8 both go high.

The fgrt signal from the local arbitrator 54 comprises the len signal output of the control circuit 562 and the oen enable bit output of the control circuit is generated by PROM 608. A two-bit "nstate" output of PROM 608 is applied as an input to a state register 612, the output of which, along with the signal bit (fv) output of register 600, addresses PROM 608. The fgrt signal, with a "go" output bit of PROM 608, are connected as inputs to an OR gate 610 enabling register 612. Registers 600 and 612 may both be cleared on assertion of the resetp signal.

The go bit output of PROM 608 is inverted by an inverter 614 to generate one bit (freq.msb) of the request signal (freq) to the word arbitrator. The "in" output bit of the detector 584 of FIG. 23 comprises the other bit of the freq signal (freq.lsg).

PROM 608 has six five-bit addressable storage locations loaded according to the following Table III:

TABLE III

| Address | | Data | | | |
|---|---|---|---|---|---|
| state | fv | nstate | go | den | oen |
| 00 | 0 | 00 | 1 | 0 | 0 |
| 00 | 1 | 01 | 1 | 1 | 0 |
| 01 | 0 | 00 | 1 | 0 | 0 |
| 01 | 1 | 10 | 0 | 1 | 0 |
| 10 | 0 | 00 | 1 | 0 | 0 |
| 10 | 1 | 00 | 1 | 1 | 0 |

PROM 608 and register 612 act as a state machine to control the sequencing of Fcode read and write operations. The nstate bits indicate the next state of the state machine, the go bit indicates whether or not the next state is to be stored in register 612, the den bit enables Fcode decoding, and the oen bit enables receipt of data returned from a register or table as a result of a read operation.

In an Fcode write operation, PROM 608 idles at address 00 until a high fen bit is stored in register 600, thereby turning off the favl signal output of inverter 602, input enabling register 560 to store the incoming Fcode data field, and changing the address of PROM 608 to 001. On the next clock cycle, PROM 608 outputs a high den bit, enabling the decoding of the Fcode trarsmission. The data is then written to the selected register or table location. At the same time, the high den bit output of the PROM and the high write bit from register 560 input enable register 600 by turning on AND oate 606 and OR gate 604, causing register 600 to store the current fen input signal which is now low. The PROM also outputs a 01 nstate field which, in conjunction with the low fv output bit of register 600, changes the PROM address to 010. On the next clock cycle the PROM 608 outputs a 00 nstate field for driving the PROM back to its 000 idle state in conjunction with the 0 fv bit. Thus the write operation requires two system clock cycles.

In an Fcode read operation, PROM 608 idles at address 000 with the go output bit high until a high fen bit is stored in register 600, causing the ien output signal of buffer 602 to go low thereby input enabling register 600. The fv output bit of register 600 shifts PROM 608 to address 001 on the next system clock pulse, driving the den bit high, thereby causing the Fcode unit to decode the incoming transmission and to address the register or RAM storage location being read. On the next system clock pulse, the nstate output (01) of the PROM is clocked through register 612, since the go bit is still high, and shifts the PROM address to 011 where the den bit is turned off and the oen bit is turned on. The oen bit causes the register 583 to store the data read from the addressed register or RAM storage location On the next clock pulse, the nstate output (11) of the PROM is clocked through register 612 changing the PROM address to (111). The oen and the go bit are then turned off and the current nstate output (00) is not clocked through register 612 until the fgrt signal drives the outputs of OR gates 604 and 610 high. At this point the current fen signal, which is now low, is stored in register 600, driving the fv bit low, and the 00 nstate output of PROM 608 is passed through register 612, thereby returning the PROM address to the 000 idle state. Thus the read operation may be completed in a minimum of four clock cycles.

When the arbitrator 54 transmits the grant (fgrt) signal to the Fcode unit, the control circuit 562 initiates the len signal which output enables buffers 586 to transmit the return message outward from the Fcode unit to the X unit 60. Thus during a read operation the Fcode unit requires three bus clock cycles to return the data read and a fourth cycle to reset the PROM to the idle state. However, if the arbitrator 54 happens to generate the fgrt signal while PROM 608 is still in state 111, the fgrt signal will input enable register 600 through OR gate 604, driving the fv bit low. In this case, the PROM 608 will be readdressed directly to the idle state 000.

Error Unit

Figure 27:
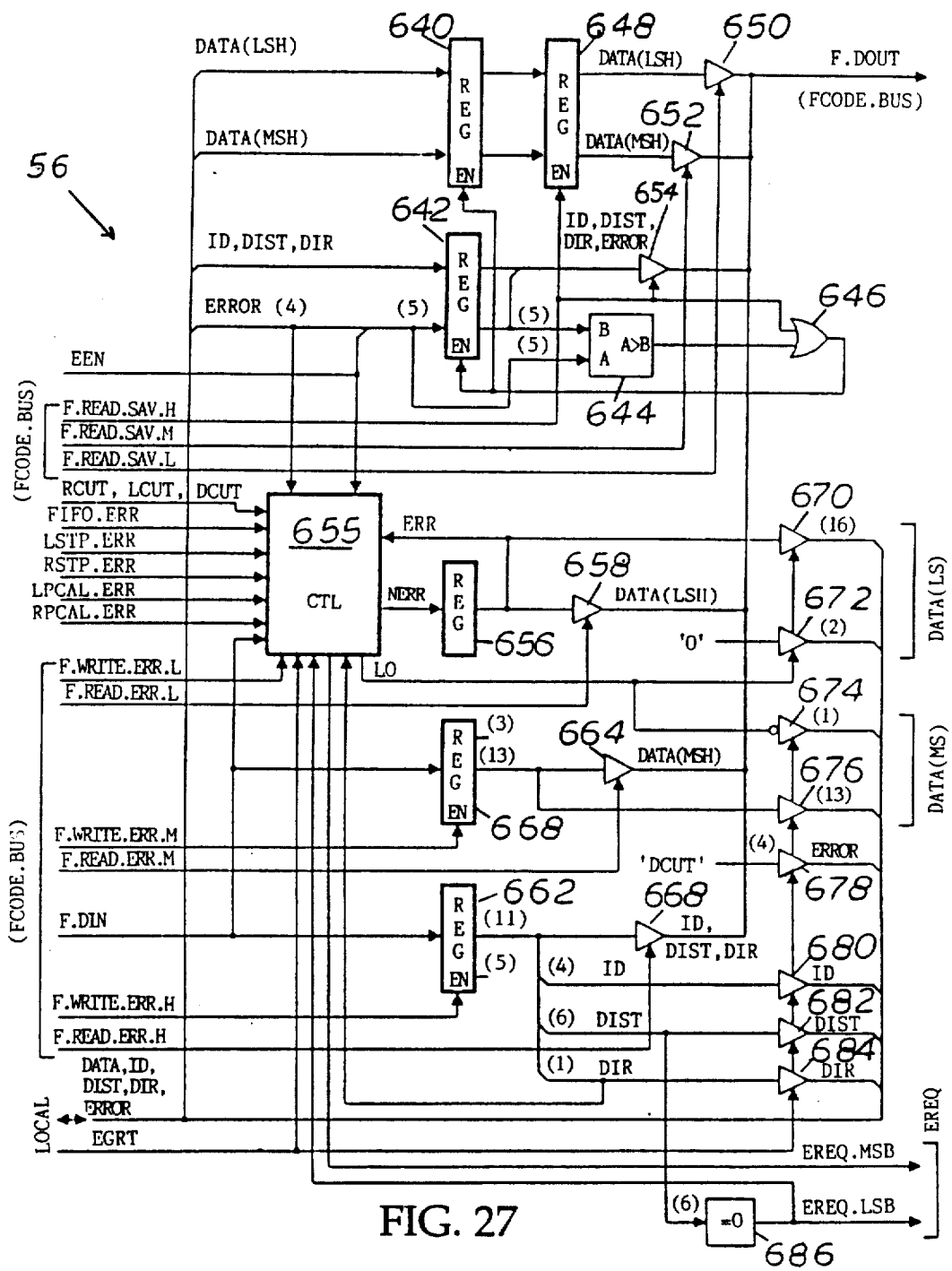
FIG. 27 is a schematic diagram of the error unit of FIG. 4.

Referring to FIG. 27, the error unit 56 of FIG. 4, depicted in block and schematic diagram form, is adapted to save the state of data transmissions from the destination unit 47 or from the distance unit 50 containing error fields indicating that an error has occurred. A saved error state may then be read by the Fcode unit and transmitted to any processing device connected to the bus. These tansmissions arrive at theerror unit over the local bus by way of the X unt 60. The data field of eachh transmission is applied as an input to a "state save" register 640 while hte identification, distance, direction ad error fields, along with the enable bit (een) from teh local arbitrator 54, are applied as inputs to another state save register 642. The error field is four-bits wide and is encoded as follows in Table IV.

TABLE IV

| Code | Error | Description |
|---|---|---|
| 0000 | dcut | Any transmission is attempted to the local device when the node is in the dcut mode. |
| 0001 | rcut | Any transmission to the right is attempted while right port is in cut mode. |
| 0010 | lcut | Any transmission is attempted to the left while left port is in cut mode. |
| 0011 | dlost | No enable bit set in distance tables when the tables are accessed. |
| 0100 | rlost | No forward or received bit set in right forwarding unit when the broadcast table accessed. |
| 0101 | llost | No forwarding or received bit is set in left forwarding unit when the broadcast table is accessed. |
| 0110 | dprty | Parity error in data or identification from device interface unit. |
| 0111 | rdatprty | Parity error in data field detected by right port. |
| 1000 | ldatprty | Parity error in data field detected by left port. |
| 1001 | ridprty | Parity error in identification or distance fields from right port. |
| 1010 | lidprty | Parity error in identification or distance fields from left port. |
| 1011 | seq | Sequence error in data arriving at distance unit. |

The last four-bit error field and the een bit stored in register 642 are applied to a B input of an A > B detector 644 while the current error field arriving on the local bus and the enable signal from the local arbitrator are applied to the A input of detector 644, the een bits comprising the most significant bits of the A and B detector inputs. The output of detector 644 is applied as an input to an OR gate 646 while the output of OR gate 646 is connected to the enable inputs of registers 640 and 642.

Initially, on system power up, all bits stored in register 642 are set to 0. When the local arbitrator asserts the een signal, the A input of detector 644 exceeds the B input, driving the output of detector 644 and the output of OR gate 646 high and input enabling registers 640 and 642. Registers 640 and 642 then save the current transmission on the local bus. Each time the een signal is asserted thereafter, state save registers 640 and 642 are input enabled, provided, however, that the incoming error field magnitude exceeds the magnitude of the last stored error field. The errors indicated by the error field are numbered in order of priority as listed in Table IV and therefore only an incoming error field having a higher priority than the currently stored error field in register 642 will be stored therein. However, regardless of the priority of the incoming error field, the incoming data will be stored in registers 640 and 642 on the next clock cycle after the contents of the registers are read by the Fcode unit. The f.read.sav.h signal from the Fcode unit 58 is applied as another input to OR gate 646. This signal is asserted when the Fcode unit reads the contents of the state save registers 640 and 642. The signal drives the output of OR gate 646 high to input enable registers 640 and 642. Thus, the state of the message containing the highest priority error since the last time the Fcode unit read the contents of the state save registers 640 and 642 will be stored in the state save registers.

The output of register 640 is connected as an input to another register 648 which is input enabled by the f.read.save.h control signal from the Fcode unit. A portion of the output of register 648 (data(lsh)) is connected to an input of a tristate buffer 650 while the remaining portion (data(msh)) of the output of register 648 is applied as an input to another tri-state buffer 652. The output of register 642 is connected as in input to a third tri-state buffer 654. The outputs of buffers 650, 652 and 654 are connected in common to the f.dout lines of the Fcode bus. The Fcode unit reads the state save registers in three steps. First buffer 654 is enabled by the f.read.save.h control line, thereby transmitting the identification, distance, direction and error fields saved in state save register 642 to the Fcode unit. At the same time, the f.read.save.h control signal transfers the data in register 640 to register 648. Then the Fcode unit transmits the f.read.save.m signal which output enables buffer 652, thereby sending the data(msh) portion of the data in register 648 to the Fcode unit. Finally, the Fcode unit transmits the f.read.sav.1 signal which output enables buffer 650, thereby sending the data(lsh) portion of the data in register 648 to the Fcode unit.

The error unit 56 is also adapted to decode the error field and to store data indicating the errors which have occurred in an error register 656. The incoming error field is also applied to a control circuit 655 which decodes the field, and generates an error indicating data word to be stored in register 656. The rcut, lcut, dcut, fifo.err, lstp.err, rstp.err, lpcal.err, and rpcal.err signals, generated by the various units of the node as described hereinabove, are also applied as inputs to the control circuit 655 and the error indicating word generated by the control circuit also contains bits which indicate if any of these cut, fifo, stop or protocol errors have occurred. The output of register 656 is applied to the f.dout lines of the Fcode bus through a tristate buffer 658. The Fcode unit can read the contents of register 656 by asserting the f.read.err.1 control signal which enables buffer 658.

The error unit 56 is further adapted to transmit an error message to any selected device on the system bus when an error has occurred. The error message contains the error indicating word stored in register 656 along with a selected vector stored in a register 660. The vector is typically a selected code which helps the device receiving the message to identify its purpose or origin. The identification, distance and direction fields identifying the node to receive the message are stored in another register 662. Registers 660 and 662 are both loaded with data from the Fcode unit carried over the f.din lines of the Fcode bus, with register 660 being input enabled by a f.write.err.m Fcode bus control signal and with register 662 being input enabled by a f.write.err.h Fcode bus control signal. The contents of registers 660 and 662 may also be read by the Fcode unit. The outputs of registers 660 and 662 are connected to the f.dout lines of the Fcode bus by tri-state buffers 664 and 668, respectively, which are output enabled by the f.read.err.m and f.read.err.h signals from the Fcode unit.

The output of register 656 is fed back into control circuit 655 and is also connected to sixteen of the data(ls) lines of the local bus via tri-state buffer 670 while a logical "0" is applied to the remaining two data(ls) lines through another tri-state buffer 672. Buffers 670 and 672 are enabled by a "lo" signal from control circuit 655, asserted when the control circuit detects that an error indication is stored in register 656. The control circuit 655 initiates a request signal (ereq) to the local arbitrator 54 when it has an error message to send to the local device via in fifo 53, and receives the egrt signal returned by the local arbitrator.

The lo signal from control circuit 655 is also connected to an inverting input of a tri-state buffer 674. The 13-bit output of register 660 is connected to inputs of another tri-state buffer 676 and the outputs of buffers 674 and 676 are connected to the fourteen data(ms) lines of the local bus. A four-bit "dcut" error code is applied as an input to a tri-state buffer 678. The identification, distance and direction fields stored in register 662 are applied as inputs to tri-state buffers 680, 682 and 684, respectively. Buffers 678, 680, 682, and 684 are enabled by the egrt signal. The error, identification, distance and direction field outputs of buffers 678, 680, 682 and 684 drive the corresponding field lines of the local bus. The distance field stored in register 662 is also applied to a 0 detector which sets one bit (ereq.lsb) of the ereq signal to the local arbitrator high if the distance field is 0, indicating that the error message is to be sent to the local device via in fifo unit 53. The control unit 655 generates the other bit (ereq.msb) of the ereq signal, the bit being set high when the error unit is requesting to transmit an error message. The direction bit stored in register 662 is also transmitted to the control circuit 655.

In a special transmission, discussed hereinabove in conjunction with the operation of the distance table 50 of FIG. 18, the error unit 56 transmits the return identification, distance, and direction fields stored in register 662 and the most significant portion of the data field, stored in register 668, to the source unit 46 or in fifo buffer of FIG. 4. The distance table 50 of FIG. 4 transmits the least significant portion of the data field to the source unit or in the fifo unit. In this case, the egrt signal from the local arbitrator is asserted in response to a request from the distance unit and not in response to a request from the error unit. The egrt signal output enables buffers 674, 676, 678, 680, 682 and 684 to transfer the contents of registers 668 and 662 to the source unit or in the fifo unit, but the control circuit 655 does not assert its lo output signal and therefore does not output enable buffers 670 and 672.

Figure 28:
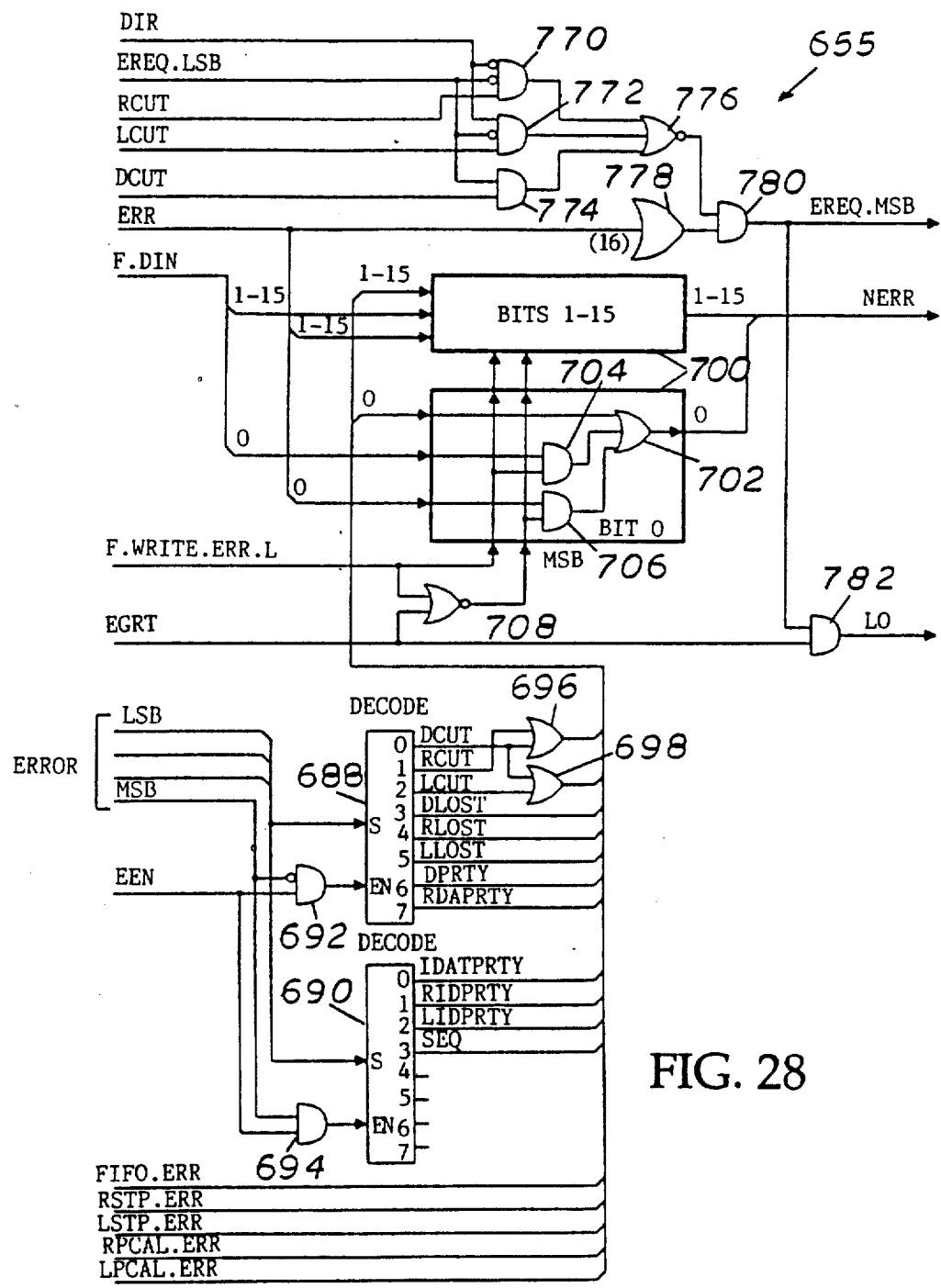
FIG. 28 is a schematic diagram of the control circuit of the error unit of FIG. 4.

Error unit control circuit 655, depicted in more detailed block and schematic diagram form in FIG. 28, includes a pair of decoders 688 and 690 for decoding the error field. The three least significant bits of the four-bit error field are applied as inputs to each decoder. Decoder 688 is enabled by the output of an AND gate 692, having the een signal driving a noninverting input and the most significant bit of the error field driving an inverting input. Decoder 690 is enabled by the output of another AND gate 694 having the een signal and the most significant bit of the error field driving noninverted inputs. Output 0 of decoder 688 is high when the error field indicates a dcut error. Similarly outputs 1 to 7 are high when the error field respectively indicates an rcut, lcut, dlost, rlost, llost, dprty, or rdatparty error. Outputs 0 to 3 of decoder 690 are high when the error field respectively indicates an ldatprty, ridprty, lidprty or seq error. The dcut and rcut outputs of decoder 688 are applied as inputs to an OR gate 696, while the lcut and dcut outputs are applied as inputs to another OR gate 698.

The sixteen error indicating bits, including outputs of OR gates 696 and 698, outputs 3 to 7 of decoder 688, outputs 0 to 3 of decoder 690, and the fifo.err, rstp.err, lstp.err, rpcal.err, a lpcal.err inputs to control circuit 655, are each applied to a corresponding one of sixteen similar logic circuits 700. Each logic circuit 700 comprises an OR gate 702 and a pair of AND gates 704 and 706. The f.write.err.1 signal is applied as one input to each AND gate 704, with a separate one of sixteen f.din lines being connected to another input of each AND gate 704. A separate one of each of the sixteen error indicating bits of register 656 of FIG. 27 is connected to one input of the AND gate 706 of a corresponding logic circuit and the output of a NOR gate 708 is connected to a second input of each AND gate 706. The f.write.err.1 and egrt signals provide inputs to a NOR gate 708. Each error indicating bit is applied to an input to the OR gate 702 of its corresponding logic circuit 700 while the outputs of the corresponding AND gates 704 and 706 are applied to other inputs of the OR gate. The output of each OR gate 702 comprises one corresponding bit of the error data to be stored in register 656.

When the incoming error field indicates an error, the output of the corresponding OR gate 702 goes high and is then stored in register 656 on the next clock cycle. If a bit in register 656 is already high, that bit is fed back through the corresponding AND gate 706 and OR gate 702 to the input of register 656 so that bit will stay high when the register is input enabled. When the contents of register 656 are transmitted out of the error unit in an error message, the egrt signal goes high, driving the outputs of each OR gate 708, AND gate 706 and OR gate 702 low. A zero is thus stored in each bit position of register 656 regardless of what was previously stored therein. Thus each bit in the error register 656 is set during the clock cycle following detection of the corresponding error by control circuit 655 and the bit remains set until the data in the error register is transmitted outward from the error unit in an error message.

The Fcode unit may write over data in the error register 656 by placing the appropriate data on the f.din lines applied to AND gate 704, and initiating the f.write.err.1 control line. At the same time, the f.write.err.1 control line drives the output of NOR gate 708 low which keeps the output of AND gate 706 low, thereby blocking the data in register 656 from being fed back to its input.

The direction bit stored in register 662 of FIG. 27 is set high if the error message is to be sent to the left on the system bus. This bit is applied to an inverting input of an AND gate 770 and to a noninverting input of another AND gate 772 of FIG. 28. The ereq.lsb bit of the ereq signal, which is high when the error message is to be sent to the in fifo unit 53, is applied to inverting inputs of AND gates 770 and 772 and to a noninverting input of another AND gate 774. The rcut signal drives a third input of AND gate 770 while the lcut signal drives a third input of AND gate 772 and the dcut signal drives a second input of AND gate 774. Thus the output of AND gate 770 is high when the error message is to go to the right on the system bus but the node is supposed to be in the "rcut" mode, i.e., is the last node on the right end of the bus. Similarly, the output of AND gate 772 is high when the error message is to go to the left on the system bus but the left port is in the "lcut" mode. The output of AND gate 774 is high when the error message is to go to the in-fifo unit but the node is in the "dcut" mode whereby no device is locally connected to the bus through the node. The outputs of AND gates 770, 772, and 774 are applied as inputs to a NOR gate 776. The output of NOR gate 776 is thus high unless the error unit has been inadvertently instructed to send error messages to a non-existent destination.

The sixteen error indicating bits stored in register 656 of FIG. 27 are applied as inputs to an OR gate 778, the output of which is therefore high if any bit in register 656 indicates that an error has occurred. The outputs of gates 776 and 778 are connected to inputs of an AND gate 780, the output of which provides the ereq.msb bit of the request signal. The ereq.msb bit is therefore driven high when a bit in the error register 656 indicates an error has occurred. The output of AND gate 780 and the egrt signal are connected as inputs to another AND gate 782, the output thereof comprising the lo signal which enables buffers 670 and 672 of FIG. 27. Normally, when the error unit receives a grant signal (egrt) from the local arbitrator 54, it enables buffers 672, 674, 676, 678, 680, 682 and 684, thereby sending the message outward on the local bus. If, however, the data stored in register 662 directs the message to a location which cannot be reached because the node is operating in a cut mode, the lo bit output of AND gate 782 remains low and buffers 670 and 672 are not enabled by the egrt signal. The identification, distance, direction, vector and "dcut" error fields from the remaining buffers are transmitted to the state save registers 640 and 642 which then may store the data for later transmission to the Fcode unit. Also, if the egrt signal is asserted in response to a request from the distance table for a special transmission, the ereq.lsb input to AND gate 770 will be low which also has the effect of maintaining the output of AND gate 782 low. Thus the lo signal is not asserted in response to the egrt signal during a special transmission.

X Unit

Figure 29:
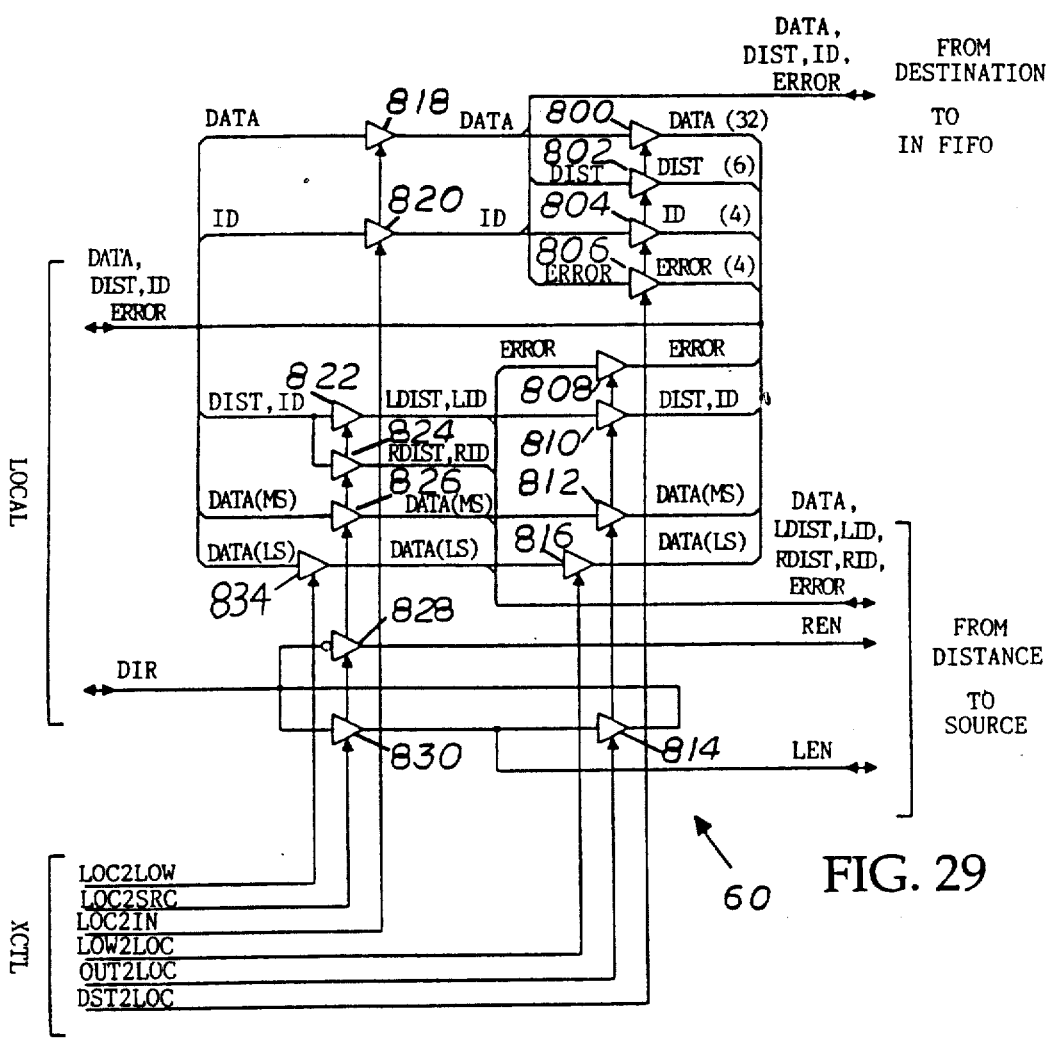
FIG. 29 is a schematic diagram of the X unit of FIG. 4.

Referring to FIG. 29, the X unit 60 of FIG. 4, depicted in schematic diagram form, is adapted to route data from the destination unit 47 to the Fcode unit 58 or the error unit 56 via the local bus. Data, distance, identification and error fields from the destination unit are connected to the local bus through tri-state buffers 800, 802, 804 and 806, respectively. These buffers are enabled by a dst2!oc signal, one of the xctl control signals from local arbitrator 54. The unit 60 is also adapted to route data from the distance unit 50 to the Fcode unit 58 or the error unit 56 via the local bus. The error field from the distance unit is coupled to the local bus by a tristate buffer 808. The distance and identification fields from the distance unit are connected to the local bus by another tri-state buffer 810, while the data(ms) field and the direction bit from the distance unit are connected to the loca by tristate buffers 812 and 814. Buffers 808, 810, 812, and 814 are enabled by another xctl control signal, out2loc. The data(ls) field from the distance unit is connected to the local bus by tri-state buffer 816 which is enabled by another xctl signal (low2loc) from the local arbitrator.

Data and identification fields are transmitted to the in fifo 53 from the local bus via buffers 818 and 820, enabled by an xctl signal, loc2in. Distance and identification fields to be transmitted from the local bus to the source unit 46 are duplicated into left and right identification and distance fields by applying them to buffers 822 and 824 which transmit the fields to the right and left pipe registers of the source unit when enabled by another xctl signal, loc2src. The dir bit of the local bus is applied to an inverting input of a buffer 828 and to a noninverting input of another buffer 830. The output of buffer 828 comprises the ren bit stored by the right pipe register of the source unit and the output of buffer 830 comprises the len bit stored by the left pipe register of the source unit. The data(ms) field of the local bus is transmitted to the source unit via a tri-state buffer 826 while the data(ls)field is transmitted to the source unit via another buffer 834. Buffers 822, 824, 826, 828, and 830 are all enabled by the loc2src signal, with buffer 834 being separately enabled by another xctl signal, loc2-low.

Local Arbitrator

Figure 30:
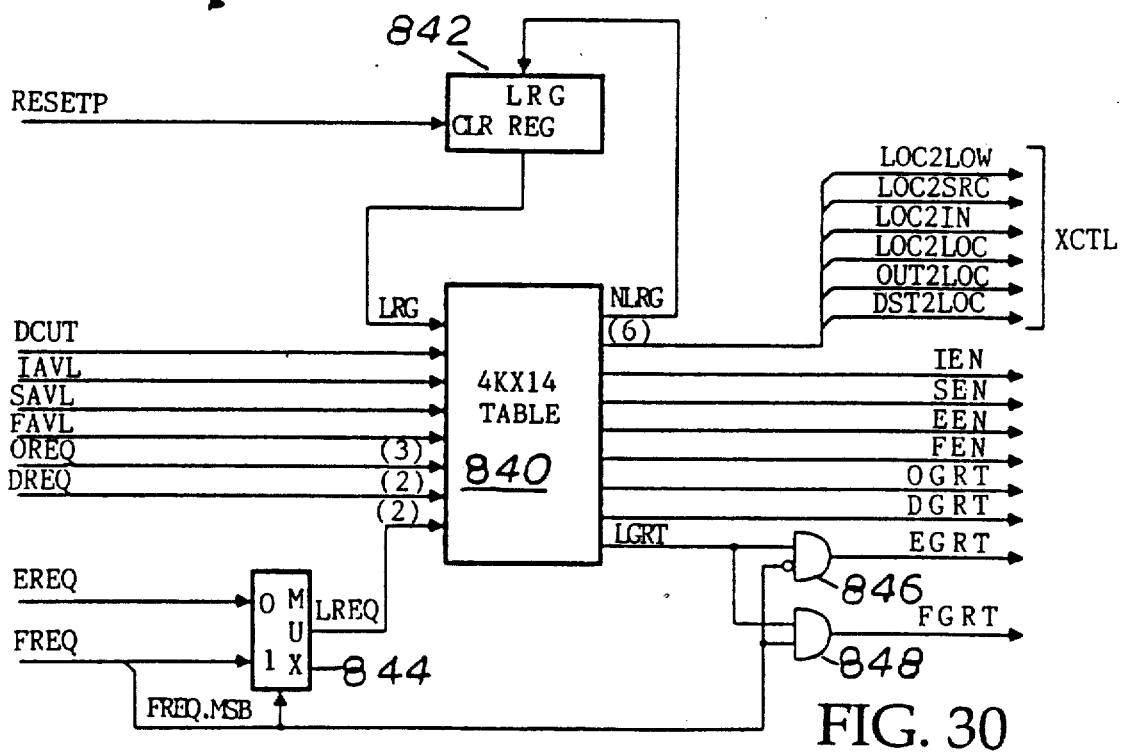
FIG. 30 is a schematic diagram of the local arbitrator of FIG. 4.

The local arbitrator 54, depicted in more detailed block diagram form in FIG. 30, comprises a 4K×14 PROM 840, a single-bit register 842, a multiplexer 844 and a pair of AND gates 846 and 848. The PROM 840 is addressed by the dcut, lavl, savl, lrg, favl, oreq, dreq signals, and the outputs of multiplexer 844 and register 842. The 14 data bits outputted by PROM 840 comprise the "nlrg" bit applied as the input to register 842, the six xctl signals, the ien, sen, een and fen enable signals, and the ogrt and dgrt grant signals along with an "lgrt" signal which is applied as an input to both AND gates 846 and 848. One bit (freq.msb) of the freq signal is applied to an inverting input of AND gate 842 and to a noninverting input of AND gate 848. The output of AND gate 846 comprises the egrt signal, with the output of AND gate 848 comprising the fgrt signal. The ereq signal and the freq signal are applied as inputs to the multiplexer 844 which is switched according to the state of the freq.msb bit. Multiplexer 844 passes the ereq signal to PROM 840 unless the freq signal is asserted. Therefore the freq signal has priority over the ereq signal.

The nlrg bit output of PROM 840 is stored in register 842 on each clock cycle and then reapplied as the lrg bit to address the PROM during the next following clock cycle. This bit acts as an indexing bit in a manner similar to the LRG bits of the system arbitrator of FIG. 10 described hereinabove. The PROM is programmed to provide arbitration for competing data flows between the destination unit 47, the source unit 46, the distance unit 50, the in-fifo unit 53, the error unit 56 and the Fcode unit 58. The freq signal is given highest priority, followed by the ereq, dreq and oreq signals. The dcut signal prevents the arbitrator from honoring a request to transmit or receive data through the intermediate bus when the node is not servicing a device through its device interface unit.

Device Interface Unit

Figure 31:
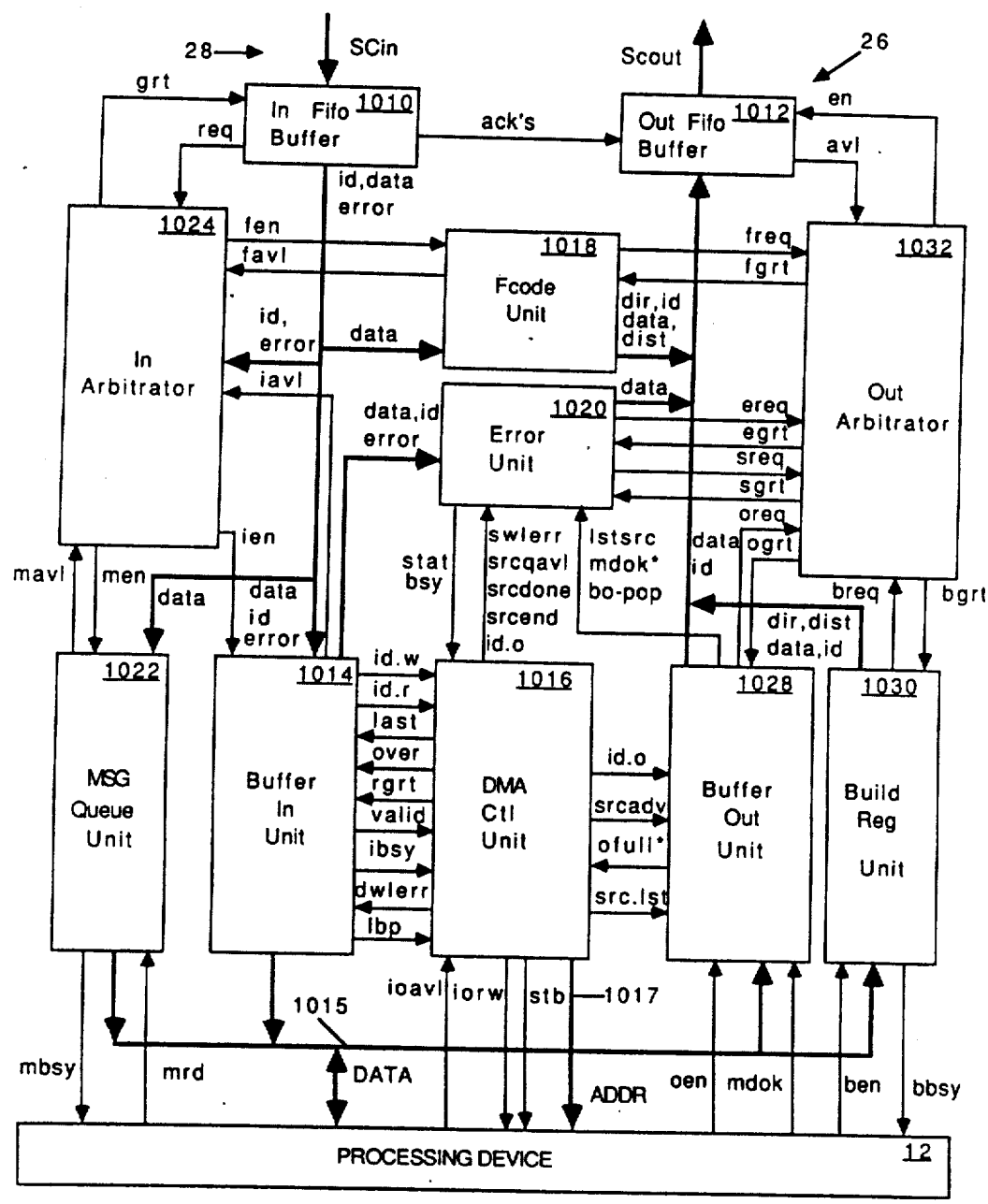
FIG. 31 is a block diagram of the device interface unit 26 of FIG. 2.

Referring to FIG. 31, the device interface unit 26 of FIG. 2, depicted in more detailed block diagram form, includes an in fifo buffer unit 1010, for receiving data from the in fifo buffer 53 of FIG. 4 over the SCin portion of the intermediate bus 28, and an out fifo buffer unit 1012, for transmitting data to the out fifo buffer unit 55 of FIG. 4 over the SCout portion of intermediate bus 28. In fifo buffer unit 1010 receives two-word type A transmissions, as depicted in FIGS. 14A and 14B, and reformulates them into a single word containing a 4-bit identification field, a three-bit error field, and a 32-bit data field. The in fifo buffer 1010 includes a circuit for checking the parity of the incoming identification and data fields and a circuit for checking the sequence in which data words are received on the SCin bus. These parity and sequence checking circuits set parity or sequence error bits in the three-bit error field output of the in fifo buffer when such errors are detected.

If the output of the in fifo buffer 1010 is part of a DMA type transfer (i.e., the identification field has a value of 1-E), the data and identification output fields are stored in a buffer in unit 1014. The buffer in unit 1014 assembles pairs of 32-bit incoming DMA transfer words into 64-bit data words for subsequent transmission over a data bus 1015 to the processing device 12 serviced by the bus node. The buffer in unit 1014 includes two 2Kx32-bit RAMs providing storage for up to 14 different sequences of 64-bit words, one such sequence for each different identification field 1-E. When the buffer in unit 1014 has assembled and stored a block of up to thirty-two 64-bit words arriving under a particular identification number, it transmits the block to the processing device 12 for storage in a random access memory therein. The memory addressing for the transfer is provided by a DMA control unit 1016 which transmits memory addresses to the device 12 over an address bus 1017.

If the output of the in fifo buffer 1010 is an Fcode transfer (i.e., the identification field has a value of F), the data field is stored in an Fcode unit 1018 which, in response to Fcode messages, can read or modify the contents of various control registers and RAM's within selected blocks of the device interface unit 28 of FIG. 31.

If the output of the in fifo buffer 1010 is a message (i.e., the identification field has a value of 0), the data field output of the in fifo buffer 1010 is stored in a message queue unit 1022 which forwards the message data to processing device 12 over data bus 1015. The message queue 1022 is capable of storing up to four 32-bit messages and when the message queue 1022 is storing one or more messages, it transmits a message queue busy (mbsy) signal to device 12. When the device 12 is available to receive a message, it transmits a message read (mrd) signal to the message queue 1022, causing the message queue to transmits the message to the device 12 over the data bus 1015.

The transfer of data from the in fifo buffer 1010 to the buffer in unit 1014, the Fcode unit 1018 and the message queue 1022 is controlled by an in arbitrator 1024. When the in fifo buffer 1010 is ready to forward a data word, it transmits a request (req) signal to the in arbitrator 1024 along with the four-bit identification and three-bit error fields. The Fcode unit 1018, the buffer in unit 1014 and the message queue 1022 indicate they are ready to receive new incoming data from the in fifo buffer by transmitting available signals (favl, iavl and mavl, respectively) to the in arbitrator 1024. The in arbitrator 1024 checks the identification field to determine whether the output of the in fifo buffer is a message, a DMA transfer, or an Fcode transfer and also checks the error field to determine if the in fifo buffer has detected a parity or sequence error. When all three available signals are active, and the arbitrator 1024 has detected no error in the error field, the in arbitrator transmits an enabling signal to the appropriate receiving unit, as indicated by the identification field, to forward the data.

However, if the in arbitrator 1024 detects an error in the error field output of in fifo buffer 1010, it asserts the ien signal to input enable the in fifo buffer unit 1014, regardless of what type of transmission the identification field indicates. When the buffer in unit 1014 receives the ien signal it stores the error, identification and data fields and then checks the error field to see if a bit therein is set. If any error bit is set, it forwards the data, error and identification fields to an error unit 1020, causing the error unit to store the forwarded fields in a state save register therein.

When the buffer in unit 1014 receives data from the in fifo buffer 1010, and no error is indicated in the error field, the buffer in unit transmits a "valid" signal to the DMA/address control unit 1016, along with a four-bit "id.w" signal conveying the incoming identification field. The control unit 1016 checks the id.w field to determine if the identification field of the data arriving at the buffer in unit 1014 represents an active DMA transfer. At any time some of the possible destination identification (1-E) may not be assigned to an active DMA transfer. The control unit 1016 keeps track of which identification is currently being used to identify an active DMA transfer and which identifications are inactive. If the incoming identification field indicates an inactive identification, an error has occurred and the DMA control unit 1016 transmits an error signal (dwl.err) to the buffer in unit 1014. In such case, the buffer in unit does not store the incoming data but rather forwards the data, identification, and error fields to the error unit 1020. Control unit 1016 is preprogrammed with data indicating the total number of words in each DMA transfer and the control unit maintains a count of the number of data transmissions received by the buffer in unit for each different identification field. When the control unit 1016 determines that the buffer in unit has just received the last half of the last 64 bit-word in a DMA transfer, it transmits a "last" signal to the buffer in unit. This signal causes the buffer in unit to prepare to forward the data to the processing device 12 as a block even if the block does not contain a full 32 words. This feature is necessary because not all DMA transfers can be divided evenly into 32 word blocks.

Once the control unit 1016 determines that the buffer in unit has received and stored all of the data associated with a particular DMA transfer, the DMA unit transmits an "over" signal to the buffer in unit whenever any subsequent id.w field from the buffer in unit erroneously identifies the incoming data as being part of that DMA transfer. When the buffer in unit receives an over signal from the control unit 1016 in response to an id.w indication, it does not store the incoming data.

Each time the buffer in unit 1014 receives a sequence of sixty-four 32-bit DMA transfer words identified by the same identification field, it groups the words as a block of thirty-two 64-bit words for forwarding to device 12. It also groups a lesser number of words into a block when the DMA control unit assertes the "last" signal following in fifo buffer receipt of the last word of a DMA transfer sequence. When the buffer in unit 1014 has acquired and assembled a complete block of 64-bit data words associated with a particular destination identification, it transmits a request signal (ibsy) to the DMA control unit 1016 along with an identification field (id.r) identifying the block. When processing device 12 is free to receive data over data bus 1015, it transmits an available signal (ioavl) to control unit 1016 and when the control unit 1016 detects an ioavl signal from processing device 12 and the ibsy signal from buffer in unit 1014, it asserts a write control signal (iorw) to device 12 causing it to enter a data write mode. The DMA control unit then transmits a memory address to device 12 over address line 1017 where the first word of the block is to be stored, transmits a grant signal (rgrt) to the buffer in unit 1014 causing it to output the first word of the block, and transmits a strobe signal (stb) to the processing device 12 causing it to store the first word at the memory address on address bus 1017. The process is repeated for each 64-bit word of the block, with the address on bus 1017 being incremented by a selected amount after each data transmission, so that each word of the DMA transfer block is stored at a selected address in the memory within processing device 12.

The DMA control unit 1016 also controls DMA transmissions from processing device 12 to remote processing devices serviced by the system bus. "Source" DMA transfers from processing device 12 are transmitted over data bus 1015 to a buffer out unit 1028 which forwards the data to the out fifo buffer 1012 for subsequent transmission to the remote processing devices. The buffer out unit can hold up to 128 64-bit DMA transfers. When the buffer out unit 1028 is not full, it transmits an indicating signal ofull* to the control unit 1016. When the control unit detects the io.avl signal from the processing device 12 and the ofull* signal from buffer out unit 1028, and does not detect an ibsy signal from the buffer in unit 1014, the control unit initiates a transfer of a DMA block from processing device 12 to the buffer out unit 1028. Prior to a source DMA transmission, information indicating the addresses in processing device 12 at which the DMA data is stored, the number of 64-bit words to be included in the DMA transfer, and the identification number to be assigned to the transfer, is stored in the control unit 1016. To initiate a source DMA data transfer, the control unit sets the address of the first word of the block on address bus 1017, sets the iorw control signal to device 12 for a memory read operation, and then asserts the strobe signal (stb) so that the data stored at the addressed memory location in device 12 is read onto data bus 1015. At the same time, the control unit transmits a four-bit identification field id.o to the buffer out unit 1028, identifying the DMA sequence to which the data belongs, along with a signal (src.adv) which causes the buffer out unit to store the id.o field in an internal fifo buffer. When the processing device 12 places the data on the data bus 1015, it transmits an input enabling signal (oen) to the buffer out unit 1028, causing the buffer out unit to store the incoming DMA data word in another internal fifo buffer. The processing device 12 also transmits to the buffer out unit an indicating bit (mdok), set when the processing device does not detect any error in the data it transmitted to the buffer out unit. The buffer out unit stores this mdok bit with the 64-bit data.

The DMA read process is repeated for each word of the source DMA transfer sequence with the control unit 1016 addressing and read strobing the processing device 12 until a block of 32 words of the DMA transfer sequence is transmitted sequentially to the buffer out unit 1028. The DMA control unit then checks the ibusy signal from the buffer in unit which indicates whether or not the buffer in unit contains a block of data of a destination DMA transfer to be forwarded to the device 12. If so, the DMA control unit causes the buffer in unit to transfer the data to the device 12. When the buffer in unit has no data to transfer to the device 12, the DMA unit initiates transfer of another block of data from the device 12 to the buffer in unit. When the control unit 1016 initiates the transfer of the last word of the last block of a source DMA sequence to the buffer in unit, it transmits an indicating signal (src.lst) to the buffer out unit 1028 to set a bit stored with the last id.o field from the control unit.

The buffer out converts each stored 64-bit data word into a pair of 32-bit data words for transmission to the out fifo buffer 1012. The out fifo buffer then converts each 32-bit word into a two-word type A sequence, described hereinabove, for transmission over the SCout portion of bus 28 to the bus interface unit 18 of FIG. 2. When buffer out unit 1028 contains data to be forwarded, it transmits a request signal (oreq) to an out arbitration unit 1032. If the out fifo buffer is currently asserting an available signal (avl) to the arbitration unit, the arbitration unit returns a grant signal (orgt) to the out fifo buffer 1012 which then sequentially transmits the two 32-bit halves of the longest stored data to the input terminals of the out fifo buffer 1012, each accompanied by the associated identification field. If the data transmitted to the out fifo buffer is the last data word of a source DMA transmission, as indicated by the srclst bit stored with such data word, the buffer out unit transmits a "lastsrc" signal to the error unit 1020.

A status message section of the error unit 1020 is adapted to send a "special" message to the error unit 56 of FIG. 4 whenever a complete source DMA transfer has been forwarded out of the buffer out unit. The error unit 56 of FIG. 4 then transmits a message over the system bus to a selected processing device indicating the completion of the source DMA transfer. While the error unit 1020 is waiting to send such a message, it transmits an indicating signal (statbsy) to the DMA control unit. The DMA control unit 1016 includes a "source queue" comprising a set of registers for storing the control data (word length, word count, identification, and addressing information) associated with up to two source DMA transfers. When the DMA control unit determines that the last data of a current source DMA transfer has been sent to the buffer out unit, it transmits an indicating signal (srcdone) to the error unit 1020. If the error unit is not asserting the statbsy signal, the DMA control unit then transmits a "srcend" signal to the error unit, along with the id.o field associated with the current source DMA transfer. The DMA control unit also shifts the data, if any, associated with the next source DMA transfer forward in the source queue and initiates the next source DMA transfer. If the error unit is asserting the statbsy signal, the DMA control unit waits before sending the srcend signal and advancing the source queue until the statbsy signal is deasserted.

When the error unit receives the srcend signal, it stores the id.o field and asserts the statbsy signal. When the last word of the source DMA transfer has been sent out of the buffer out unit 1028 to the out fifo buffer 1012, the buffer out unit transmits the lstspc signal to the error unit 1020 and also transmits a "bo-pop" signal to the buffer out unit indicating that the word has been sent to the out fifo buffer. These signals cause the error unit to initiate a request signal (sreq) to the out arbitrator 1032. The out arbitrator subsequently responds with a grant signal (sgrt) causing the error unit to transmit the "special" message through the out fifo buffer 1012 to the error unit error 56 of FIG. 4. The message contains the identification field of the source DMA transfer and an indication that the transfer is finished. The error unit 56 then forwards the data to the receiving processing device. After the error unit 1020 has received the sgrt signal from the out arbitrator, it deasserts the statbsy signal to the DMA control unit.

Whenever the DMA control unit frees space in its source queue for receiving data associated with another source DMA transfer, it transmits a "srcqavl" indicating signal to the error unit 1020. This also causes the error unit to transmit an sreq signal to the out arbitrator 1032 which responds with the sgrt signal. The error unit then sends another "special" message through the out fifo buffer to bus interface unit of FIG. 4 indicating the availability of the source queue. The bus interface unit then transmits an error indication message to the appropriate processing device controlling source DMA transfers originating at this node.

The error unit 1020 includes an error register for storing the incoming error field from the buffer in unit 1014 when the in fifo buffer has detected an error in the incoming data. The DMA control unit also transmits an error signal (swlerr) to the error unit if it detects a word length error in the source DMA transfer data in the source queue. The buffer out unit 1028 sends another error signal (mdok*) to the error unit if its current data output was not tagged by the mdok bit by the processing device 12 when it initially sent the data to the buffer out unit. These error signals are also stored in the error register in error unit 1020. When the data in the error register indicates that an error has occurred, the error unit sends an error request signal (ereq) to the out arbitrator 1032 which responds with a grant signal (egrt) permitting the error unit to forward the contents of the error register through the out fifo buffer to the bus interface unit of FIG. 4 in the form of another "special" message. The bus interface unit then transmits an error indication message to a selected processing device.

The Fcode unit 1018 may receive Fcode type messages from any device 12 connected to the system bus, and permits the device to write data into or read data out of selected registers and RAM locations within the DMA control unit 1016 or the error unit 1020 through an Fcode bus (not shown in FIG. 31) connecting the Fcode unit to the error unit and the DMA control unit. The Fcode unit 1018 has a four-stage pipe register for receiving incoming Fcode messages via the in fifo buffer 1010. When the pipe register is not full, the Fcode unit transmits the favl signal to the in arbitrator 1024 which subsequently returns the fen signal, causing the Fcode unit to store the Fcode message in its pipe register. When the Fcode unit 1018 has read data from a register or RAM storage location in response to an Fcode read message, it transmits a request signal (freq) to the out arbitrator 1032 which responds with an fgrt signal, causing the Fcode unit to output message containing the data to the out fifo buffer 1012.

A build register unit 1030 is provided to permit the processing device 12 to originate Fcode transfers and messages. When the processing device 12 is ready to do so, the device checks to see if the build register is busy, as indicated by a busy signal (bbsy) from the build register. If the build register is not busy, the processing device 12 sends distance, data and identification fields to the build register over the data bus 1015, along with two-bit input enabling signal (een), causing the build register to store these fields. Thereafter, and in the same manner, the processing device transmits a 32-bit data field to the build register via the data bus. The build register then transmits a request signal (breq) to the out arbitrator 1032 which responds with a bgrt signal, causing the build register to forward the Fcode transfer or message to the out fifo buffer 1012. The build register may also be used to send DMA type transfers, one word at a time, in a similar manner.

In Arbitrator

Figure 32:
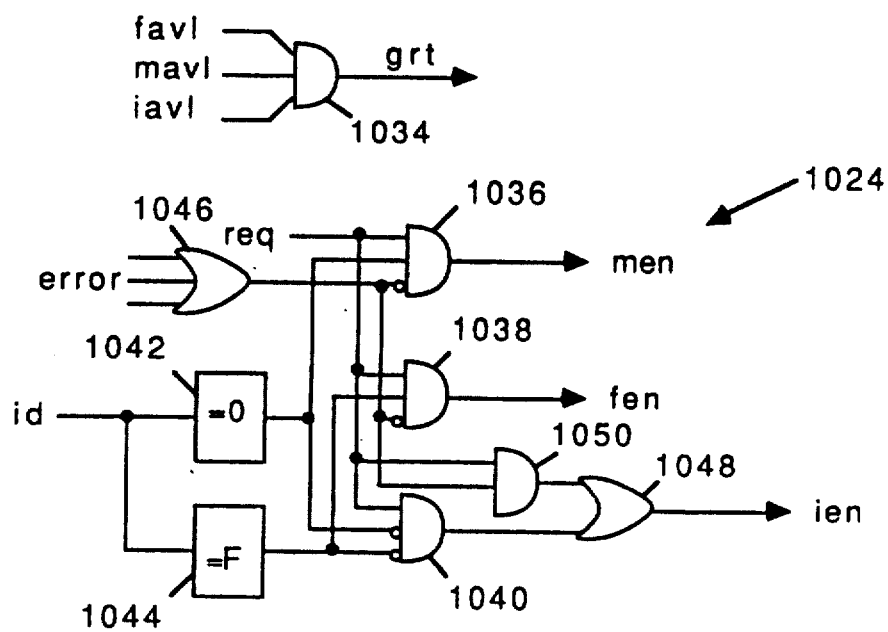
FIG. 32 is a schematic diagram of the in arbitrator of FIG. 31.

Referring to FIG. 32, the in arbitrator 1024 of FIG. 31, depicted in schematic diagram form, comprises an AND gate 1034, having the favl, mavl, and iavl signals as inputs and producing the grt signal to the in fifo buffer 1010 as an output. The req signal from the in fifo unit 1010 is applied to one input to each of three AND gates 1036, 1038, and 1040, while the identification field from the in fifo buffer provides the inputs to two decoders 1042 and 1044. Decoder 1042 asserts its output if the identification field is 000, indicating that the output of in fifo is a message type transfer, while decoder 1044 asserts its output if the identification field is a 1111, indicating an Fcode type transfer. The output of decoder 1042 is connected to an input of AND gate 1036 and to an inverting input of AND gate 1040, while the output of decoder 1044 is connected to an input of AND gate 1038 and an inverting input of AND gate 1040. The three-bit error field from the in fifo buffer drives inputs of an OR gate 1046, the output of which is connected to inverting inputs of AND gates 1036, and 1038, and to an input of another AND gate 1050. The output of AND gates 1040 and 1050 are applied to inputs of an OR gate 1048. The output of AND gates 1036 and 1038 comprise the men and fen enabling signals to the message queue 1022 and the Fcode unit 1020 of FIG. 31, while the output of OR gate 1048 comprises the ien enabling signal to the in buffer unit 1014 of FIG. 31.

Out Arbitrator

Figure 33:
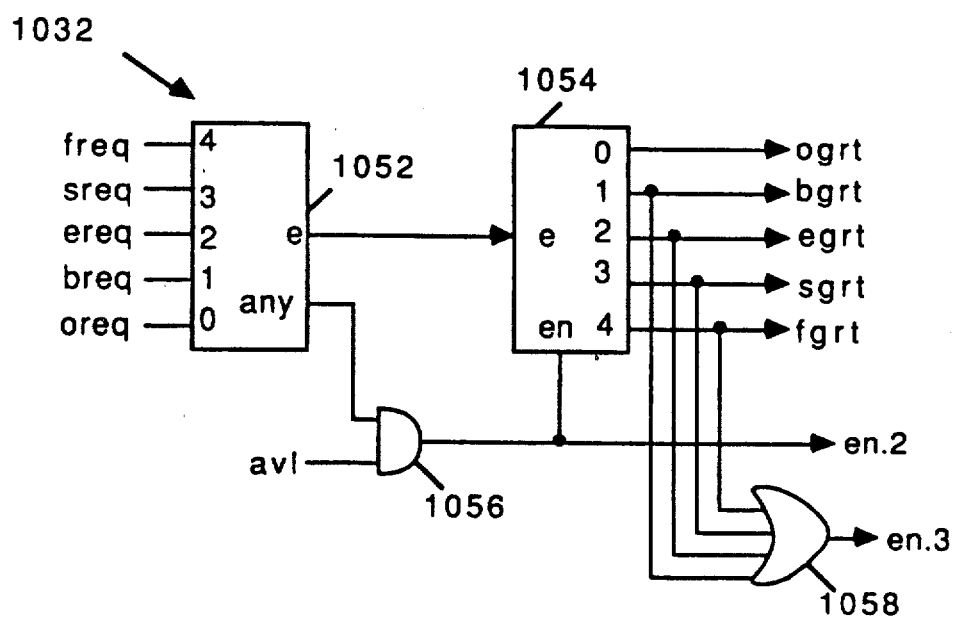
FIG. 33 is a schematic diagram of the out arbitrator of FIG. 31.

Referring to FIG. 33, the out arbitrator 1032 of FIG. 31, depicted in schematic diagram form, comprises a priority encoder 1052, a decoder 1054, an AND gate 1056 and an OR gate 1058. The freq, sreq, ereq, breq, and oreq signals from the Fcode unit 1018, the error unit 1020, the build register 030, and the buffer out unit 1028 of FIG. 31 are applied as inputs to the priority encoder 1052 which produces an encoded output signal to decoder 054 indicating which input request signal is asserted. If more than one signal is asserted, the signal from the unit having the highest output priority is indicated, the Fcode unit having the highest priority, followed in order of decreasing priority by the error unit, the build register, and the out buffer. The decoder 1054 decodes the encoder output to produce the appropriate ogrt, bgrt, egrt, sgrt or fgrt signal. The avl signal from the out fifo unit is applied as an input to AND gate 1056 while another output signal from encoder 1052, indicating when any request signal has been asserted, is applied to another input of AND gate 1056. The output of AND gate 1056 enables decoder 1054. The bgrt, egrt, sgrt and fgrt signals are all applied as inputs to OR gate 1058 which produces one bit (en.3) of a two-bit enable signal transmitted to the out fifo buffer. AND gate 1056 produces the other bit of the enable signal (en.2), indicating to the out fifo that it should acquire incoming data. The en.3 bit indicates whether the data is coming from the buffer out unit or one of the other three units so that the out fifo buffer can determine whether the data should be forwarded over bus 28 as a type A or a type B transmission.

Build Register Unit

Figure 34:
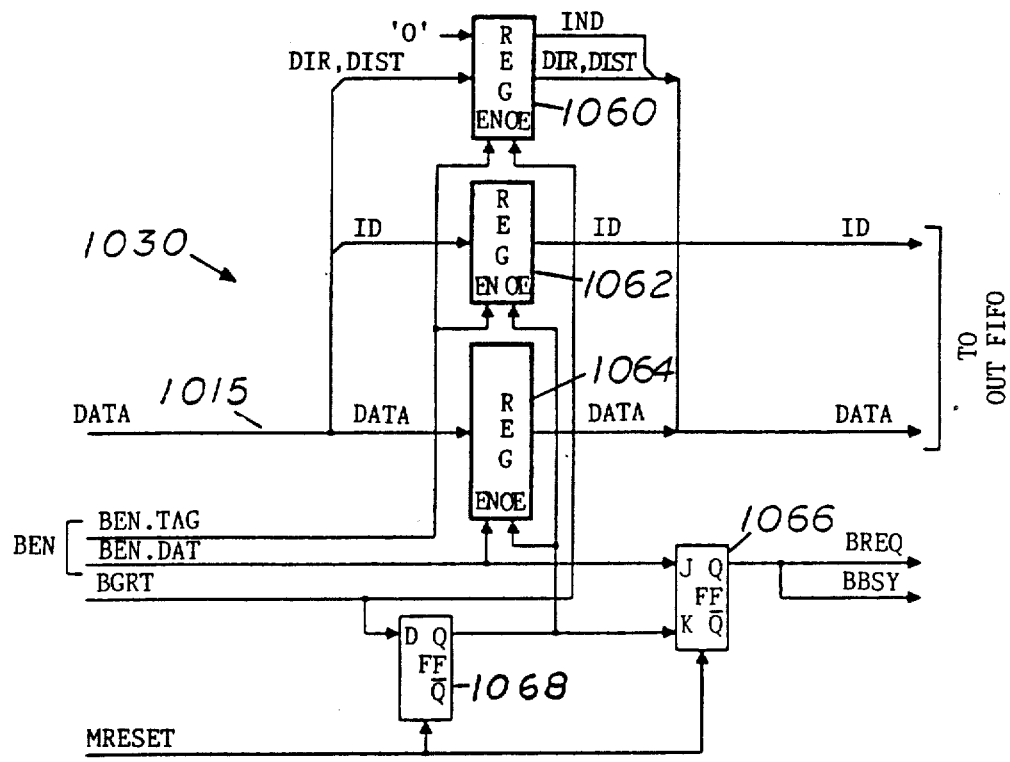
FIG. 34 is a schematic diagram of the build register unit of FIG. 31.

Referring to FIG. 34, the build register unit 1030 of FIG. 31, depicted in schematic diagram form, is adapted to permit the processing device 12 of FIG. 31 to initiate Fcode, message or single word DMA transmissions. The processing device initially transmits direction, distance, and identification fields to the build register over data bus 1015. The direction (dir) and distance (dist) fields are applied as inputs to a register 1060 while the identification field is applied as an input to another register 1062. A logical "0" is also applied as an input to register 1060 to set an ind bit therein to 0. The processing device 12 then input enables registers 1060 and 1062 with a ben.tag bit of the two-bit ben enable signal. Thereafter the processing device sends 32-bit data fields over the data bus 1015 to the build register, each incoming data field being stored in another register 1064 when input enabled by a ben.dat bit of the ben enable signal from the processing device. The ben.dat signal is also applied to a J input of a J-K flip-flop 1066 which produces at its Q output the breq signal to the out arbitrator and the bbsy signal to the processing device. When the out arbitrator detects the breq signal, it subsequently transmits the bgrt signal to the build register 1030 to initially output enable register 1060, which transmits the stored direction, distance and ind fields to the out fifo buffer. The ind field, being set to zero, indicates that the data is not a "special" transfer. The bgrt signal also drives the D input of a type D flip-flop 1068, the Q output of which output enables registers 1062 and 1064. Thus shortly after the contents of register 1060 are transmitted to the out fifo buffer, the identification and data fields in registers 1062 and 1064 are transmitted to the out fifo buffer. The out fifo buffer then assembles the two transmissions from the build register into a three-word type B transmission, as depicted in FIGS. 14E-G, for subsequent forwarding over the SCout portion of bus 28.

Message Queue

Figure 35:
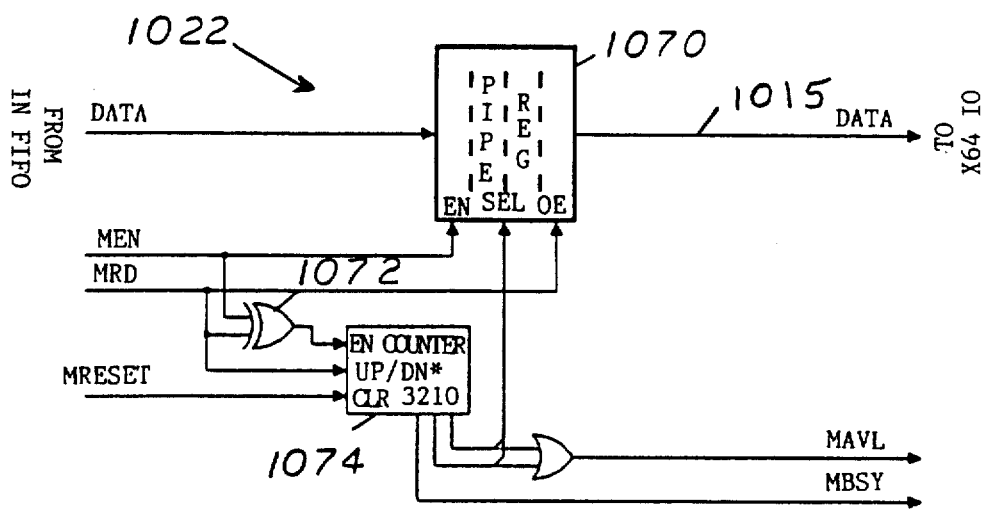
FIG. 35 is a schematic diagram of the message queue unit of FIG. 31.

Referring to FIG. 35, the message queue 1022 of FIG. 31, depicted in schematic diagram form, comprises a four-stage pipe register 1070 for storing message data from the in fifo buffer when input enabled by the men enabling signal from the in arbitrator. The data stored longest in pipe register 1070 is transmitted to the processing device 12 of FIG. 31 on data bus 1015 as output enabled by the mrd signal from the processing device. The men and mrd signals are also applied as inputs to an XOR gate 1072, the output of which is coupled to an enable input of a counter 1074. The mrd signal is also connected to an up/down control input of counter 1074 such that each time the mrd signal is asserted, counter 1074 counts up, and each time the men signal is asserted, the counter counts down. The two least significant bits (bits 0 and 1) of the counter output control the pipe register 1070 stage into which incoming data is stored and are applied to an OR gate 1076 for producing the mavl signal sent to the in arbitrator for indicating that the message queue can accept another message. A third output bit (bit 2) of counter 1074, indicating when any of the four stages of the pipe register are full, comprises the mbsy signal to the processing device 12 of FIG. 31.

Buffer In

Figure 36:
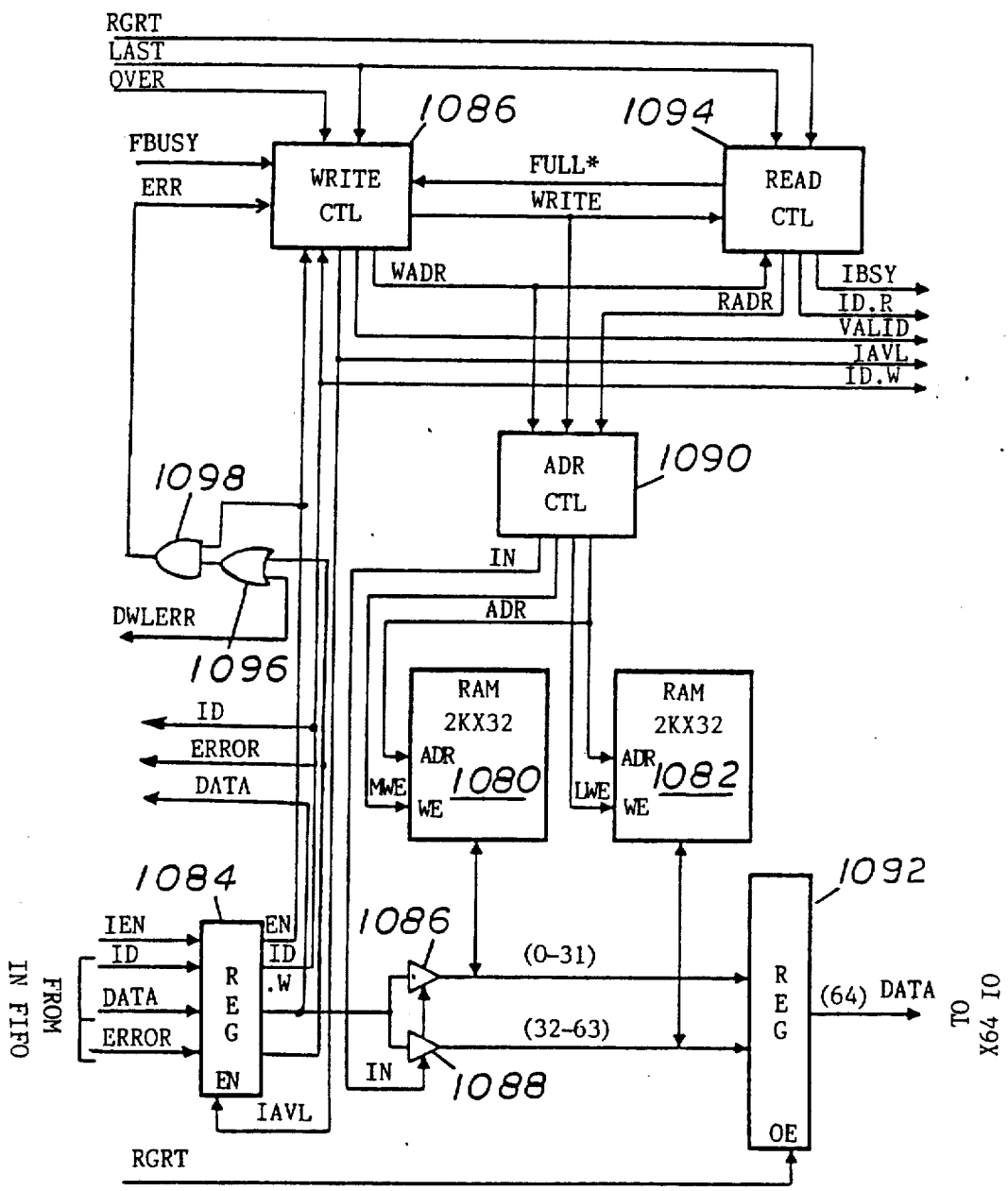
FIG. 36 is a combined block and schematic diagram of the buffer in unit of FIG. 31.

Referring to FIG. 36, the buffer in unit 1014 of FIG. 31, depicted in combination block and schematic diagram form, is adapted to receive DMA data words from the in fifo buffer, store them in a pair of 2Kx32 bit RAMs 1080 and 1082, and then forward blocks of the stored data to the processing device 12 of FIG. 31. The incoming identification, data, and error fields from the in fifo buffer, along with the ien and valid bits from the in arbitrator 1024 of FIG. 31 are stored in a register 1084, which is input enabled by a signal (iavl) from a write control circuit 1086. The data field stored in register 1084 passes through a pair of buffers 1086 and 1088 to data input/output terminals of RAMs 1080 and 1082, the buffers being enabled by a signal (in) from an addressing control circuit 1090. The 32-bit data fields associated with each DMA identification field are stored alternately in RAMs 1080 and 1082 as they arrive such that each 32-bit word is paired with a preceding or succeeding word of the same DMA transfer sequence, words of a pair being stored at the same address but in different RAM. The data terminals of RAMs 1080 and 1082 are also connected to input terminals of another register 1092. When a block of DMA word pairs containing up to 32 64-bit word pairs is stored in RAMs 1080 and 1082 it is forwarded, one 64-bit word pair at a time, to the processing device 12 of FIG. 1 through register 1092, which is output enabled by the rgrt signal from the data control unit.

The identification field associated with the incoming DMA data stored in register 1084 is forwarded as the id.w field to the DMA control unit 1016 of FIG. 31, which determines if the incoming word is the last word of DMA transfer. The id.w field is also forwarded to the write control circuit 1086 which determines therefrom the RAM address (wadr) at which the incoming data word is to be written. A different block of wadr addresses is associated with each identification field and the wadr address associated with each particular identification field is incremented each time a DMA transmission identified by the identification field arrives in register 1084. The write control circuit 1086 transmits the write address wadr, which includes a least significant bit indicating which memory bank (RAM 1080 or 1082) the word is to be written, to the addressing control circuit 1090. It also sends a write signal (write) to the addressing control circuit. On receipt of the write signal, the addressing control circuit strips the bank indicating bit from the incoming wadr signal, addresses the RAMs 1080 and 1082 with the remaining bits (addr) of the wadr signal, and asserts either a write enabling signal (mwe) to RAM 1080, or another write enable signal (lwe) to RAM 1082, depending on the state of the bank indicating bit, to write strobe the data into either RAM 1080 or RAM 1082.

The write control circuit 1086 also transmits the write address wadr to a read control circuit 1094. The read control circuit determines from the current write address, or from the "last" signal from the DMA control unit 1016, whether the incoming data is the last word of a DMA transfer block. If it is, the read control circuit stores that address in one stage of an internal four-stage pipe register. When the pipe register is storing one or more such addresses, the read control circuit 1094 asserts the ibusy signal to the DMA control unit 1016 of FIG. 31 and also transmits the identification of the DMA block as the id.r field to the DMA control unit. The control unit 1016 uses the id.r field to determine which DMA block is to be sent so that it may appropriately address the processing device 12 of FIG. 31. When the DMA control unit determines that the processing device 12 is ready to receive the DMA block, it begins transmitting a series of rgrt signals to the read control circuit 1094. Each time the read control circuit receives an rgrt signal, it outputs a read address (radr) to the address control circuit 1090, which forwards it as the adr signal to both RAMs 1080, causing them to output a 64-bit word of the DMA block to register 1092. The read control circuit increments the radr address each time it receives the rgrt signal so that all words in the block are read.

If the pipe register in read control circuit 1094 is not full, it transmits a full* signal to the write control circuit 1086. If the full* signal is deasserted, i.e., if the pipe register is full, the write control circuit 1086 deasserts the iavl signal to the in arbitrator to stop the flow of incoming data. The write control circuit 1086 monitors the "last" signal from the DMA control circuit, resetting the wadr address associated with the identification field to an initial value when the last signal is asserted, thereby indicating that the DMA transfer is complete. The write control circuit also monitors the "over" signal from the DMA control circuit and does not generate a write signal or increment the wadr address when the over signal is asserted.

The error and data fields stored in register 1084, along with the dwl err signal, are forwarded to the error unit so and the error unit stores these fields when as error occurs. The three-bit error field, stored in register 1084 with the incoming data and identification fields, is also applied to inputs of an OR gate 1096 along with a dwlerr signal from the DMA control unit 1016 of FIG. 31. The dwlerr signal is asserted when the id.w field transmitted to the DMA control unit indicates that the incoming data has an "inactive" identification, indicating a DMA transfer which the control unit has not been preprogrammed to handle. The output of OR gate 1096 is high when an error has occurred and drives an input to an AND gate 1098. The enable bit en, stored in register 1084, drives another input of the AND gate. The output of AND gate 1098 (err) is applied to write control circuit 1086 to inhibit writing of the data into RAM 1080 or 1082 when an error is detected.

Figure 37:
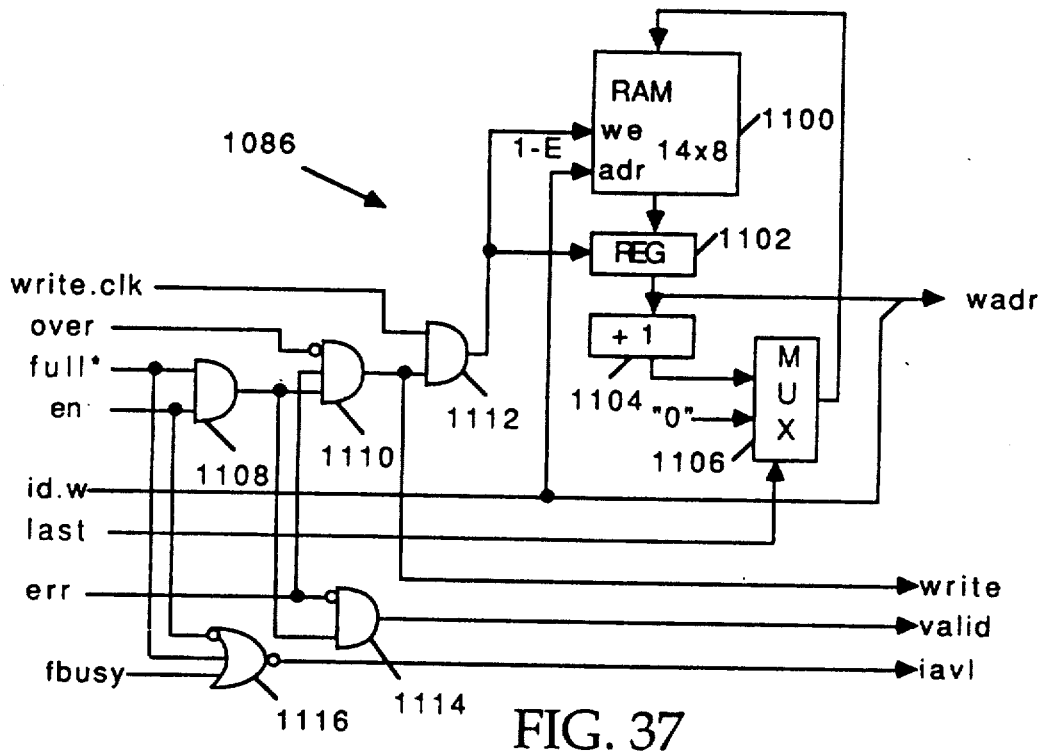
FIG. 37 is a schematic diagram of the write control circuit of FIG. 36.

Referring to FIG. 37, the write control circuit 1086 of FIG. 36, depicted in schematic diagram form, includes a 14x8 bit RAM 1100 for storing the least significant eight bits of the next write address (wadr) associated with each of the possible DMA identification field valves (1-E) at a corresponding address. The RAM 1100 is addressed by the incoming id.w field and transmits the addressed data to a register 1102. The contents of register 1102, together with the id.w field, comprise the next wadr address to be transmitted to the address control circuit 1090 of FIG. 36. The lower eight bits of the wadr address are also transmitted to an adder circuit 1104 which increments the number represented by these bits by one and applies them through a multipeexer 1106 to data input terminals of RAM 1100. Thus when the RAM 1100 is write enabled, the data stored at the current id.w address is incremented.

The err and full* signals provide the inputs to an AND gate 1108, having an output connected to an input of another AND gate 1110. The err signal drives another input of AND gate 1110, while the over signal drives an inverting input of the gate. The output of AND gate 1110, comprising the write signal output of the write control circuit, is connected to an input of still another AND gate 1112. A clock signal (write.clk) drives another input of AND gate 1112, and the output of AND gate 1112 controls the write enabling of RAM 1100. The falling edge of the output of AND gate 1112 also input enables register 1102. The output of AND gate 1108 is further connected to an input of an AND gate 1114 while the err signal is connected to an inverting input of the same AND gate. AND gate 1114 transmits the "valid" signal to the DMA control circuit. The valid signal is high only when the pipe register in the read control circuit is not full, the buffer in unit has received new data, and the new data does not contain an error. If the valid signal is asserted, and the "over" signal from the DMA control unit indicates that the DMA transfer sequence associated with the identification field of the incoming data has not completed its movement into the in buffer, the output of AND gate 1110 is driven high, output enabling AND gate 1112, which write enables RAM 1100, thereby incrementing the stored wadr data at the id.w address. The write signal output of AND gate 1110 causes the address control circuit to acquire the current wadr address and store the incoming data in the buffer RAMs 1080 or 1082. When the DMA control circuit 1016 asserts the "last" signal, indicating that the current incoming data is the last half word of a DMA transfer, the switching state of multiplexer 1106 is changed so that a logical "0" is passed to the data input terminals of RAM 1100 instead of the output of circuit 1104, thereby resetting the address stored in RAM 1100 at the current id.w address to 0.

The full* signal and the fbusy signal from the Fcode unit 1018 of FIG. 31 are applied to inverting and non-inverting inputs, respectively, of a NOR gate 1116 which produces the iavl signal as its output. When the Fcode unit is busy or when the pipe register in the read control circuit is full, the iavl signal is deasserted, causing the in arbitrator to suspend further transmissions from the in fifo buffer.

Figure 38:
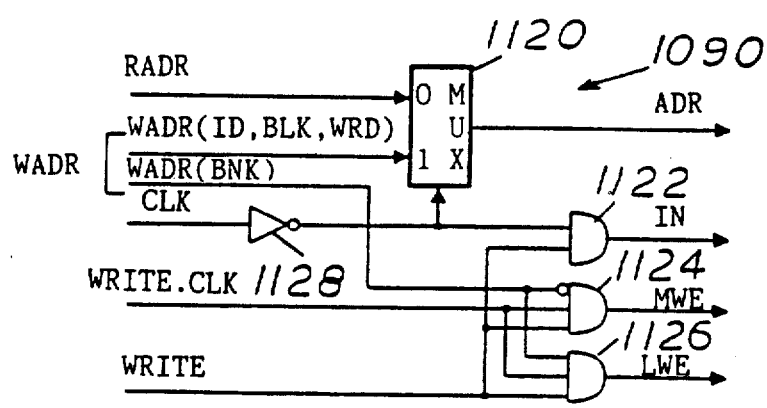
FIG. 38 is a schematic diagram of the address control circuit of the error unit of FIG. 36.

Referring to FIG. 38, the address control circuit 1090 of FIG. 36, depicted in schematic diagram form, comprises a multiplexer 1120 having the read address radr from the read control circuit as one input and the write address wadr, excluding the bank selection bit thereof, as another input. The output of the multiplexer 1120 comprises the addressing signal adr to the buffer RAMs 1080 and 1082. The bank control bit (wadr.bnk) of the wadr address is applied to an inverting input of an AND gate 1124 and to an input of another AND gate 1126. The write.clk signal and the write signal are applied to other inputs of both AND gates 1124 and 1126. The outputs of AND gates 1124 and 1126 provide the mwe and lwe signals, respectively. The write signal and a system clock signal (clk), inverted by an inverter 1128, drive inputs of another AND gate 1122 outputting the "in" signal to buffers 1086 and 1088 of FIG. 36. The output of inverter 1128 also controls the switching state of multiplexer 1120. During half of every clock (clk) cycle, multiplexer 1120 outputs the current radr address as the adr address to the buffer RAMs. The "in" signal is deasserted so that the buffer RAMs read data out to register 1092 of FIG. 36. During the other half of every clock cycle, multiplexer 1120 is switched to pass the wadr address to the buffer RAMs. The "in" signal is asserted (provided the write signal is asserted) so that the incoming data can be written to one of the RAMs depending on which of the mwe or lwe signals is asserted. Thus RAMs 1080 and 1082 alternately read and write data during each clock cycle.

Figure 39:
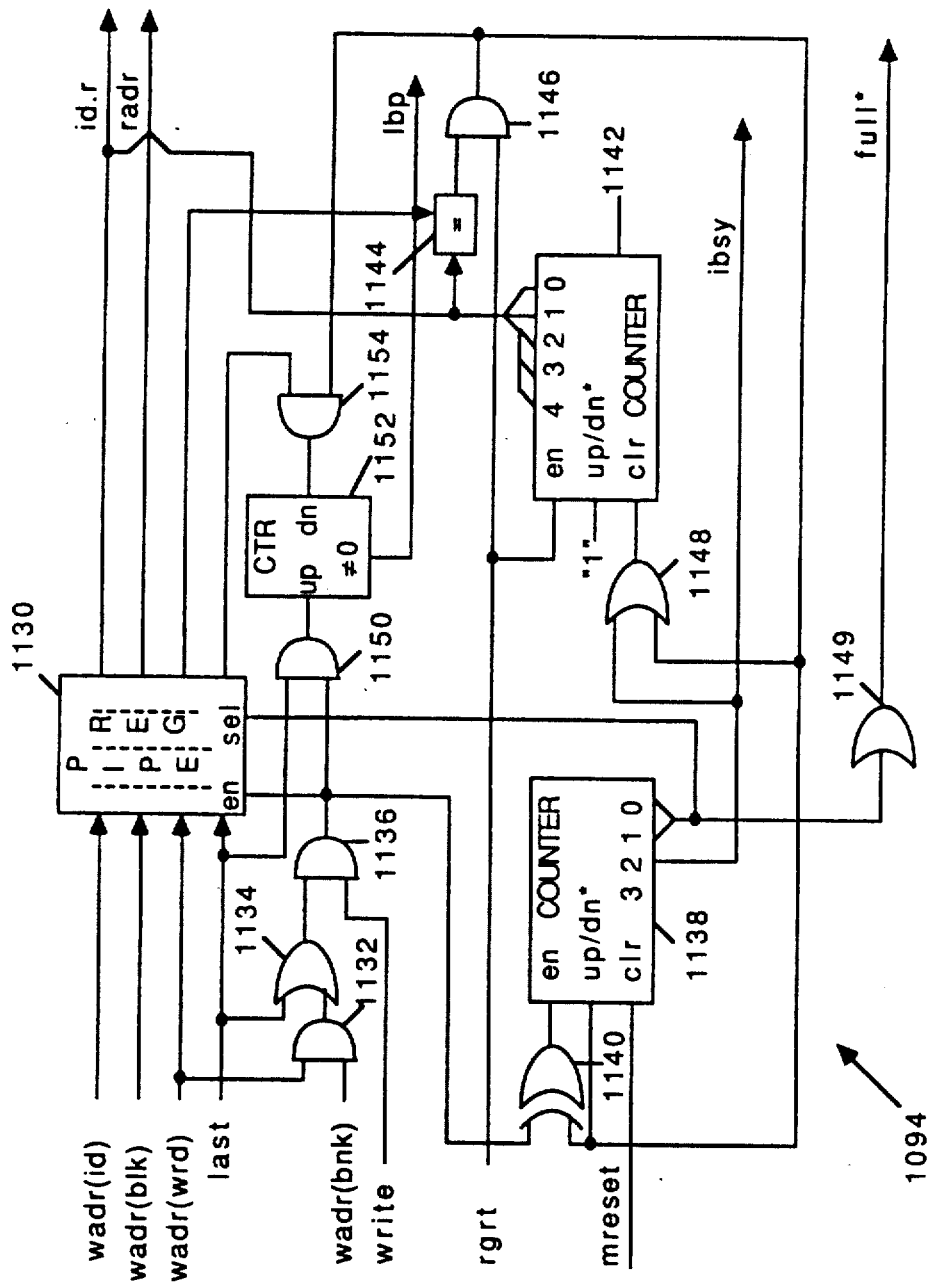
FIG. 39 is a schematic diagram of the read control circuit of FIG. 36.

Referring to FIG. 39, the buffer in read control circuit 1094, depicted in schematic diagram form, includes a pipe register 1130 for storing the incoming wadr address from the write control circuit. The wadr address includes the identification field of the incoming data, wadr(id), the word count of incoming data word, wadr(wrd), a block number(blk), and the bank indicating bit wadr(bnk). All of the wadr address, excluding the bank indicating bit, are stored in pipe register 1130, input enabled whenever the incoming data is the last half word of a DMA transfer block. The end of a block is indicated either by assertion of the "last" signal from the DMA aodress controller or when states of the wadr(wrd) and wadr(bnk) portions of the wadr address indicate that sixty-four 32-bit words have been received and stored. The write control circuit changes the state of the wadr(bnk) bit each time an incoming DMA word arrives at the in buffer, and the five-bit wadr(wrd) field is incremented on receipt of every other incoming word. Since the wadr(wrd) and the wadr(bnk) fields are initially set to 0's, these fields are set to all 0's each time 64 words of a particular DMA sequence are stored in the in buffer. The wadr(wrd) field and the signal wadr(bnk) bit are applied to AND gate 1132 which asserts its output at the end of every 64 word DMA transfer block. The output of AND gate 1132 and the "last" signal are connected to inputs of an OR gate 1134, the output of which drives an input of another AND gate 1136. The write signal is applied to another input of AND gate 1136 and the output of the AND gate controls an input enable terminal of the pipe register 1130. Thus the pipe register is input enabled by the write signal when the current data arriving at the in buffer is the last word of a DMA transfer block.

The stage in which data is stored in pipe register 1130 is controlled by the least significant two output bits (bits 0 and 1) of a counter 1138, the bits being applied to a stage select control input of the pipe register. The counter 1138 is enabled by the output of an XOR gate 1140 having the output of AND gate 1136 as an input. Initially the count output is 0000, and when the first data is stored, the count is decremented to 1111. The next data decrements the count to 1110. When the fourth stage is filled, the count is decremented to 1100. The two least significant bits of the count (bits 0 and 1) also provide inputs to an OR gate 1140 which produces the full* indicating signal transmitted to the write control circuit 1087 of FIG. 37. The third least significant bit of the count (bit 2) is transmitted to the DMA control circuit as the ibsy signal, and indicates that the in buffer unit is currently storing a completed DMA transfer block.

When the DMA control circuit transmits an rgrt signal to the read control circuit 1194 of FIG. 36, the rgrt signal enables a five-bit counter 1142 which always counts up. The five-bit output of counter 1142 and the wadr(id) and wadr(blk) fields stored in the last stage of pipe register 1130 are combined to form the radr address transmitted to the address control unit of FIG. 36. Thus each time the rgrt signal is asserted, the radr address is incremented by one.

The five-bit output of counter 1142 and the wadr(wrd) field in the output stage of the pipe register are applied as separate inputs to a comparison circuit 1144 which asserts its output signal whenever the counter 1142 output matches the magnitude of the wadr(wrs) field. Since the wadr(wrd) indicates the maximum number of 64-bit data words in the DMA transfer block, all of the data in the block will have been read out of the buffer RAMs when the output of counter 1142 matches the wadr(wrd) field. The output of the comparison circuit 1144 and the rgrt signal drive inputs of an AND gate 1146, the output of which drives another input of XOR gate 1140 and also controls the count up/down* input of counter 1138. Thus when all of the data in a DMA block has been transferred to the processing device, the count in counter 1138 is incremented, thereby shifting the data in each stage of pipe register 1130 to the next stage, the data in the last stage being overwritten. The output of AND gate 1146 also drives an inverting input an OR gate 1148, the output of which clears counter 1142 after each DMA block read operation has completed. The ibusy signal is applied to an inverting input of OR gate 1148 so that counter 1142 is also cleared when the pipe register is empty.

The "last" signal from the DMA control circuit is connected to one input of an AND gate 1150, while the output of AND gate 1136 is connected to a second input of AND gate 1150. The output of AND gate 1150 drives a "count up" input of an up/down counter 1152. The "last" signal stored in the output stage of pipe register 1130 is applied as a first input to another AND gate 1154 and the output of AND gate 1146 is applied as a second input. The output of AND gate 1154 drives a count down input of counter 1152. Thus counter 1152 maintains a count of the number of completed DMA blocks stored in the in RAMs 1080 and 1082 of FIG. 36 comprising the last block of a DMA transfer. When the count is non-zero, the counter transmits a signal (lbp) to the DMA control circuit. The purpose of the lbp signal is discussed hereinbelow in conjunction with the detailed description of the DMA control circuit.

Buffer Out Unit

Figure 40:
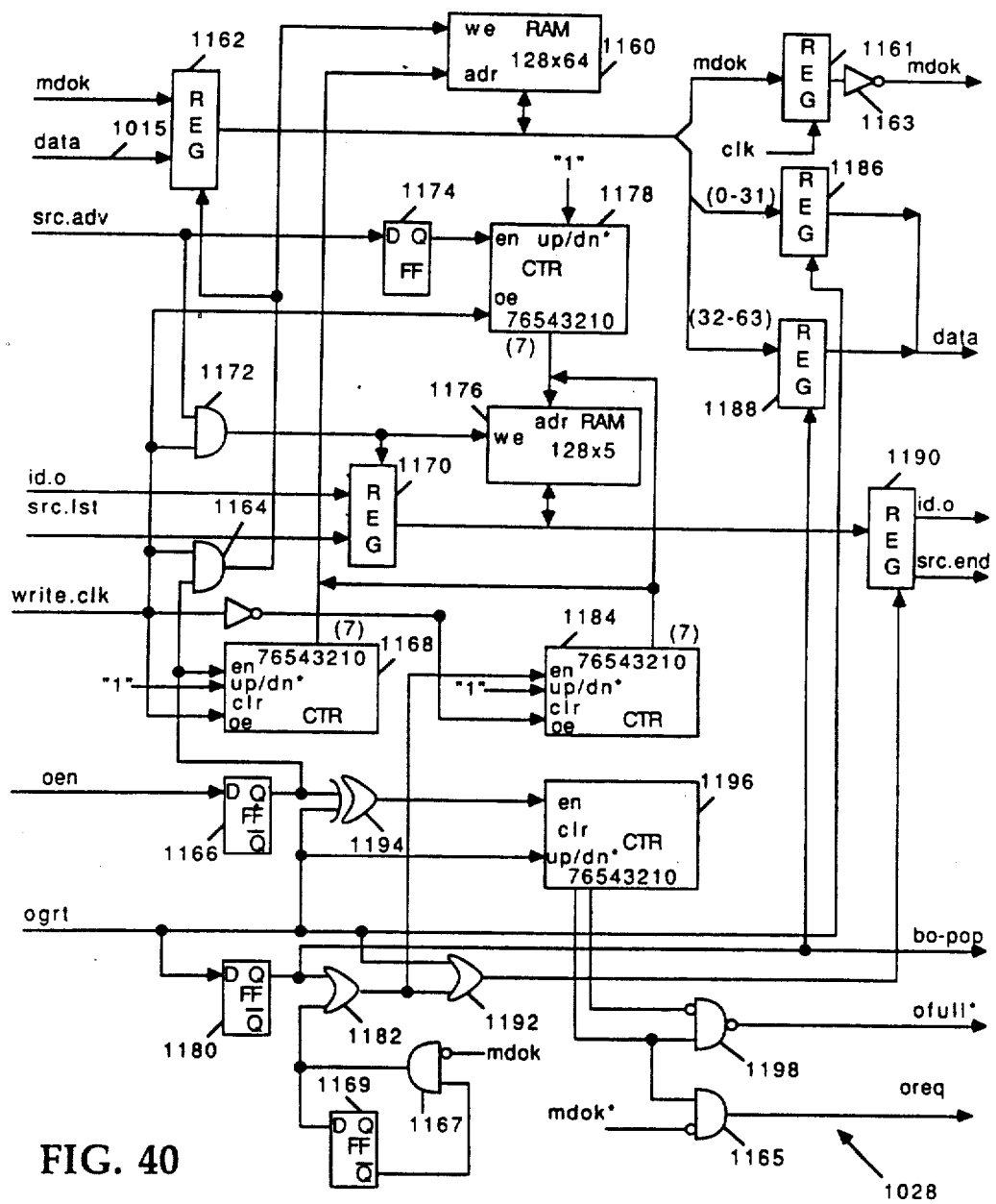
FIG. 40 is a schematic diagram of the buffer out unit of FIG. 31.

Referring to FIG. 40, the buffer out unit 1028 of FIG. 31, depicted in schematic diagram form, is adapted to receive 64-bit DMA data transfer words on data bus 1015, along with the accompanying mdok bit from processing device 12 of FIG. 31, and to store up to 128 such data words and mdok bits in a 128x65 bit random access memory 1160. The data from the processing device is initially stored in a register 1162, input enabled by the output signal of an AND gate 1164. AND gate 1164 has two inputs, a system write clock signal (write.clk) and the Q output of a type D flip-flop 1166. The D input of flip-flop 166 is driven by the input enabling signal oen from the processing device 12. When the processing device transmits a word to register 1162, it asserts the oen signal, thereby setting flip-flop 1166. On the next write.clk pulse, the output of AND gate 1164 is driven high, input enabling register 1162. The contents of register 1162 are transmitted to the data input terminals of RAM 1160, write enabled by the output of AND gate 1164, on the falling edge of the write.clk signal. During a memory write operation, RAM 1160 is addressed by the first seven bits (0–6) of the eight-bit output of a counter 1168. Counter 1168 is count enabled by the Q output of flip-flop 1166 and output enabled by the write.clk signal. A logical "1" voltage source is connected to the up/dn* control input of the counter so that it always counts up.

Whenever the DMA control unit 1016 of FIG. 31 transmits a write strobe to processing device 12, it also transmits a four-bit DMA transfer identification field (id.o) to the buffer out unit 1028, along with a signal (srcadv) indicating that a new data word is forthcoming. If the data word is the last word of a DMA transfer block, the DMA control unit also transmits an indicating signal (srclst) to the buffer out unit. The buffer out unit 1028 stores the id.o and src.lst signals in a register 1170 which is input enabled by the output of an AND gate 1172. The write.clk signal and the srcadv signal drive inputs of AND gate 1172. The srcadv signal is also applied to the D input of flip-flop 1174. Thus register 1170 is input enabled on the first write.clk pulse following a srcadv signal. The contents of register 1170 are stored in a 128x5 bit RAM 1176, also write enabled by the output of AND gate 1172. When data is being written to RAM 1176, it is addressed by the lower 7 bits (0-6) of an 8-bit counter 1178, count enabled by the Q output of flip-flop 1174 and output enabled by the write.clk signal. The up/dn* control input of counter 1178 is also set to a logical "1" voltage source so that it too only counts up.

Thus the buffer out unit 1028 contains two independent queues, one for storing data and mdok bits from the processing device and the other for storing corresponding id.o fields from the DMA control unit. Although there is a one-to-one relationship between incoming data and id.o fields, the data from the processing device arrives at the buffer in unit later than the corresponding id.o field due to the time required for the processing device to respond to a read strobe. Nonetheless, the data and corresponding id.o fields arrive at the buffer out unit in the same relative order and corresponding data and id.o fields are stored at similar addressed in RAMs 1160 and 1176.

When data is stored in RAM 1160, the buffer in unit transmits the request signal (oreq) to the out arbitrator 1032 of FIG. 31 and the out arbitrator subsequently responds with the ogrt grant signal to the buffer in unit. The ogrt signal is applied to the D input of a type D flip-flop 1180, the Q output of which is transmitted through an OR gate 1182 to the count enable input of an 8-bit counter 1184. Counter 1184 is also permanently set to count up by a logical "1" voltage level applied to its up/dn* control input. Thus each time an ogrt signal is asserted, counter 1184 counts up. The lower 7 bits (0-6) of the counter 1184 output address both RAMs 1160 and 1176. The lower 32 bits (0-31) of the data at the current address of RAM 1160 are transmitted to a register 1186 while the upper 32 bits (32-63) are transmitted to another register 1188. The corresponding id.o and srclst fields read out of RAM 1176 are stored in a register 1190. Register 1186 is output enabled by the ogrt signal and register 1188 is output enabled shortly thereafter by the Q output of flip-flop 1180, set in response to the ogrt signal. The Q output at flip-flop 1180 is also transmitted to the error unit as he bo-pop signal. Register 1190 is output enabled by the output of an OR gate 1192 which has the output of OR gate 1182 and the ogrt signal as its inputs. The data output of registers 1186 and 1188 is thus transmitted to the out fifo buffer in the form of a succession of two 32 bit words, each accompanied by the id.o field from register 1190. At the same time the src lst bit stored in register 1190 is transmitted to the DMA control unit as the srclst signal, indicating to the error unit when the last word of a DMA transfer block has been sent to the in fifo buffer.

The Q output of flip-flop 1166 and the ogrt signal are also connected to inputs of an XOR gate 1194 which drives the count enable input of another eight-bit counter 1196. The ogrt signal is also connected of the up/dn* control input of the counter. Counter 1196 counts down when data from the processing device is written into RAM 1160 and counts up when data is read out of RAM 1160 and therefore maintains an inverse count of the number of data words stored in the RAM.

The upper bit (bit 7) of the counter 1196 output drives an input of a NAND gate 1198 while bit 6 of the counter output drives an inverting input of the same NAND gate. The output of the NAND gate 1198 produces the ofull* signal, when RAM 1160 contains data not yet forwarded to the out fifo buffer.

The mdok bit stored in RAM 1160 is transmitted to a register 1161 when the corresponding data stored in RAM 1160 is transmitted to registers 1186 and 1188. Register 1161 is output enabled by the system clock. The data in register 1161 is inverted by an inverter 1163 to produce the mdok* signal transmitted to the error unit. The mdok* signal is also applied to an inverting input of an AND gate 1165 while output bit 7 of counter 1196 is applied to a non-inverting input of the AND gate. AND gate 1165 transmits the oreq signal to the out arbitrator when data is ready to be forwarded to the out fifo buffer, but this signal is blocked by the mdok* signal if the mdok* signal indicates that data in registers 1186 or 1188 contains an error. Thus the arbitrator does not initiate the ogrt signal to forward the data in registers 1186 and 1188 to the out fifo buffer. In order to ensure that counter 1184 is incremented, the mdok* signal is connected to an input of another AND gate 1167, along with the Q* output of a type D flip-flop 1169. The output of AND gate 1167 drives the D input of flip-flop 1169 and further drives an input of OR gate 1182. When the mdok* signal is asserted, the output of OR gate 1182 is driven high, thereby incrementing counter 1184. Flip-flop 1169 is reset on the next system clock cycle, thereby turning off the output of AND gate 1167.

DMA Control Unit

Figure 41:
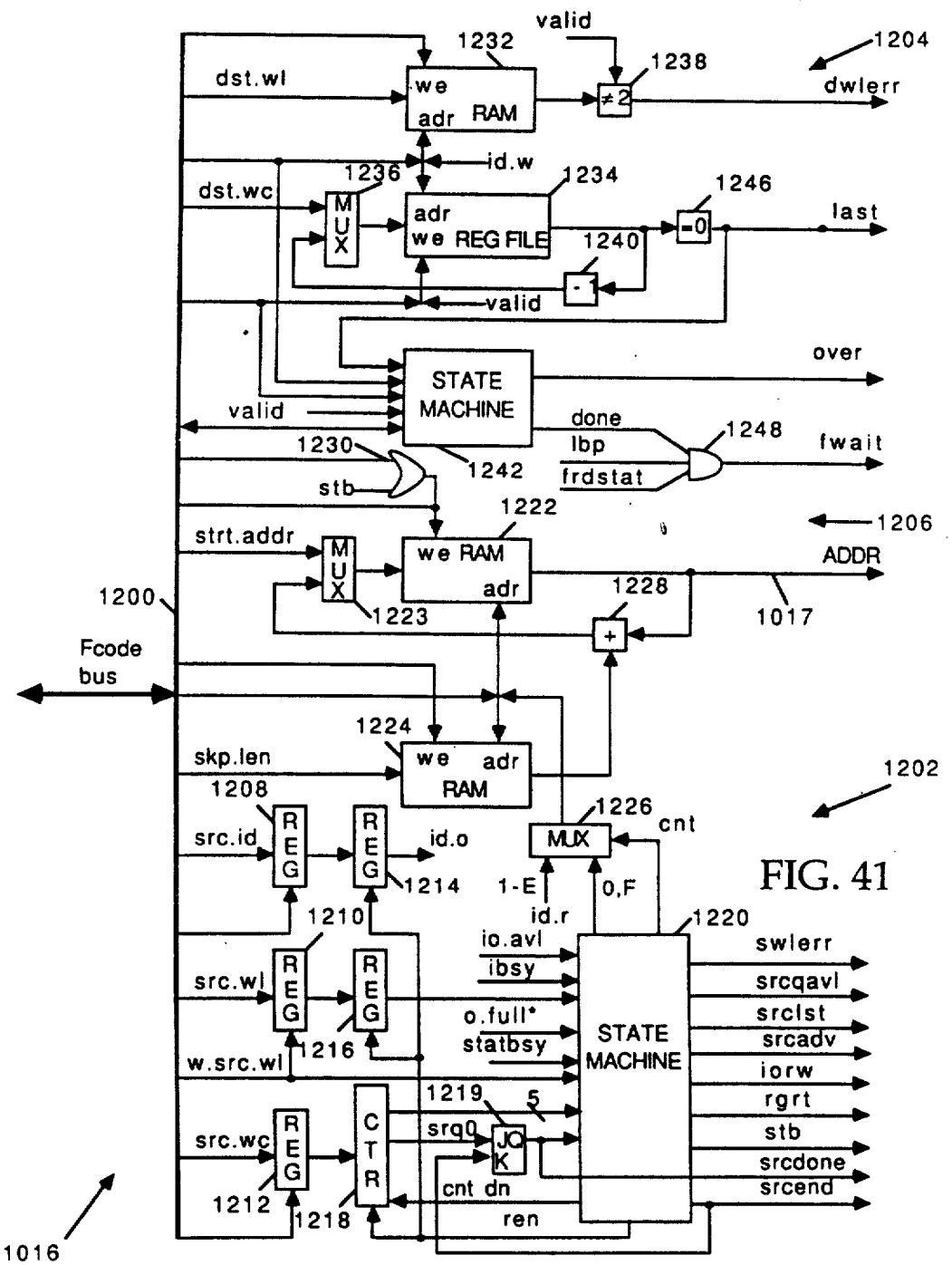
FIG. 41 is a combined block and schematic diagram of the DMA control unit of the error unit of FIG. 31.

Referring to FIG. 41, the DMA control unit 1016, depicted in schematic diagram form, is adapted to control the flow of DMA data from the buffer in unit 1014 to the processing device 12 and from the processing device to the buffer out unit. The DMA control unit also provides memory addressing for the processing device during DMA input and output transfers.

The DMA control unit 1016 comprises a source queue control section 1202, a destination queue control section 1204, and an address control section 1206. The source queue control section 1202 includes a set of three registers 1208, 1210 and 1212 for storing, respectively, the identification field of a DMA transfer (src.id), a word length field (src.wl) and a word count field (src.wc). The word length field contains two bits. A (10) word length field indicates that the data stored in registers 1208, and 1210 is associated with a valid 64-bit DMA transfer. Any other state of the word length field indicates that the data in registers 1208 and 1210 is to be ignored. The word count field is sixteen bits wide and indicates the number of 32-bit half words in the DMA transfer sequence referenced by the identification field in register 1208. Data is loaded into registers 1208, 1210 and 1212 by the Fcode unit 1018 of FIG. 31 acting through an Fcode bus 1200, in response to Fcode messages sent to the Fcode unit from any processing device connected to the bus system. The Fcode bus 1200 includes data lines connected to the data terminals of all three registers 1208, 1210 and 1212, and separate addressing and write control lines connected to input enabling terminals of each register.

The three registers 1208, 1210, and 1212 are loaded prior to initiating a source DMA transfer sequence from processing device 12 of FIG. 31 to the buffer out unit 1028, with register 1210 being loaded last. The contents of registers 1208, 1210, and 1210 are provided as inputs, respectively, to a register 1214, a register 1216, and a counter 1218, all of which are input enabled by a signal (ren) from a state machine 1220. The Fcode control bus input enabling signal (w.src.wl) to the word length register 1210 is also applied as an input to state machine 1220. If no other DMA transfer from the processing device to the buffer out unit is currently awaiting completion, the state machine asserts the ren signal, causing the data from registers 1208 and 1210 to be stored in registers 1214 and 1216 and causing the counter 1218 to set its current count equal to the data from register 1212. The counter 1218 asserts a "srqo" signal when the current count is equal to zero. This signal is applied to the J input of a J-K flip-flop 1219 which produces the srcdone signal at its Q output, transmitted to the error unit and also applied as an input to state machine 1220. The contents of register 1216 are also applied as input to state machine 1220 and the contents of register 1214 provide the id.o field transmitted to the buffer out and error units.

The address control section 1206 of the DMA control unit 1016 includes a pair of RAMs 1222 and 1224, each of which have 16 storage locations, one associated with each possible destination identification field (1-E), and two additional storage locations associated with each of two possible source 0MA transfers currently in the source queue. RAMs 1222 and 1224 are also loaded by the Fcode unit using data, address and separate write enable lines of the Fcode bus connected to the appropriate terminals of the RAMs. Prior to a source DMA transfer, a starting address (strt.addr) is loaded into one of the storage locations of RAM 1222 through a multiplexer 1223, the switching state of which is controlled by a signal from the Fcode bus. The starting address indicates the address in processing device 12 of the first word of a source DMA transfer. At a similar address in RAM 1224, a "skip length" (skp.len) quantity is also stored indicating the addressing increment to be added to the starting address in order to locate the next data word of the source DMA transfer. The start.addr data is loaded into RAM 1222 through a multiplexer 1223 controlled by a signal on the Fcode bus 1200.

State machine 1220 monitors the states of the io.avl signal from the processing device and the obsy* signal from the out buffer. When the processing device is ready to send data, and the buffer out unit is ready to receive it, the state machine initiates the source DMA transfer. During a source DMA transfer operation, RAMs 1222 and 1224 are both addressed by the output of a multiplexer 1226, controlled by a signal from state machine 1220. The state machine provides one four-bit addressing field input (either a 0 or an F) to multiplexer 1226 while the id.r field (1-E) from the buffer in unit comprises another. During a source DMA transfer operation, state machine 1220 switches multiplexer 1226 so that it passes the addressing field provided by the state machine to the addressing terminals of RAMS 1222 and 1224. The RAMs 1222 and 1224 then read out the data stored at the address indicated by the source addressing field provided by the state machine. The address output of RAM 1222 is then transmitted to the processing device via the address bus 1017. State machine 1220 thereupon transmits the strobe (stb) signal to the processing device, causing the device to forward the data at the current address to the buffer out unit. The state machine 1220 further sends the srcadv signal to the buffer out unit, causing it to store the current id.o field output of register 1214.

The skip length output of RAM 1224 and the address data output of RAM 1222 are summed by an adder 1228 and the adder output is transmitted through multiplexer 1223 to the data input terminals of RAM 1222. RAM 1222 is write enabled by the output of an OR gate 1230 which has the stb output of state machine 1220 as one of its inputs. Thus when state machine 1220 initiates the strobe signal, the incremented address output of adder 1228 is stored at the current address of RAM 1222 and the incremented address is used to address the processing device to obtain the next word of the source sequence. The use of the skip length field permits rapid access to selected rows or columns of an array stored in the processing device memory since data associated with particular columns or rows of an array are typically stored at regular address increments. Without the use of a variable skip length, data stored at intervening addresses would also have to be read and transferred to the destination processing device even though such data is not otherwise required.

Each time the state machine 1220 transmits a strobe signal to the processing device, it also transmits a count down signal to counter 1218, causing it to decrement its count by one. The state machine monitors the output of counter 1218 and when the last 5 bits of the counter have been decremented to 00000, indicating that a 32 word DMA transfer block has been completed, it checks the ibsy signal from the buffer in unit and if the buffer in unit is requesting to send data to the processing device, the DMA controller services the request. Thereafter the state machine 1220 initiates transfer of another block of data from the processing device to the buffer out unit. The process is continued until all of the data of the source DMA transfer sequence has been sent to the buffer in unit. When all sixteen bits of the counter 1218 output are 0, flip-flop 1219 sets, transmitting the srcdone signal at its Q output to the error unit and to the state machine 1220. The state machine sends the srclst signal to the buffer out unit and then input enables registers 1214, 1216 and counter 1218 with the ren signal to transfer the next source DMA transfer control data from registers 1208, 1210 and 1212. The state machine also switches the state of the current addressing field applied to multiplexer 1226 from 0 to F, or vice versa, so that the appropriate storage locations in RAMs 1222 and 1224 containing the starting address and skip length data for the new DMA transfer sequence are accessed when the new source DMA transfer begins. When the state machine 1220 no longer detects the statbsy signal from the error unit, it transmits the srcend signal to the error unit. The state machine also produces the sreqavl signal transmitted to the error unit whenever it advances the source queue by enabling registers 1214, 1216 and 1218.

The destination control section 1024 of DMA control unit 1016 includes a RAM 1232 for storing a two-bit destination word length field at each of 14 different addresses, and a register file 1234 for storing a sixteen-bit word count in each each of 14 different addressable registers. When preparing for a destination DMA transfer to the receiving processing device 12 of FIG. 31 a controlling processing device sends a series of Fcode messages to the Fcode unit 1018 of FIG. 31. These messages cause the Fcode unit to store a 16-bit destination word count field (dst.wc) in register file 1234 at a corresponding one of the 14 register addresses (1-E) and a two-bit destination word length (dst.wl) field in RAM 1232 at the same RAM address. The Fcode unit transmits the destination word count field to the register file over data lines of the Fcode bus, applied to data input terminals of the register file through a multiplexer 1236. The switching state of multiplexer 1236 is controlled by an Fcode bus control line. The Fcode bus data lines are connected directly to the data input terminals of RAM 1232. Separate control lines of the Fcode bus also control the write enable terminals of devices 1232 and 1234. Also, in setting up a DMA transfer to the processing device 12 from a remote source, the controlling processor transmits Fcode messages causing the Fcode unit to store selected skip length and starting address fields at corresponding addresses (1-E) in RAMs 1224 and 1222.

Subsequently, when each word of the DMA transfer arrives in the buffer in unit, the buffer in unit transmits the identifying id.w field to the DMA control unit to address RAM 1232 and register file 1234. If the identification field references an active DMA transfer, RAM 1232 reads out the word length field previously stored therein by the Fcode unit. The word length field is transmitted to a decoder 1238 which asserts the destination word length error signal (dwl.err)to the buffer in unit if the word length field is not a 2 indicating that the id.w field references an active 64-bit. DMA transfer sequence. Decoder 1238 is output enabled by the "valid" signal from the buffer in unit. The id.w field addressing register file 1234 causes the register file to read out a current word count associated with the DMA transfer identified by the id.w field. The word count stored in register file 1234 is initially set to the maximum number of 32-bit words in the DMA transfer. The output of register file 1234 is applied to a decrementer 1240 which decreases the field by one and applies the decremented field back to the data input terminals of the register file via multiplexer 1236. The valid signal is also applied to the write enable terminal of the register file 1234 so that each time error free data arrives in the buffer in unit, the stored word count associated with the identification field is decremented. The word count output of register file 1234 is also transmitted to a decoder which asserts the "last" signal transmitted to the buffer in unit if the current word count is 0, indicating that all of the words of the DMA transfer have been received by the buffer in unit.

The "last" signal is also applied as an input to another state machine 1242, along with the id.w field and the valid signal. State machine 1242 maintains a record as to whether the last word of any DMA transfer sequence has been sent to the buffer in unit and produces the "over" signal transmitted to the buffer in unit whenever the incoming data is erroneously identified by an id.w field as being a part of a DMA transfer for which all of the data has already been received by the buffer in unit. When the identification field is subsequently assigned to a new DMA transfer, the Fcode unit accesses the state machine 1242 using the Fcode bus, to reset the "over" output associated with that identification field.

When the buffer in unit has received a complete DMA transfer block, it transmits the ibusy signal to the DMA control unit 1016 along with the id.r field. The ibusy signal is applied as another input to state machine 1220 and, in response, the state machine switches the multiplexer 1226 to pass the id.r field to the address terminals of RAMs 1222 and 1224. RAM 1222 then places the starting memory address for the DMA block on address bus 1017 and the state machine 1202 transmits the strobe signal (stb) to the processing device, along with the io.rw signal, causing the processing device to store the data from the buffer in unit. The strobe signal, acting through OR gate 1230, also write enables RAM 1222 to increment the memory address by the skip length output of RAM 1224. The state machine 1220 further transmits the rgrt signal to the buffer in unit, causing it to increment its count of words transmitted to the processing device.

Any processing device in the system may determine the completion status of a selected DMA transfer by using an Fcode read transmission to access a storage location in state machine 1242 where the completion status of the DMA transfer is stored. If the DMA transfer has been completed, the state machine asserts a "done" signal, applied as an input to an AND gate 1248. The "lbp" signal from the in buffer unit, and the Fcode bus signal (frdstat) initiated to read the completion status data in the state machine, are also applied as inputs to the AND gate 1248. If the lbp signal indicates that in buffer in unit is waiting to send the last block of any DMA transfer sequence to the device 12, the output of AND gate 1248, comprising the fwait signal to the Fcode-unit, is driven high. The fwait signal causes the Fcode unit to refrain from reading the completion status until after all last blocks in the buffer in unit have been transmitted to the device 12. It also causes the Fcode unit to send the fbusy signal to the buffer in unit to inhibit it from accepting any more input data until the Fcode unit can read completion status of the selected DMA transfer.

Error Unit

Figure 42:
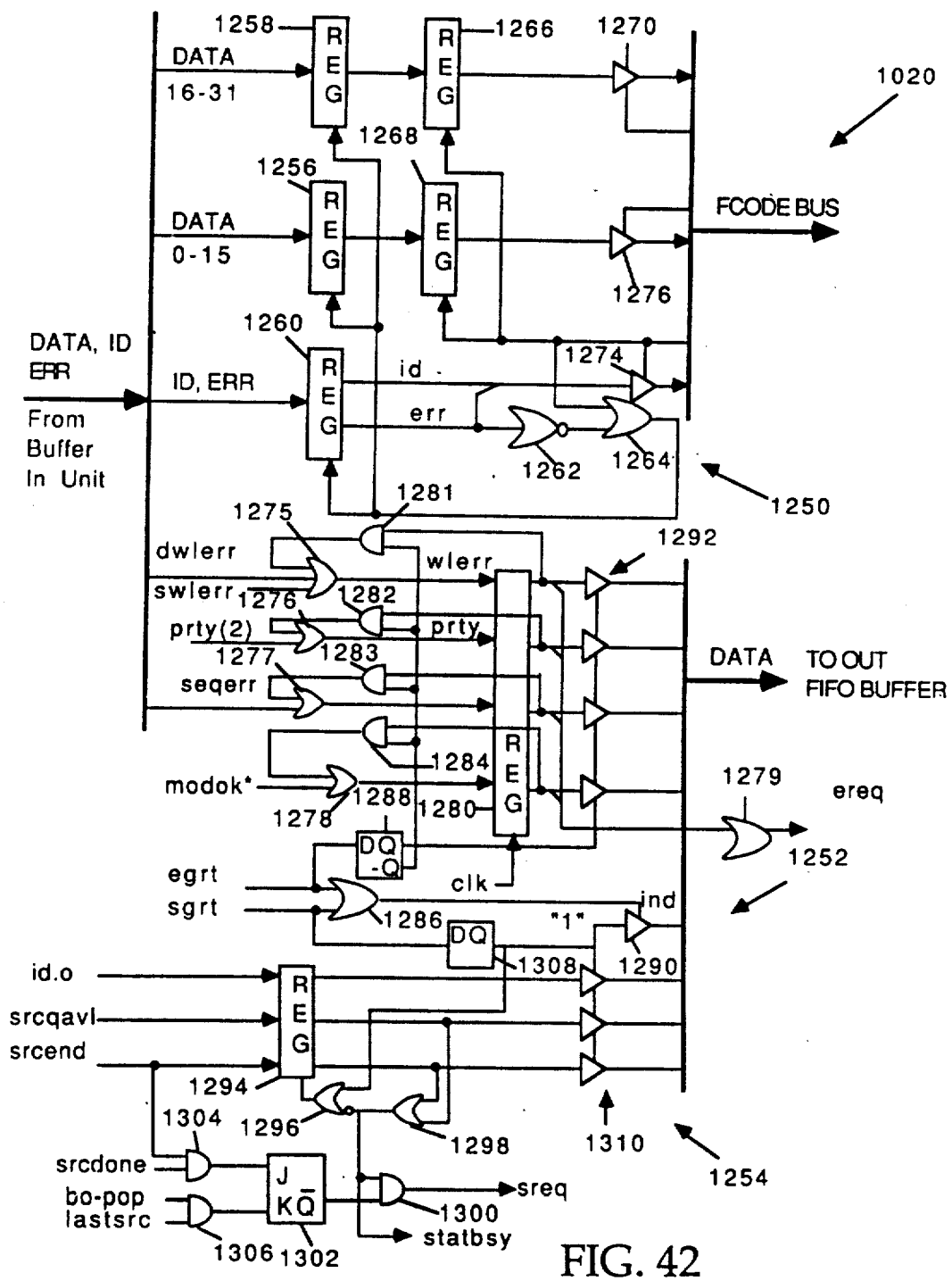
FIG. 42 is a schematic diagram of the error unit of FIG. 31.

Referring to FIG. 42, the error unit 1020 of FIG. 31, depicted in schematic diagram form, includes a state save register section 1250, an error register section 1252, and a status register section 1254. The state save register section stores the current state of the data, identification and error fields from the buffer in unit whenever the error field indicates an error has occurred. This information may then be read by any processing device in the system by using an Fcode read message. The error register section 1252 stores data indicating the last error detected by the device interface unit and then forwards a "special" error message to the bus interface unit of FIG. 4. The status register section 1254 produces the "source DMA transfer done" and "source queue available" as "special" messages sent to the bus interface unit of FIG. 4 in response to indicating signals from the DMA control and buffer out units.

The 16 higher order bits (0-15) of the incoming data field from the buffer in unit are applied to inputs of state save registers 1256 while the 16 lower order bits (16-31) are applied to inputs of another state save register 1258. The incoming identification and error fields are applied to inputs of still another state save register 1260. These registers are continuously input enabled until at least one bit of error field indicates an error has occurred. The error field stored in register 1260 is applied to a NOR gate 1262, the output of which is connected to an input of an OR gate 1264. The output of OR gate 1264 enables state save registers 1256, 1258 and 1260. When the error field indicates an error has occurred, NOR gate 1262 turns off, thereby turning off OR gate 1264 which ceases to input enable the state save registers.

The output of register 1258 is connected to the input of another register 1266, and the output of register 1256 is connected to the input of another register 1268. Registers 1266 and 1268 are input enabled by signals from the Fcode unit carried on the Fcode bus. The outputs of registers 1266, 1268 and 1260 are all connected to data lines of the Fcode bus through tri-state buffers 1270, 1272, and 1274, respectively, all of which are enabled by Fcode bus control signals. The Fcode unit reads the contents of register 1260 by enabling buffer 1274. The control signal which enables buffer 1274 also input enables registers 1266 and 1268 to store the data from registers 1258 and 1256. The control signal which enables buffer 1274 further drives an input of OR gate 1264, causing the output of OR gate 1264 to input enable registers 1256, 1258, and 1260. The Fcode unit sequentially reads the contents of registers 1266 and 1268 by output enabling buffers 1270 and 1276.

In the error register section 1252, the dwlerr and swlerr signals produced by the DMA control unit are both applied as inputs to an OR gate 1275 which produces an error bit, applied as an input to an error register 1280 which is continuously input enabled by the system clock. The two parity error bits, produced by the in fifo buffer, drive separate inputs of another OR gate 1276 providing a single parity error output bit, also applied as an input to error register 1280. The sequence error bit (seqerr), produced by the in fifo buffer, and the mdok* error bit, produced by the buffer out unit, are both coupled as inputs of register 1280 through OR gates 1277 and 1278 respectively. The word length error, parity error, sequence error and MDOK* bits stored in register 1280 are applied to an input of a corresponding AND gate 1281-1284, respectively, the outputs of which drive second inputs of OR gates 1275-1278, respectively. The −Q output of a flip-flop 1288 controls a second input of each AND gate 1281-1284. Each error bit in error register 1280 also drives a separate input of an OR gate 1279, providing the ereq signal to the out arbitrator when any one or more of the input bits are high. When an error causes an indicating error bit to go high, the corresponding bit in register 1280 is set high, and this bit remains high until flip-flop 1288 is set by the egrt signal.

The egrt signal from the out arbitrator is connected to an QR gate 12B6 and also to the D input of flip-flop 1288. The egrt signal causes the error register section to send two words over the data lines to the out fifo unit. The first word includes a single "ind" bit indicating that the transmission is a "special" message to the bus interface unit. The second word contains the error data in register 1280. The output of OR gate 1286 output enables a tri-state buffer 1290, driven by a logical "1" source, which transmits the "ind" bit on one data line of the Fcode bus. Thereafter, the Q output of flip-flop 1288 output enables a set of tri-state buffers 1292 which place the error data in register 1280 on the data bus. The −Q output of flip-flop 1288 also drives the outputs of AND gates 1281-1284 low, which in turn drives the outputs of OR gates 1275-1278 low. Then, on the next clock cycle, the error bits in register 1290 are all driven low, turning off the ereq signal and resetting flip-flop 288.

In the status register section 1254 of the error unit 1020, the id.o, srcqavl, and srcend signals from the DMA control unit are stored in a status register 1294, input enabled by the output of an OR gate 1296. The srcqavl and srcend bits stored in register 1294 drive inputs of an OR gate 1298, the output of which is connected to an inverting input of OR gate 1296. Thus OR gate 1296 input enables register 1294 until either the srcqavl or srcend bits in the register are set. The output of OR gate 1298, providing the statbsy signal sent to the DMA control unit, is also connected to an input of an AND gate 1300 for producing the sreq signal sent to the out arbitrator. The −Q output of a J-K flip-flop 1302 drives another input of AND gate 1300. The srcend and the srcdone signals from the DMA control unit drive inputs of an AND gate 1304 the output of which drives the J input of flip-flop 1302. The bo-pop and lastsrc signals from the buffer out unit drive inputs of another AND gate 1306, and the output of gate 1306 drives the K input of flip-flop 1302.

When the DMA control unit asserts the srcend signal, indicating that it has completed transmitting strobe signals to the processing device for the current source DMA transfer, register 1294 is input disabled and the last id.o field from the DMA control unit is saved in the register. The high srcend bit causes OR gate 1298 to transmit the statbsy signal to the DMA control unit, preventing it from initiating a srcdone signal. When the buffer out unit sends the last word of the source DMA transfer to the out fifo buffer, it transmits the lastsrc and bo-pop signals to the error unit, thereby turning on AND gate 1306 to reset flip-flop 1302. The −Q output of flip-flop 1302 output enables AND gate 1300 which transmits the sreq signal to the out arbitrator. When the out arbitrator responds with the srgt signal, the sgrt signal, which drives another input of OR gate 1288, causes buffer 1290 to transmit a first word to the out fifo buffer containing the "ind" bit. The sgrt signal also drives a D input of a type D flip-flop 1308. The Q output thereof output enables a set of tri-state buffers 1310 which transmit the contents of register 1294 as a second data word to the out fifo buffer. The Q output of flip-flop 1208 also drives another input of OR gate 1296, thereby input enabling register 1294. The output of OR gate 1298 is driven low, turning off the statbsy signal to the DMA control unit and the sreq signal to the out arbitrator. The DMA control unit then responds with the srcdone signal which, in combination with the srcdone signal, turns on AND gate 1304 to set flip-flop 1302, thereby turning off the sreq signal.

Fcode Unit

Figure 43:
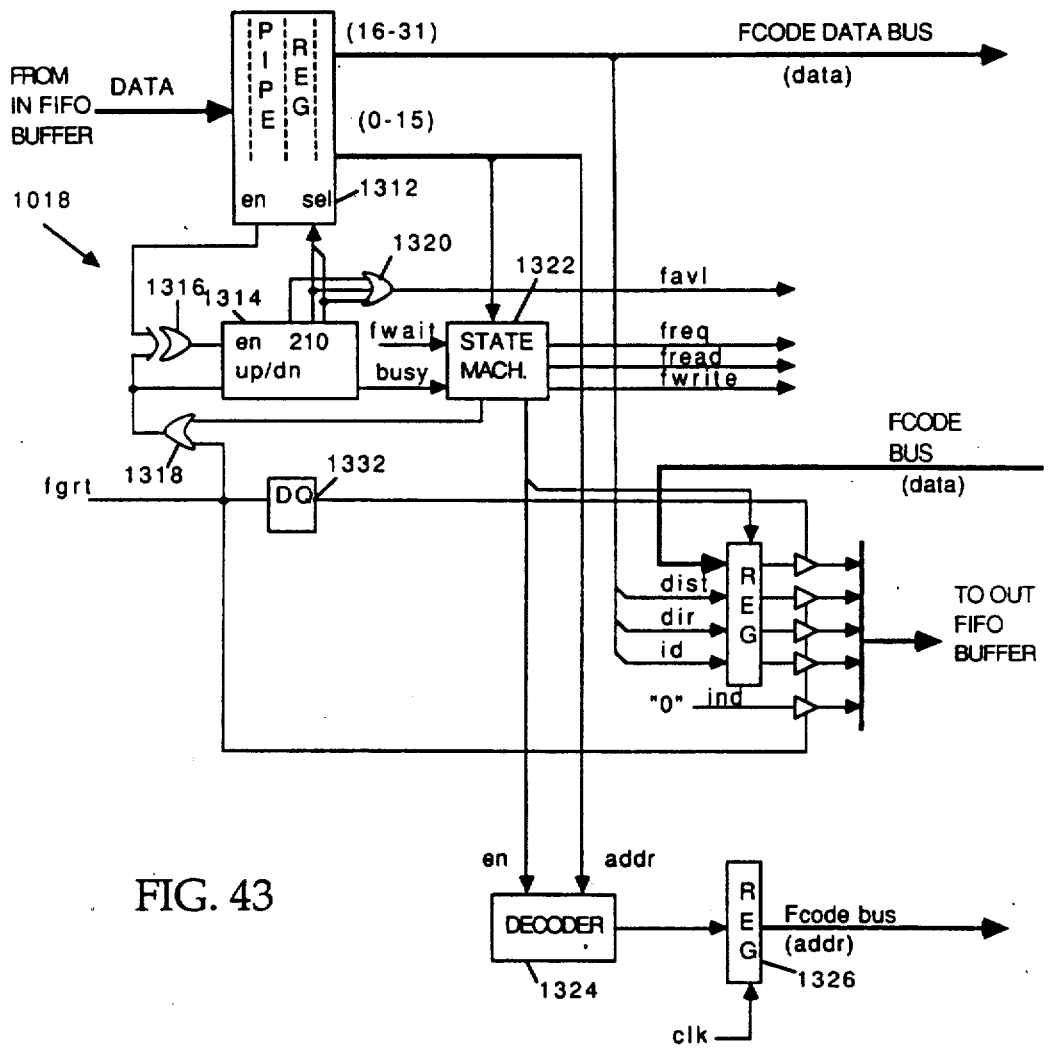
FIG. 43 is a schematic diagram of the Fcode unit of FIG. 31.

Referring to FIG. 43, the Fcode unit 1018 of FIG. 41, depicted in schematic diagram form, includes a four-stage pipe register 1312 for storing Fcode messages transmitted over the system bus from remote processing devices via the in fifo buffer 1010. The pipe register stage into which the incoming Fcode message is stored is controlled by the lower two bits (0 and 1) of a three-bit counter 1314, initially set for a count of 100. The counter 1314 is count enabled by the output of an XOR gate 1316, one input of which is driven by the fen signal from the in arbitrator. The fen signal also input enables pipe register 1312. The fgrt signal from the out arbitrator is connected to an input of an OR gate 1318, and the output of gate 1318 drives another input of XOR gate 1316 and controls the count up/dn* input of counter 1314. Thus counter counts down when input enabled by the fen signal and counts up when input enabled by the fgrt signal. All output bits 0-2 of counter 1314 are applied as inputs to an OR gate 1320, producing the favl signal when any bit is high.

The first bit (bit 0) of the data in the output stage of pipe register 1312 is applied as an input to a state machine 1322 which determines from the bit whether the Fcode message is a read or a write request. Bits 1-15 are applied as addressing data to decoder 1324, and decoder 1324 is output enabled by a signal (en) from state machine 1322. The decoder 1324 asserts one of a set of output signals applied as inputs to a register 1326 depending on the address input from the pipe register. The data stored in register 1326 operates RAM and register addressing lines on the Fcode bus when the register is input enabled by the system clock.

The lower 16 bits (bits 16-31) of the Fcode message stored in the last stage of pipe register 1312 are placed on the Fcode write bus. When the first bit of the Fcode message indicates that the message is a register write operation, state machine 1322 enables first decoder 1324. Register 1326 then asserts the appropriate signals on the Fcode bus to address the RAM or register indicated by the addressing data applied to the decoder. The state machine 1322 then asserts an fwrite signal connected to write enable terminals of each RAM or register, causing the write enabled RAM or register to store the data from the pipe register 1312 carried on data lines of the Fcode bus. Thereafter, the state machine transmits an "advance" signal to OR gate 1318 causing counter 1314 to count up, thereby advancing the Fcode data through the pipe register.

When an Fcode message in pipe register 1312 is a read request, the lower order bits (16-31) of the message contain distance, direction and identification fields which are stored in a register 1328 on receipt of an input enabling signal from state machine 1322. The higher order bits (1-15) contain the addressing data necessary to locate the register or RAM location to be read, and decoder 1324 and register 1326 operate as in a write operation to generate signals on the Fcode bus to address the selected register or RAM. The returned data is stored in register 1328 along with the distance, direction and identification fields from the pipe register 1312 when the state machine 1322 input enables the register 1328. Thereafter, the state machine 1322 transmits the freq signal to the out arbitrator. When the out arbitrator returns the fgrt signal, the fgrt signal drives the outputs of OR gate 1318 and XOR gate 1316 high, thereby increasing the count in counter 1314 to shift the Fcode data through the pipe register.

The fgrt signal also output enables a set of tri-state buffers 1330 which place the distance, direction and data fields in register 1328 on the data bus to the out fifo buffer along with an "ind" bit set to a logical "0" state, indicating the data is not a "special" transfer from the error unit and that the data is to be routed on the system bus according to the distance, identification and direction fields. The fgrt signal also drives a D input of a type D flip-flop 1332, the Q output of which output enables another tri-state buffer 1334 for transmitting the data field in register 1328 to the in fifo buffer. Thus the Fcode unit sends a sequence of two words to the in fifo buffer in response to an Fcode read message, the first word conveying the distance, direction, identification and ind fields and the second word conveying the data field containing the information obtained from the selected register or RAM storage location.

Referring to FIG. 1A, it is thus seen that the bus system 10 of the present invention is adapted to provide direct memory access communication between a plurality of devices 12. In the preferred embodiment of the invention, each processing device is adapted to send and receive 64 bit data words. However, the system may be easily adapted to accommodate processing devices which input and output other word lengths. To do so, the comparator 1238 of FIG. 41 is modified. This comparator outputs the dwl err if the destination word length data output of RAM 1232 has a value of other then 2, which by convention indicates a 64-bit word length. If device 12 were a 32-bit device, the comparator 1238 is changed to assert the dwl err if the word length output of RAM 1232 does not have a value of 1, indicating by convention a 32 bit word length. Similarly a 128-bit device 12 could be accommodated by setting comparator to assert the dwl.err signal to indicate an error if the word length output of RAM 1232 does not equal 3 and adjusting state machine 1220 so that it produces the swl err signal only when the source word length output of register 1216 is not equal to 1, 2 or 3, as required for 32, 64 or 128 word transfers. Finally the buffer in and buffer out units 1014 and 1028 of FIG. 31 would be changed to accept variably sized data words. Buffer in unit 1014 of FIG. 36 would be modified to include four, rather than two RAMs, the RAMs being alternately read and write enabled to store incoming data singly, in pairs, or quadruplets, depending on whether processing device 12 is adapted to handle 32, 64, or 128 bit words. The buffer out unit 1028 of FIG. 40 is modified by increasing the size of RAM 160 so it may store up to 129 bits at each address, and two more output registers such as registers 1186 and 1188 would be provided to disassemble each 128 bit word into four 32 bit words for sequential transmission to the out fifo buffer. With such modifications, it would not be necessary that every device 12 system operate using the same 64-bit word length, and devices having different word lengths may communicate with one another through the system bus.

While preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. An apparatus for transmitting and receiving parallel data words between a plurality of digital devices comprising:
   a plurality of interface means, each for selectively transmitting parallel data words to and receiving parallel data words from a correpsonding digital device; and
   a plurality of bi-directional bus means interconnecting said plurality of said interface means such that each said interface means is connected to at least one, and not more than twoother said interface means,
   each bi-directional bus means alternately conveying parallel data words to differing parallel data word sequences in opposite directions betwen a pair of said interface means, and conveying arbitration signals concurrent with said parallel data words for coordinating transmission of said parallel data words onsid bi-directional bus means,
   each said interface measn including means for transmitting one of said arbitration signals to and receiving another of said arbitration signals from each of said interface means to which it is connected via the bi-directional bus means and for controlling alternate transmitting and receiving of parallel data words via the bi-directional bus means to which it is connected in response to said arbitration signals.

2. The apparatus of claim 1 wherein each said interface means includes measn for concurrently retransmitting a parallel data word received from at least one of said interface means to which it is connected to any other said interface means to which it is also connected and to the corresponding digital device, and wherein each of said interface means includes means for concurrently retransmitting a parallel data word from the corresponding digital device to each other of said interface means to which it is connected.

3. The apparatus of claim 2 wherein each of said interface means includes means to transmit a distance field concurrently with each parallel data word it transmits to any other of said interface means to which it is connected via any one of said bi-directional bus means, said distance field indicating a number of other of said interface means to retransmit said parallel dat word, and
 wherein each of said interface means includes means to receive the distance field with parallel data words transmitted thereto from any other of said interface means to which it is connected.

4. The apparatus of claim 3 wherein each of said interface means includes means for altering the distance field received with a parallel data wod from any of said interface means to which it is connected and retransmitting said altered distance field with said parallel dat word to any other of said interface means to which it is connected, said altered distance field indicating a remaining number of said interface means to retransmit said parallel data word, said remaining number being one less than the number indicated by the received distance field.

5. An apparatus for transmitting and receiving sequences of parallel data words between a plurality of digital devices comprising:
 a plurality of interface means, each of selectively transmitting parallel data word sequences to and receiving parallel data word sequences from a corresponding digital device; and
 a plurality of bi-directional bus means for interconnecting said plurality of said interface means such that each said interface means is connected to at least one, and not more than two other said interface means, each bi-directional bus means carrying parallel data words between a pair of said interface means,
 each said interface means including means adding an identification field to parallel data words received from its corresponding digital device and then transmitting said words to another of said interface means via one of said bi-directional bus means, said identification field identifying a parallel data word sequence to which the parallel data words belong.

6. An apparatus for transmitting and receiving sequences of parallel data words between a plurality of addressable memories comprising:
 a plurality of interface means, each for selectively transmitting parallel data word sequences to and receiving parallel data word sequences from a corresponding addressable memory, each of said interface means including means for addressing said addressable memory, means for writing parallel data word sequences from a corresponding addressable memory, each of said interface meansincluding means for addressing said addressable memory, means for writing parallel data word sequences into said addressable memory, and means for reading parallel data word sequences from said addressable memory; and
 a plurality of bi-directional bus means interconnecting said plurality of said interface means such that each of said interface means is connected to at least one, and not more than two other said interface means,
 each bi-directional bus means alternately conveying parallel data words of differing parallel data wod sequences in opposite directions between a pair of said interface means, and conveying arbitration signals concurrent with said parallel data words,
 each of said pair of said interface means transmitting at least one of said arbitration signals to, and receiving at least one other of said arbitration signals from each of said interface means to which it is connected via one of said bi-directional bus means and including means for coordinating transmission of said parallel data words on said bi-directional bus means in an interleaved fashion in response to said arbitration signals.

7. The apparatus of claim 6 wherein each of said interface means includes means for adding an identification field to each parallel data word received from said addressable memory and transmitted to other of said interface means, said identification field identifying a parallel data word sequence to which said each parallel data word belongs.

8. The apparatus of claim 6 wherein each of said interface means selectively forwards each parallel data word received from any one of said interface means and memory to any other of said interface means and addressable memory to which it is connected.

9. An apparatus for conveying parallel data words between digital devices of the type which transmit and receive data, said apparatus comprising:
 a plurality of bi-directional buses for conveying sequences of paralleldata words; and
 a plurality of nodes each comprising first port means for alternatively transmitting and receiving sequences of parallel data wrods, second port means for alternatively transmitting and receiving said sequences of parallel data words, and third port means for transmitting and receiving said sequences of parallel data words,
 said nodes being interconnected by said plurality of bi-directional buses to form a series of said nodes wherein the first port means of selected nodes of said series are each connected by a separate one of said bi-directional buses to the second port means of the next node of said series, each first and second port means interconnected by one of said bi-directional buses alternatively transmitting and receiving in an interleaved fashion said parallel data words of said parallel data word sequences transmitted and received by way of the bi-directional bus that interconnects them,
 wherein each said first and second port means interconnected by one of said bi-directional buses comprises means for jointly controlling direction of parallel data word transmission on the bi-directional bus that interconnects them,
 said digital devices being respectively connected to third port means of separate nodes for transmitting parallel data words to and receiving parallel data words from said third port means, wherein each node further comprises parallel data word forwarding means for transferring parallel data words from said third port means to said first and second port means, for transferring parallel data words from said first port means to said sse- cond port means and said third port means, and for transferring parallel data words from said second port means to said first port means and said third port means, wherein said first port means further comprises means for generating a first data transfer request signal following said first port means receipt of parallel data words conveyed thereto by one of said bi-directional buses, said second port means further comprises means for generating a second data transfer request signal following receipt of parallel data words conveyed thereto by one of said bi-directional buses, and said third port means further comprises means for generating a third data transfer request signal following receipt of parallel data words transmitted thereto by one of said digital devices to which it is connected, and wherein said parallel data word forwarding means further comprises arbitration meas for initiating transfer of parallel data words among said first port means, said second port means and saidthird port means in response to said first, second and third data transfer request signals in accordance with a predetermined order of priority.

10. An apparatus for conveying parallel data words between digital devices of the type which transmit and receive data, said apparatus comprising:

a plurality of bi-directional buses for conveying sequences of parallel data words; and a plurality of nodes each comprising first port means for alternatively transmitting and receiving said sequences of parallel data words, second port means for alternatively transmitting and receiving said sequences of parallel data words, and third port means for transmitting and receiving said sequences of parallel data words, said nodes being interconnected by said plurality of bi-directional buses to form a series of said nodes wherein the first port means of selected nodes of said series are each connected by a separate one of said bi-directional buses to the second port means of the next node of said series, each first and second port means interconnected by one of said bi-directional buses alternaively transmitting and receiving in an interleaved fashion said parallel data words of said parallel data word sequences transmitted and received by way of the bi-directinal bus thgat interconnects them, wherein each said first and second port means interconnected by one of said bi-directional buses comprises means for jointly controlling direction of parallel data word transmission on the bi-directional bus that interconnects them, said digital devices being respectively connected to third port means of separate nodes for transmitting parallel data words to and receiving parallel data words from said third port means, wherein each node further comprises parallel data word forwarding means for transferring parallel data words from said third port means to said first and second port means, for transferring parallel data words from said first port means to said second port means and said third port means, and for transferring parallel data words from said second port means to said first port means and said third port means, wherein parallel data words received by said first and second port means each include a distance field indicating a number of nodes through which the parallel data word is to be transmitted, wherein said parallel data word forwarding means comprises:

first control means for determining in accordance with said number indicated by a first distance field included in a first parallel data word conveyed by one of said bi-directional buses to said first port means whether said first parallel data word is to be transferred from said first port means to saiad second port means or to said third port means, and for altering the number indicated by said first distance field prior to transfer of said first parallel data word to said second port means;

second control means for determining in accordance with said number indicated by a second distance field included in a second parallel data word conveyed by one of said bi-directional buses to said second port means whether said second parallel data word is to be transferred to said first port means or to said third port mans, and for altering the number indicated by said second distance field prior to transfer of said second parallel data word to said first port means; and means for adding a third distance field to a third parallel data word transmitted to said third port means by one of said digital devices to which it is connected prior to transfer of said third parallel data word to said first or second port means.

11. The apparatus in accordance with claim 10 wherein said first parallel data word includes a first identification field of value indicating a first parallel data word sequence in which said first parallel data word is included, wherein said first control means comprises first programmable memory means for relating values of said first identification field to corresponding numbers and for altering said first distance field prior to transfer of said first parallel data word sequence to said second port means so that said first distance field indicates the number corresponding to the value of said first identification field, and wherein said second parallel data word includes a second identification field of value indicating a second parallel data word sequence in which said second parallel data word is included, wherein said second control means comprises second programmable memory means for relating values of said second identification field to corresponding numbers and for altering ssid second distance field prior to transfer of said second parallel dats word sequence to said first port means so that said second distance field indicates the number corresponding to the value of said second identification field.

12. The apparatus in accordance with claim 11 wherein said first programmable memory means further relates various values of said first identification field to corrsponding first forwarding instructions indicating whether said first parallel data word is to be transferred to said second port means only, to said third port means only, or to both said second port means and said thid port means in accordance with said first forwarding instructions corresponding to the value of said first identification field included in said first parallel data word, and wherein said second programmable memory means also relates various values of said second identification field tocorresponding second forwarding instructions indicating whether said second parallel data wod is to be transfered to said first port means only, to said third port means only, or to both said first port means and said third port means, and wherein said parallel data word forwarding means transfers said second parallel data word to said first port means and said third port means in accordance with said second forwarding instructions corresponding to the value of said second identification field included in said second parallel data word.

13. The apparatus in accordance with claim 10:
wherein said first port means further comprises means for generating a first data transfer request signal following said first port means receipt of said first parallel data word, said second port means further comprises means for generating a second data transfer request signal following receipt of said second parallel data word, and said third port means further comprises means for generating a third data transfer request signal following receipt of said third parallel data word, and wherein said parallel data word forwarding means further comprising arbitration means for initiating transfer of parallel data words among said first port means, said second port means and said third port means in response to said first, second and third data transfer request signals in accordance with a predetermined order of priority.

* * * * *